United States Patent [19]
Ogata et al.

[11] Patent Number: 6,001,014
[45] Date of Patent: Dec. 14, 1999

[54] GAME MACHINE CONTROL MODULE AND GAME MACHINE

[75] Inventors: Hiroki Ogata, Chiba; Toru Akazawa, Tokyo; Akihisa Ono, Tokyo; Satoshi Shinohara, Tokyo, all of Japan

[73] Assignee: Sony Computer Entertainment Inc., Tokyo, Japan

[21] Appl. No.: 08/940,238

[22] Filed: Sep. 30, 1997

[30] Foreign Application Priority Data

Oct. 1, 1996 [JP] Japan ................................. 8-260697
Apr. 22, 1997 [JP] Japan ................................. 9-118729

[51] Int. Cl.$^6$ ........................................ A63F 9/22
[52] U.S. Cl. ........................................... 463/37
[58] Field of Search .................. 463/37, 36, 38, 463/39, 30, 33; 273/148 B; 345/168, 169

[56] References Cited

U.S. PATENT DOCUMENTS

| | | | |
|---|---|---|---|
| 5,451,053 | 9/1995 | Garrido | 273/148 B |
| 5,700,194 | 12/1997 | Hsien | 463/37 |
| 5,739,811 | 4/1998 | Rosenberg et al. | 463/30 |
| 5,759,100 | 8/1996 | Nakanishi | 463/37 |

FOREIGN PATENT DOCUMENTS

| | | |
|---|---|---|
| 0 680 132 A1 | 11/1995 | European Pat. Off. . |
| 0 695 566 A1 | 2/1996 | European Pat. Off. . |
| 0 835 676 A1 | 4/1998 | European Pat. Off. . |
| 40 13 227 C1 | 5/1991 | Germany . |
| 10097375 | 4/1998 | Japan . |
| 10258181 | 9/1998 | Japan . |

OTHER PUBLICATIONS

Ming Ouhyoung et al., A Low–Cost Force Feedback Joystick and its use in PC Video Games, IEEE Transactions On Consumer Electronics, vol. 41, No. 3, Aug. 1, 1995, pp. 787–793.

*Primary Examiner*—Valencia Martin-Wallace
*Assistant Examiner*—Sheila Clayton
*Attorney, Agent, or Firm*—Fulwider Patton Lee & Utecht, LLP

[57] ABSTRACT

This invention relates to a home game machine, and more particularly, to a game machine control module having a plurality of operation buttons, which is connected to a game machine body through a cable. The game machine control module comprises a control member for transmitting the operation data obtained by a plurality of operation buttons through the cable to the game machine body and for receiving the data from the game machine body through the cable, and a response member positioned at a predetermined place on the game machine control module and controlled by the control member based on a predetermined dynamic transmission data which is contained in the data transmitted from the game machine body. Therefore, this makes it possible to enjoy games giving the feeling of being at a live performance comparing to the conventional one.

36 Claims, 54 Drawing Sheets

| | 1ST BYTE | 2ND BYTE | 3RD BYTE | 4TH BYTE | 5TH BYTE |
|---|---|---|---|---|---|
| RECEIVED DATA FROM GAME MACHINE | 0x01 | 0x42 | — | DATA (TXD1) | DATA (TXD2) |
| TRANSMISSION DATA TO GAME MACHINE | — | 0x42 | 0x5a | DATA (RXD1) | DATA (RXD2) |

GAME MACHINE CONTROL MODULE AND GAME MACHINE

BACKGROUND OF THE INVENTION

1. Field of the Invention

This invention relates to a game machine control module for playing a game through operation of a plurality of buttons, and a game machine, and more particularly, to a game machine control module having a function causing ambience based on a specific signal from a game machine body that has a function for reproducing a video recording medium and such game machine.

2. Description of the Related Art

A game machine control module CM of prior art is formed in a form of glasses, as shown in FIG. 1, and has a housing comprising an upper case 2 and a lower case 3, which can be vertically separated. The housing is formed with first and second controller supports 4 and 5 at the longitudinal ends thereof that project in a square shape, and that are gripped by the palms of the hands for support. A start/select section 6 is formed on a constricted portion at the center of the housing, the section containing switches to start and select a game. Moreover, circular projections are formed at bilateral symmetric ends of the housing, and comprise first and second control sections 7 and 8 consisting of a plurality of switches disposed substantially at the center of each projection, as well as third and fourth control sections 9 and 10 having a plurality of switches disposed at bilateral positions on the front side wall surface of the housing, and that can be operated mainly by the forefingers and the middle fingers.

The start/select section 6 comprises so-called switches that include a start switch 11 and a select switch 12 disposed at an intermediate position between the first and second control sections 7 and 8. The select switch 12 is, for example, to select difficulty of a game when it is begun, while the start switch 11 is a switch for actually stating the game.

The first control section 7 comprises a recess 13 that is recessed in a substantially cross shape at the center of the circular projection at one end of the housing, and a window 15 in the recess 13 through which four key tops 14a, 14b, 14c, and 14d can be outwardly projected from inside. The window 15 is arranged with the upper ends of four key tops 14a, 14b, 14c, and 14d in a cross shape for the substantially cross-shaped recess 13.

The second control section 8 is provided, as shown in FIG. 1, with a recess 16 that is recessed in a substantially cross shape at the center of the circular projection at the other end, and four cylinders 17 with openings with size that allows cylindrical key tops 16a, 16b, 16c, and 16d to outwardly project from inside at respective corners of the cross-shaped recess 16.

The top surfaces of four key tops 16a, 16b, 16c, and 16d are marked with visually identifiable marks such as "○", "Δ", "□", and "X" for indicating functions so that the functions of the respective switches can be easily identified. In addition, the lower ends of these key tops 16a, 16b, 16c, and 16c, and the lower portion of the cylinder 17 are provided with unique projections or notches so that they do not engage other cylinders 17 when they are assembled.

The third and fourth control sections 9 and 10 are formed, as shown in FIG. 1, to bulge from the front wall of the first and second control sections 7 and 8, and comprises an opening 18 consisting two rows of elongated holes vertically parallel to the bulged wall, and a motion instructing control switch that is formed by projecting key tops 19a, 19b, 19c, and 19d with an elongated shape substantially fitting in the opening 18.

The game machine control module CM with such arrangement is connected to a video machine for reproducing a CD-ROM (not shown), a video recording medium, through a predetermined connector, and the video machine is connected to a monitor such as a TV receiver. Then, the control module is held by the palms of both hands, and the control buttons on the first to fourth control sections 7, 8, 9, and 10 are operated by the fingers of both hands to instruct motion of an action target such as a character on the monitor screen for playing the game.

However, the above-mentioned control module CM particularly for a household game machine is arranged to play the game by instructing motion of an action target on the monitor screen through operation of the buttons on the first to fourth control sections with the fingers, and the user can only perceive the character on the monitor screen by viewing it, or through visual sensation, and by hearing sound generated from the character, or through hearing sense. Thus, the control module itself does not have bodily sensation through feedback because the control module is operated by variously moving both hands and arms, but only substantially exploits a function for instructing one direction through operation with the fingers.

SUMMARY OF THE INVENTION

In view of the foregoing, an object of this invention is to provide a game machine control module and a game machine wherein game performance can be improved by enhancing ambience through an arrangement so that bodily sensation fed back from the game machine body can be obtained by the control module itself.

The foregoing object and other objects of the invention have been achieved by the provision of a game machine control module having a plurality of operation buttons, which is connected to a game machine body through cable. The game machine control module comprises: a control member for transmitting the operation data obtained by a plurality of the operation buttons to the game machine body through the cable, and for receiving the data containing a predetermined dynamic transmission data from the game machine body through the cable; and a response member which is positioned at a predetermined place on the game machine control module and which is operated by the control member based on the predetermined dynamic transmission data.

Further, according to this invention, the game machine control module having a plurality of operation buttons, which is connected to a game machine body through cable, comprises: a control member for transmitting the operation data obtained by a plurality of the operation buttons to the game machine body through the cable, and for receiving the data containing a predetermined dynamic transmission data, which further contains a plurality of control data, from the game machine body through the cable; and a response member which is positioned at a predetermined place on the game machine control module and which is operated by the control member based on the predetermined dynamic transmission data, the response member being controlled by the control member based on a plurality of the control data so as to selectively generate the difference action.

The nature, principle and utility of the invention will becomes more apparent from the following detailed description when read in conjunction with the accompanying drawings in which like parts are designated by like reference numerals or characters.

DETAILED DESCRIPTION OF THE EMBODIMENT

Figure 1:
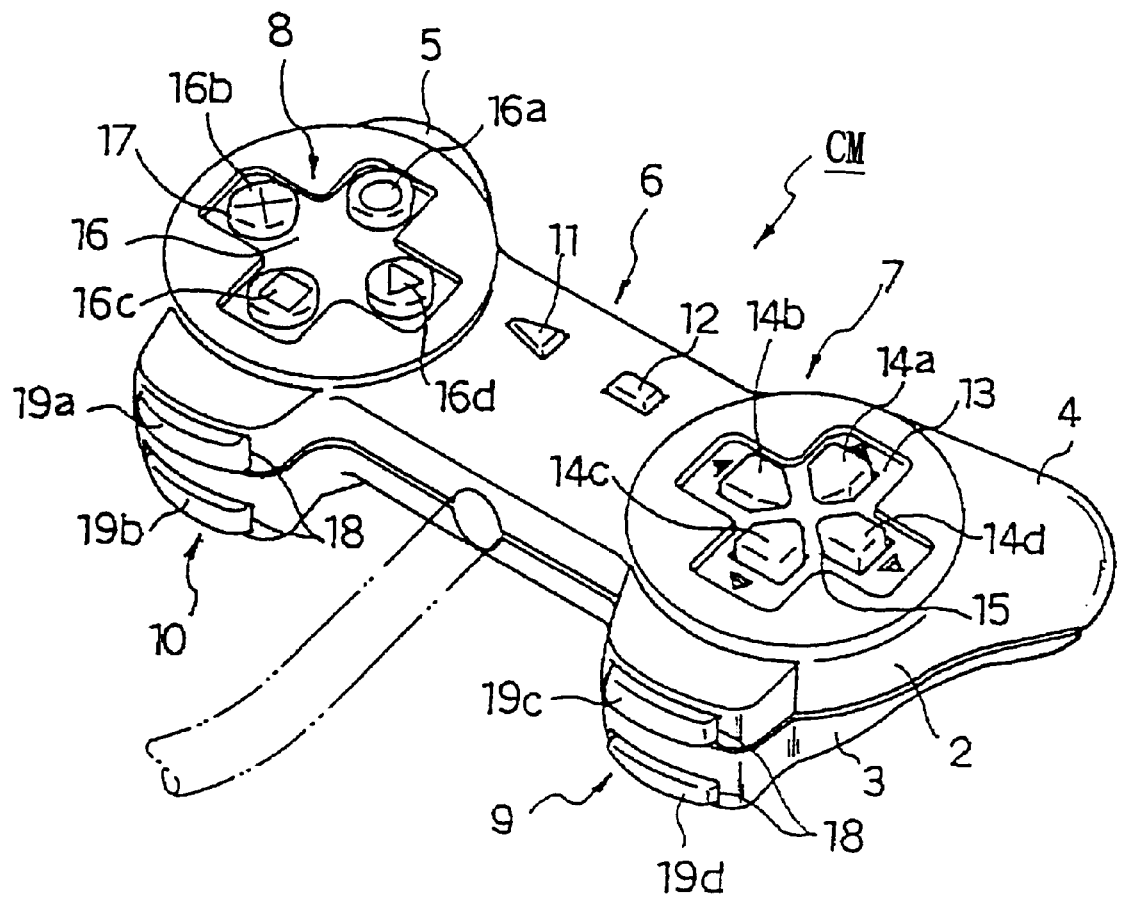
FIG. 1 is an entire perspective view showing the arrangement of a control module according to the prior art.

Preferred embodiments of this invention will be described with reference to the accompanying drawings:

Description is given on various embodiments of a game machine control module used for a game machine according to the present invention by referring to the drawings. Here, for convenience of understanding, same reference numerals are used for components of the game machine control module used for the game machine according to the present invention having the same shapes of those described for the prior art, for which description is omitted.

(1) First Embodiment

Figure 2:
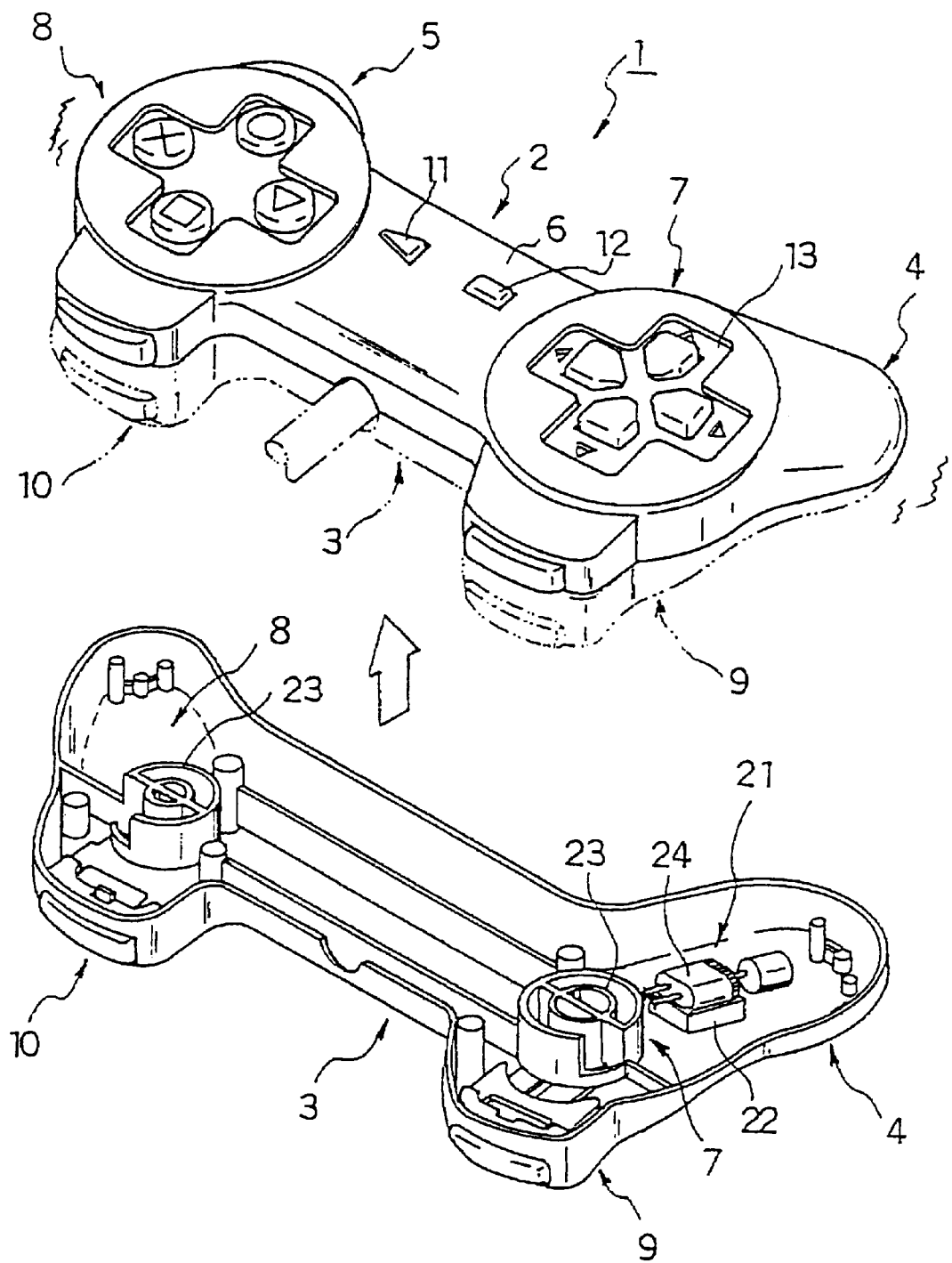
FIG. 2 is a perspective view of an entire game machine control module according to the present invention with the lower case removed.

A game machine control module 1 of a first embodiment according to the present invention has, as shown in FIG. 2, a housing formed in a form of glasses and comprising first control support and second control supports 4 and 5 gripped and supported by the palms of both hands that are squarely projected at the longitudinal ends. The housing has, on a constricted portion at its center, a start/select section 6 on which buttons used for starting and selecting a game are formed to outwardly projecting from inside; first and second control sections 7 and 8 that have buttons outwardly projecting from inside at the top of both longitudinal ends of the housing; and third and fourth control sections 9 and 10 that comprise buttons outwardly projecting from inside on the wall at the front of both longitudinal sides of the housing. In addition, there are provided switches (not shown) mounted in the housing, and a board controlling communication with the game machine that contains a CD-ROM (not shown), a video recording medium, and can reproduce it. Furthermore, there is provided a connector 20 having a cable for electrically connecting the game machine (see FIG. 5). The housing has a response member 21 located in a predetermined space. Among them, only difference from the prior art described in conjunction with FIG. 1 is provision of the suitable response member 21, and all other components have structures and arrangements similar to those of the prior art.

That is, the housing consists of an upper case 2 and a lower case 3, and provided with a response member positioning section 22 for mounting the response member 21 at a first control support 4 that is squarely projected on the lower case 3.

The first and second control sections 7 and 8 on the lower case 3 are provided, as shown in FIG. 2, with cylindrical mounting sections 23 for mounting a board and switches, and the rectangular third and fourth control sections 9 and 10 projected from the front surface of the first and second controls 7 and 8.

Figure 5:
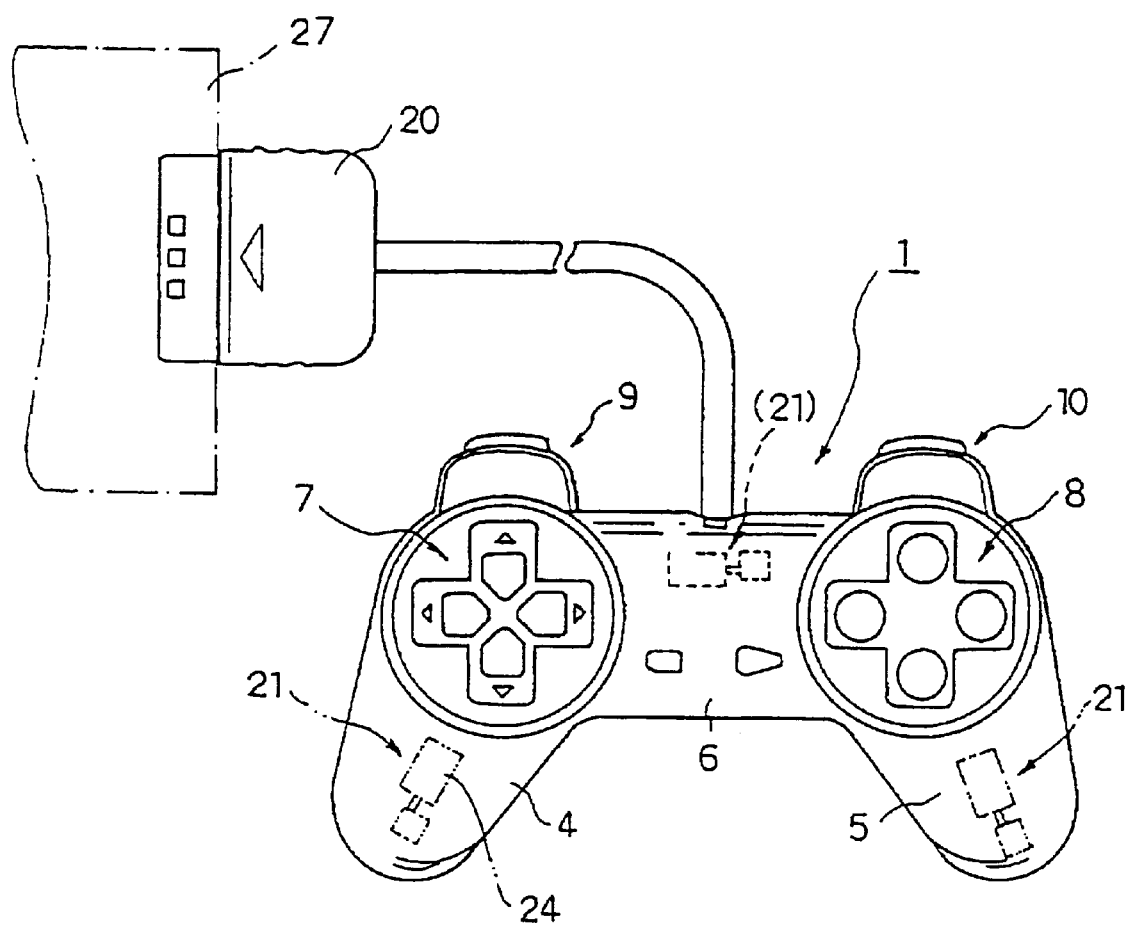
FIG. 5 is a schematic plan view showing a position where the response member to be assembled in the control module is assembled.

In the lower case 3 thus constructed, available spaces for positioning the response member 21 are, as shown in FIGS. 2 and 5, those existing at the locations of the first and second control supports 4 and 5 supported by the palms, or at the front of the constricted start/select section 6. The embodiment is constructed to contain and position the response member 21 in the first control support 4 supported by the palm of the left hand.

Figure 3:
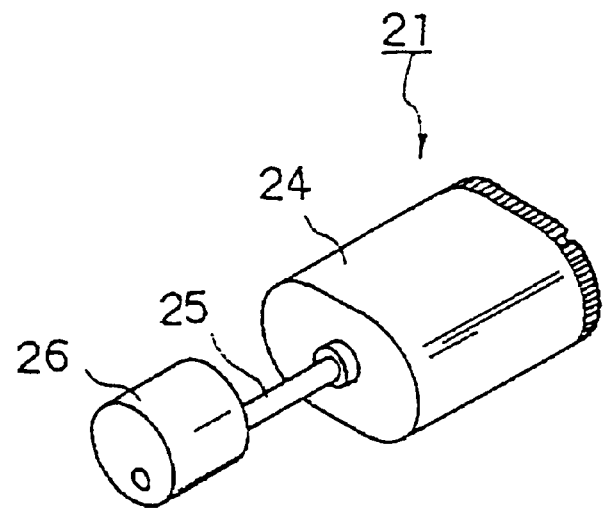
FIG. 3 is a perspective view of a motor and an eccentrically mounted rotary section that constitute a response member assembled in the control module.
Figure 4:
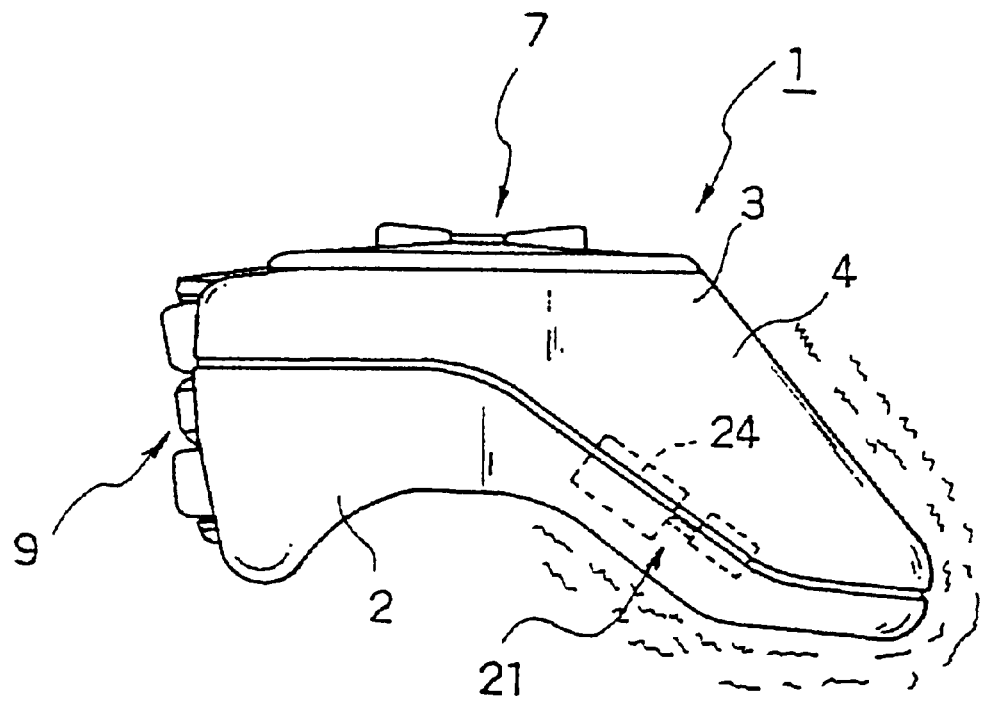
FIG. 4 is a right side view showing a state where the control module is vibrating.

Here, the response member 21 comprises, as shown in FIG. 3, a motor 24 and a column-shaped rotating member 26 the rotating shaft 25 of which is mounted on the motor with off center, that is, eccentrically mounted thereon. With such arrangement, when the motor 24 rotates, the rotating member 26 causes eccentric rotation to generate vibration. This vibration is a sort of dynamic transmission. In FIGS. 2 and 4, the vibration not only transmits to the first control support 4, but also to the casings of the lower and upper cases 3 and 2, so that the entire machine is caused to vibrate. Magnitude of the eccentrically generated vibration can be arbitrarily varied by the number of revolution and torque of the motor 24 of the responsive member 21, whereby magnitude of the vibration can be varied on the responsive member.

A response member positioning section 22 provided on a lower case 3 is mounted, as shown in FIG. 2, on a location of the first control support 4 where the palm abuts, and can secure the motor 24 of the responsive member 21.

Figure 6:
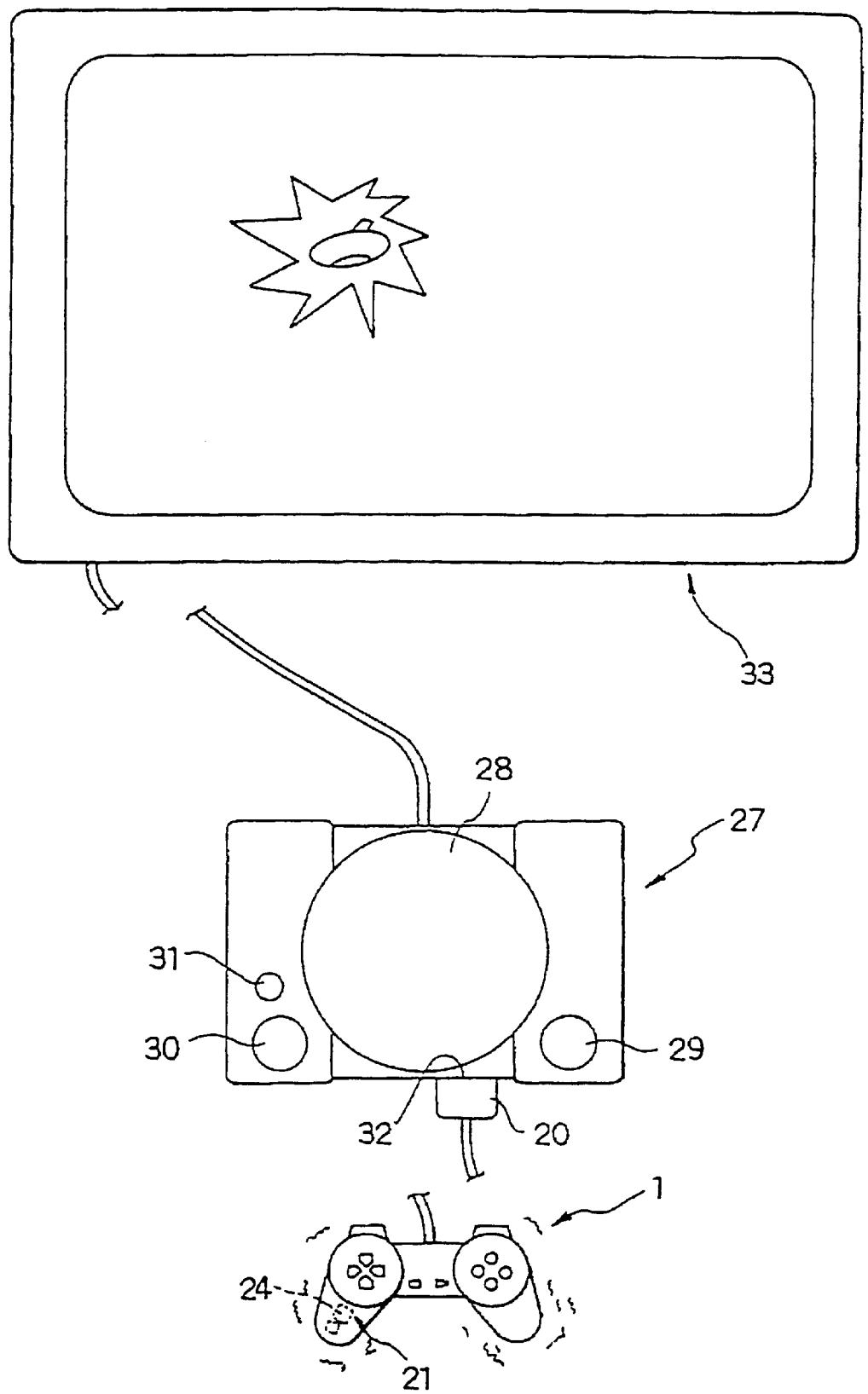
FIG. 6 is a schematic diagram showing a state to play a game by connecting the control module to the game machine body, and connecting the game machine body to a monitor.

As the motor 24 of the responsive member 21 is mounted through rubber (not shown) on the first control support 4 of the case 3, or the location gripped and supported by the palm, in playing a game by connecting the game machine control module 1 and the game machine 27 to a monitor 33 of a TV receiver or the like, as shown in FIG. 6, the entire game machine control module 1 can be vibrated for a predetermined period of time by drivingly rotating the motor 24 of the response member 21 in response to a specific signal from the game machine 27 depending on the type of a game, for example, when the opponent is defeated in a grappling game, a target is shot in a shooting game, or an action target is an air plane and attacked on the screen. Thus, the game machine control module 1 itself vibrates through operation of the control button by the user to feed back it as bodily sensation to the user, so that ambience can be further improved. Mounting of the motor 24 through a rubber member (not shown) can reduce mechanical noise.

Here, the game machine 27 contains, as shown in FIG. 6, a CD-ROM drive that has a function capable of reproducing a CD-ROM as a video recording medium, and has a lid member 28 on the top thereof for accepting and closing the CD-ROM. It further comprises a closing switch 29 for opening and closing the lid member 28, a power switch 30 for supplying electric power, a reset switch 31 for initializing the operation of the game machine 27, and a connection section 32 capable of connecting two sets of the control modules. When the connector 20 of the game machine control module 1 is connected to the connection section 32, bidirectional communication can be established with the game machine 27. While the embodiment is described for an arrangement where one set of the game machine control module 1 is connected, when two sets of the game machine control modules are connected, the operation and arrangement of the other control module are same, the description of which is omitted.

In order to vibrate the entire game machine control module 1 by driving the motor 24 of the response member 21 as described above, it is necessary to provide a function allowing bidirectional communication between the game machine control module 1 and the game machine 27.

Figure 7:
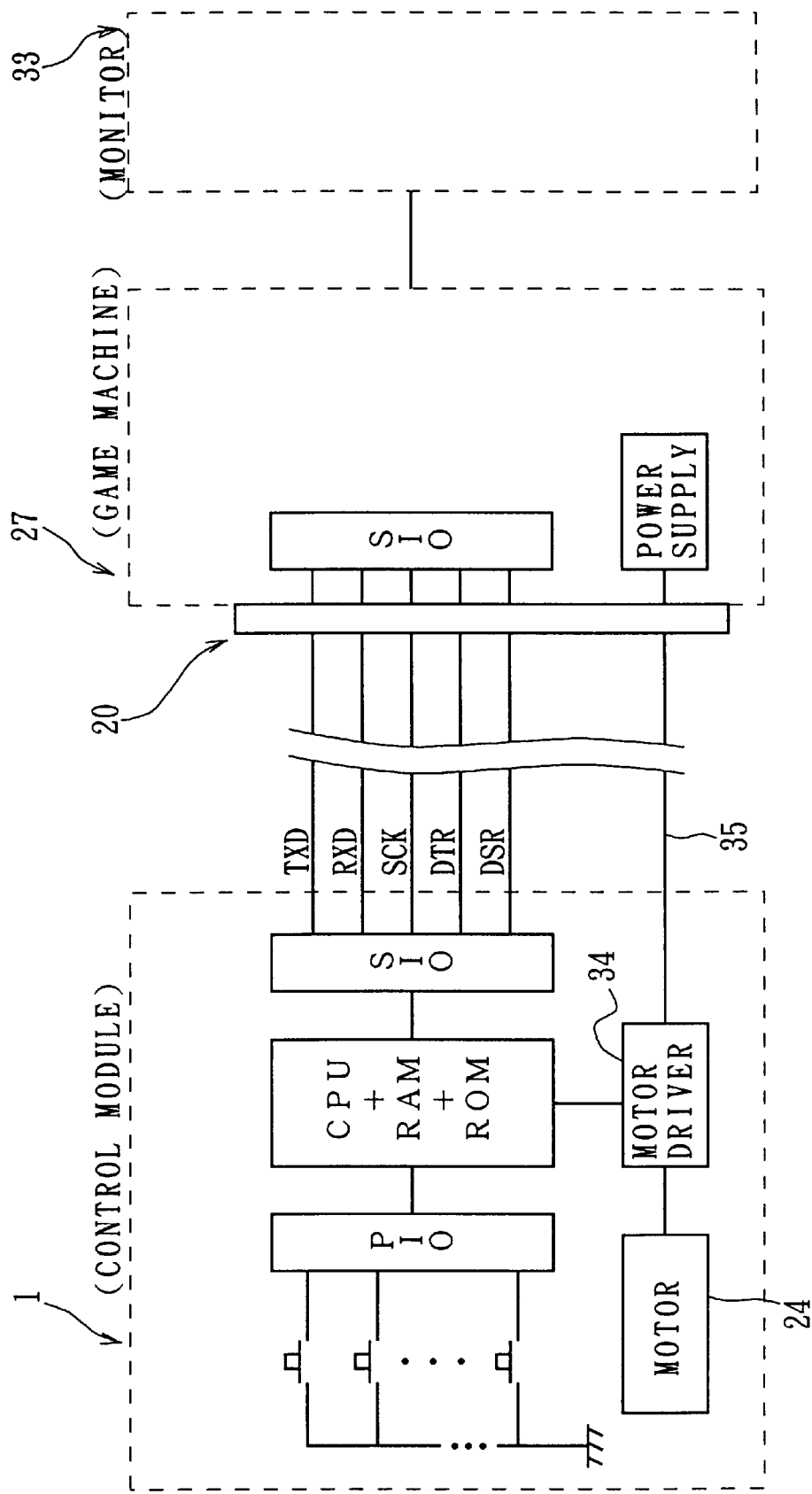
FIG. 7 is a block diagram showing essential areas for performing bidirectional serial communication between the control module and the game machine body.

The bidirectional communication function can be provided, as shown in FIG. 7, by connecting the connector 20 for bidirectional communication with the game machine control module 1 to the game machine 27.

An arrangement attaining the bidirectional communication function on the game machine control module 1 comprises a serial I/O interface SIO performing serial communication with the game machine 27, a parallel I/O interface PIO for inputting control data from a plurality of control buttons, a one-chip microcomputer consisting of a CPU, a RAM and a ROM (hereinafter called a microcomputer), and a motor driver 34 for driving and rotating the motor 24 of the response member 21. The motor 24 is rotated and driven by supply voltage and current from the motor driver 34.

The game machine 27 is provided with a serial I/O interface SIO for performing serial communication with the game machine control module 1. When the connector 20 of game machine control module 1 is connected, the serial I/O interface SIO is connected to the serial I/O interface SIO on the game machine control module 1 through the connector 20, whereby bidirectional communication or bidirectional serial communication can be established. Other detailed arrangement of the game machine 27 is omitted.

Signal and control lines for establishing the bidirectional serial communication include a signal line TXD (Transmit X' for Data) for data transmission for sending data from the game machine 27 to the game machine control module 1, a signal line RXD (Received X' for Data) for data transmission for sending data from the game machine control module 1 to the game machine 27, a signal line SCK (Serial Clock) for serial synchronization clock for extracting data from the respective data transmission signal lines TXD and RXD, a control line DTR (Data Terminal Ready) for establishing and interrupting communication of the game machine control module 1 as a terminal, and a control line DSR (Data Set Ready) for flow control for transferring a large amount of data.

In addition, a cable consisting of the signal and control lines for performing the bidirectional communication includes, as shown in FIG. 7, a power supply cable 35 directly led out from the power supply of the game machine 27 in addition to the signal and control lines. The power supply cable 35 is connected to the motor driver 34 on the game machine control module 1 to supply the electric power for rotating the motor 24.

In procedure for the bidirectional serial communication with such arrangement, the game machine 27 as shown in FIG. 5, for example, first outputs selection data on the control line DTR to cause the game machine 27 to communicate with the game machine control module 1, and to capture control data (button information) of the control buttons of the first to fourth control sections 7, 8, 9, and 10. Consequently, the game machine control module 1 confirms selection by the control line DTR, and waits for reception of a subsequent signal from the signal line TXD. Then, the game machine 27 issues an identification code identifying the game machine control module 1 to the data transmission signal line TXD. Thus, the game machine control module 1 receives the identification code through the signal line TXD.

As the identification code identifies the game machine control module 1, communication is started with the game machine 27 since then. That is, the game machine 27 sends control data or the like to the game machine control module 1 through the data transmission signal line TXD, whereas the game machine control module 1 sends control data from control by the control buttons or the like to the game machine 27 through the data transmission signal line RXD. In this manner, the bidirectional serial communication is performed between the game machine 27 and the game machine control module 1. This communication is terminated when the game machine 27 outputs selection discontinue data through the control line DTR.

As described, if the bidirectional serial communication function is provided, the game machine control module 1 can send control data mainly from the control buttons to the game machine 27, while the game machine 27 can deliver to the game machine control module 1 dynamic transmission data for rotating the motor 24 of the response member 21. The dynamic transmission data for rotating the motor 24 is preset by a game CD-ROM loaded on the game machine 27, and feedback is performed by the dynamic transmission in a predetermined period of time from the game machine 27 to the game machine control module 1 itself depending on an action target of the game player. This is described in detail in conjunction with the flowcharts of FIGS. 8 and 9 by referring to FIGS. 2 and 7.

The user loads a specific game CD-ROM in the game machine 27, sets start of the game with the start switch 11 of the game machine control module 1 shown in FIG. 2, and sets various functions through operation of the select switch 12, whereby the game is ready for play through operations of the first to fourth control sections 7, 8, 9, and 10.

Then, as the game is started, the microcomputer of the game machine control module 1 consisting of the CPU, the RAM and the ROM shown in FIG. 7 continuously monitors through the serial interface SIO that dynamic transmission data for hit is sent from the game machine 27 through the serial I/O interface SIO. The dynamic transmission data contains a control signal for voltage and current for driving the motor 24 shown in FIG. 7, and duration for driving the motor 24. Then, as the game progresses, if there is the dynamic transmission data in data sent from the game machine 27, it drives the motor driver 34, and supplies the voltage supplied from the game machine 27 to the motor 24 for a predetermine period of time. That is, step ST21 in FIG. 8 determines the dynamic transmission data in the data signal received by the game machine control module 1 in step ST21, step ST2 processes it with the microcomputer, step ST3 drives the motor driver 34 shown in FIG. 7, and step ST4 generates vibration.

In addition, if step ST1 determines that it is not the dynamic transmission data, when the control button is operated in step ST5, step ST6 inputs the operated control data to the microcomputer through the parallel I/O interface PIO shown in FIG. 7.

The control data input in the microcomputer is processed by the microcomputer in step ST2, and converted into serial data in step ST7, and sent to the game machine 27 through the serial I/O interface SIO shown in FIG. 7. Thereafter, the game machine control module 1 waits for data from the game machine 27 in step ST25.

Figure 9:
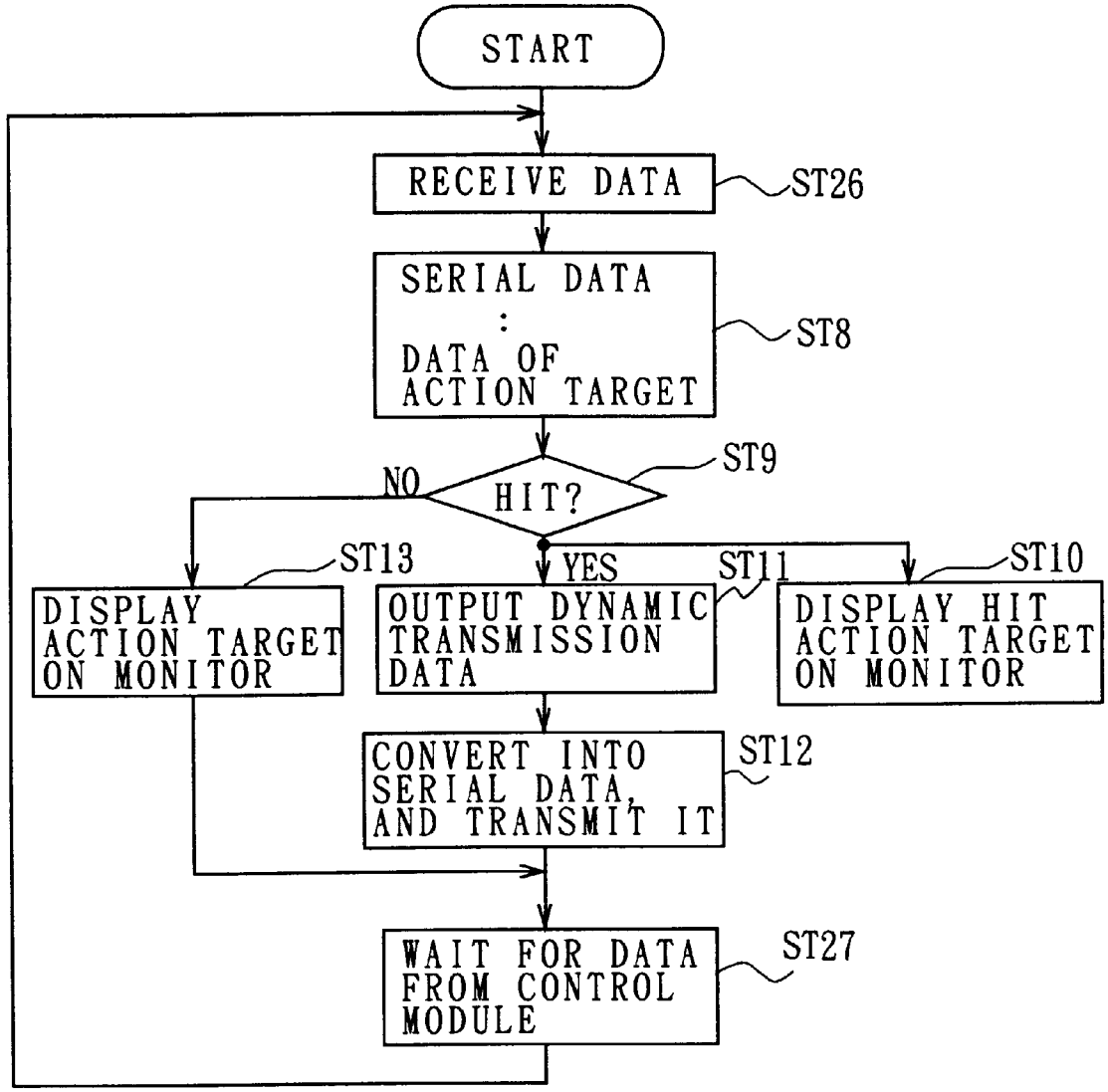
FIG. 9 is a flowchart showing processing procedure for data from the game machine body.

When the game machine 27 receives the control data converted into serial data in step ST26 shown in FIG. 9, and subsequent step ST8 compares data of the action target and the received serial data to determine a hit state.

If the data of the action data matches the serial data in step ST9, that is, if a hit is detected, in step ST10, the hit action target is displayed on the monitor screen, and the dynamic transmission data is output in step ST11, converted into serial data in step ST12, sent as a specific response signal to the game machine control module 1 through the serial I/O interface SIO shown in FIG. 7. Subsequently, the game machine 27 waits for data from the game machine control module 1 in step ST27. When the microcomputer of the game machine control module 1 detects the dynamic transmission returned from the game machine 27 to the game machine control module 1, as described in conjunction with steps ST1, ST2, and ST3, electric power is supplied from the motor driver 34 shown in FIG. 7 to the motor 24 for rotation. Such rotation vibrates the entire game machine control module 1.

Figure 8:
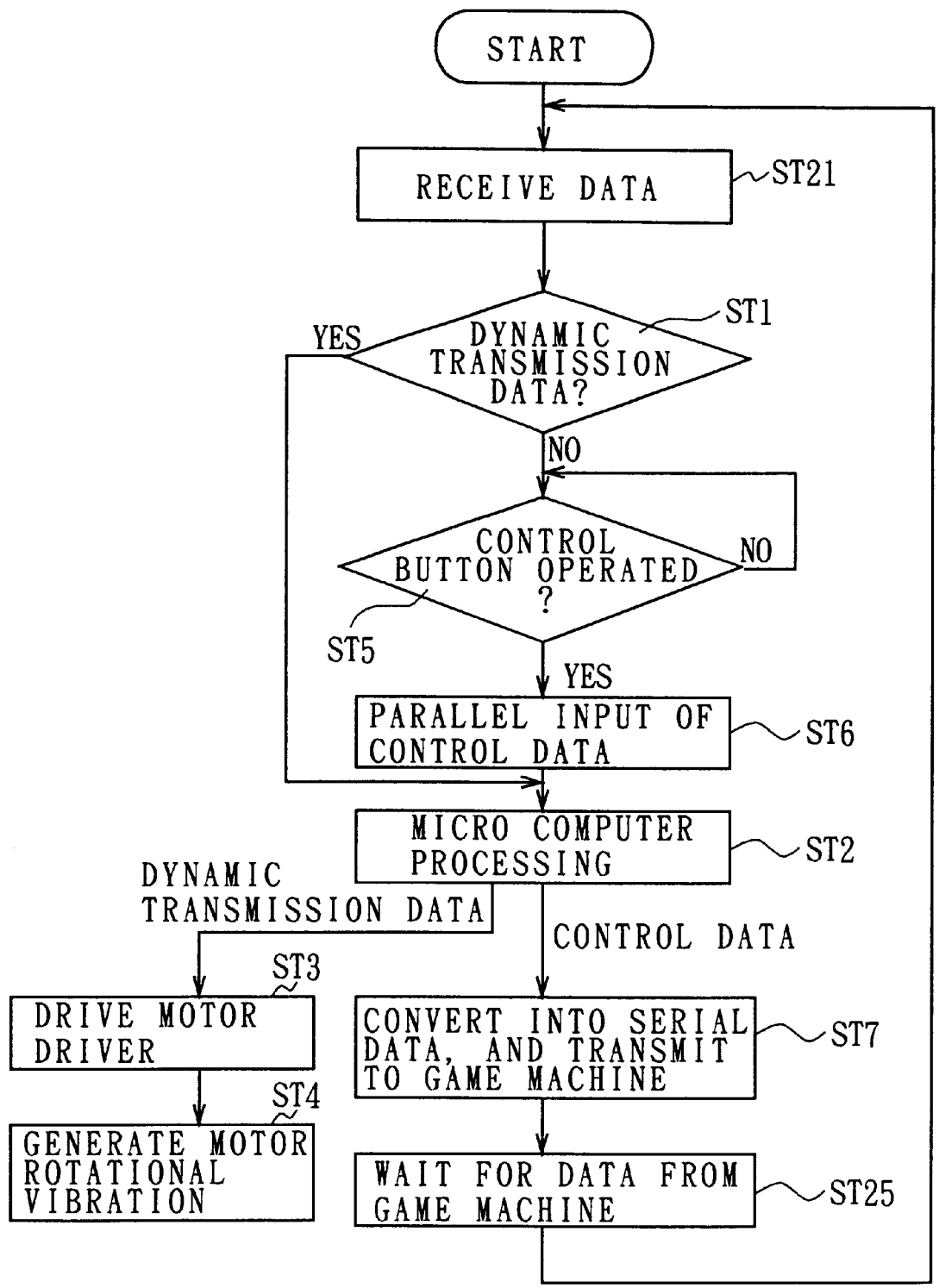
FIG. 8 is a flowchart showing processing procedure for data from the game machine control module.

If there is no hit, the action target based on the control button is displayed on the screen of the monitor in step ST13, and the next action would be performed according to the result of operation of the control button from the game machine control module 1 by step ST5 (FIG. 8).

In addition, while it is arranged that the dynamic transmission data generated at a hit as described above is received as a specific response signal by the game machine control module 1, the arrangement may be to send it from the game machine 27 to the game machine control module 1 via mono-directional communication.

Figure 10A:
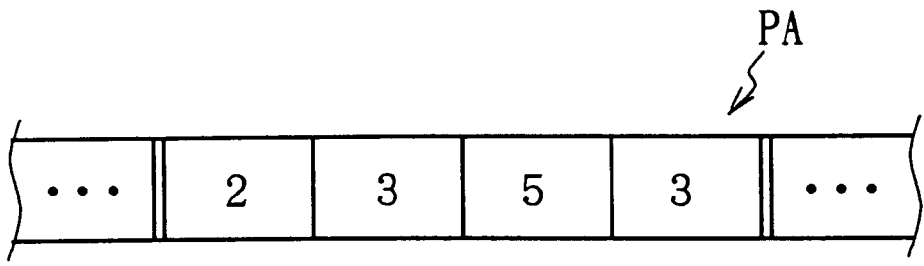
FIGS. 10A and 10B are a schematic diagram and a waveform showing data of current value applied to a motor and a current waveform, respectively.

Here, FIG. 10A particularly shows packet data PA for rotating and driving the motor 24 among the dynamic transmission data sent from the game machine 27 to the game machine control module 1. In this embodiment, one packet is constituted by four current value data. Respective microcomputer of the game machine 27 and the game machine control module 1 process data in every 1/60 seconds (one frame). Accordingly, the packet data PA is also sent from the game machine 27 to the game machine control module 1 in every 1/60 seconds.

Therefore, the drive current value applied to the motor 24 can be varied by the number of current value data in one frame interval by distributing the four current value data in one packet to one frame interval in every 1/4 frame interval.

Figure 10B:
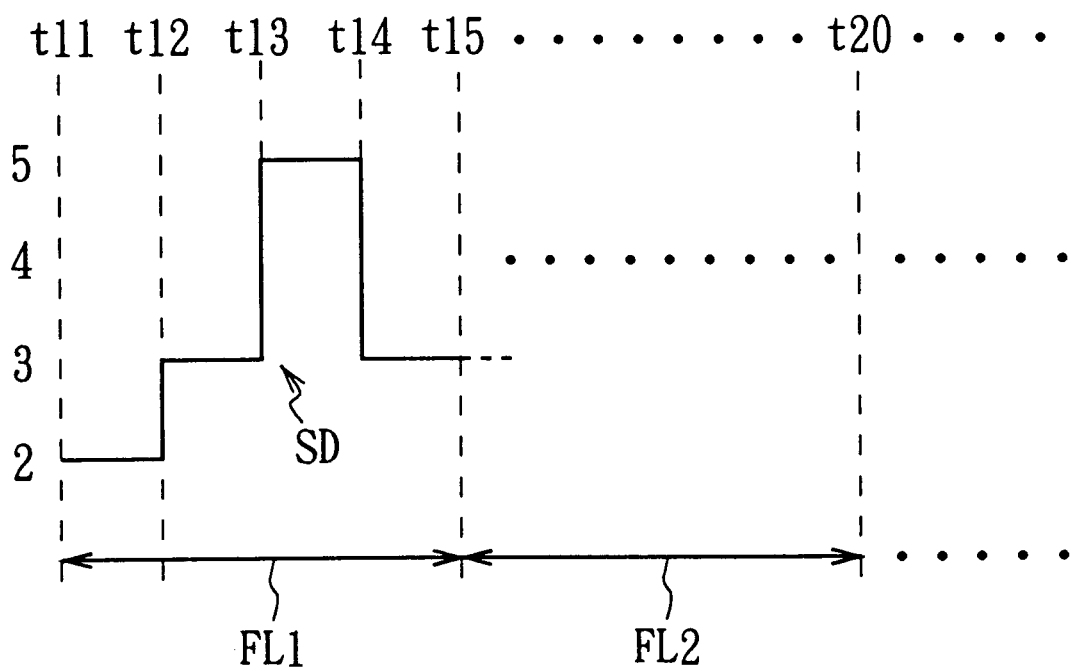

In other words, the dynamic transmission data transferred from the game machine 27 to the game machine control module 1 in a frame interval is data processed by the microcomputer of that game machine control module 1, whereby the packet data PA is read out. In the case of FIGS. 10A and 10B, four current value data "2", "3", "5", and "3" are read out as the packet data PA, converted into analog signals, and delivered to the motor driver 34 which will be described later in conjunction with FIG. 23.

The motor driver 34 obtains a drive current signal SD shown in FIGS. 10A and 10B by analog amplifying the values converted into analog signals with the electric power supplied from the game machine 27. The drive current signal SD corresponds to the current value data "2", "3", "5", and "3" of the packet data PA. It becomes a current value corresponding to the first current value data "2" for the beginning 1/4 frame (time t11–t12) interval in the first frame interval FL1 (time t11–t15), a current value corresponding to the second current value data "3" for the 1/4 frame following the beginning 1/4 frame (time t12–t13), a current value corresponding to the third current value data "5" for the 1/4 frame following it (time t13–t14), and a current value corresponding to the fourth current value data "3" for the last 1/4 frame (time t14–t15) provided from the coil driver 64 to the coils 58 and 59.

Even if the transfer timing is every 1/60 seconds for the dynamic transmission data transferred from the game machine 27 to the game machine control module 1, it is possible to contain and transfer a plurality of current value data (four for the embodiment) in the packet for that dynamic transmission data, whereby the game machine control module 1 can distribute the plurality of current value data in one frame interval and obtain a drive current signal SD.

Consequently, the motor 24 is driven by the drive current signal SD that varies in a time interval shorter than the time interval (one frame interval) where the dynamic transmission data is sent. In this manner, it is possible to set the frequency of the vibrator 53 by arbitrarily varying the waveform of the drive current signal SD with a shorter time interval and various current value data, while acceleration can be set for the rotation of the motor 24 by the current value.

Incidentally, various values are set for the current value data set for the packet data PA depending on magnitude of impact applied on an action target during progress of the game. In this case, various numbers in addition to four are assigned as the number of current value data assigned to one packet. Therefore, various drive current waveform are set according to progress of the game, whereby a high current value is applied to the motor 24 for a short period of time, for example, in a scene where a high impact is applied to the action target, so that vibration of high speed rotation such as an impact is generated on the game machine control module 1. On the other hand, in a scene where low and continuous vibration such as idling of a car is generated on the action target, a low current value is alternately applied to the motor 24 for a long period of time, whereby rotating vibration as if idling of a car is generated on the game machine control module 1.

Thus, when the response member 21 containing the motor 24 is used, vibration similar to vibration generated on a virtual action target is generated on the game machine control module 1 according to progress of the game played on the screen, whereby the user operating the game machine control module 1 can experience the game with ambience.

While description has been given on a case where a current value at each timing of rotary drive current applied on the motor 24 of the response member 21 is transferred from the game machine 27 to the game machine control module 1 in packet data, the present invention is not limited to this, but may be arranged in such a manner that data representing waveforms of drive current is transferred from the game machine 27 to the game machine control module 1, and current waveforms corresponding to the waveform data is generated on the game machine control module 1.

While, in the embodiment of the present invention described above, as shown in FIG. 5, the motor 24 of the response member 21 is arranged to be contained in the first control support 4 supported by the palm of the left hand, motors may be contained in at least two of spaces existing in the locations of the first and second control supports 4 and 5, and in front of the start/select section 6, or in all such spaces.

In addition, when the motors are mounted in at least two of spaces existing in the locations of the first and second control supports 4 and 5, and in front of the start/select section 6, or in all such spaces, it may be possible to mount motors or the response members 21 of the same size, or motors with different size (that is, motors generating different magnitude of vibration). Thus, when the motors with different size are mounted, they may be simultaneously or selectively vibrated, so that there is provided another advantage that the performance of the game can be further enhanced.

Figure 11:
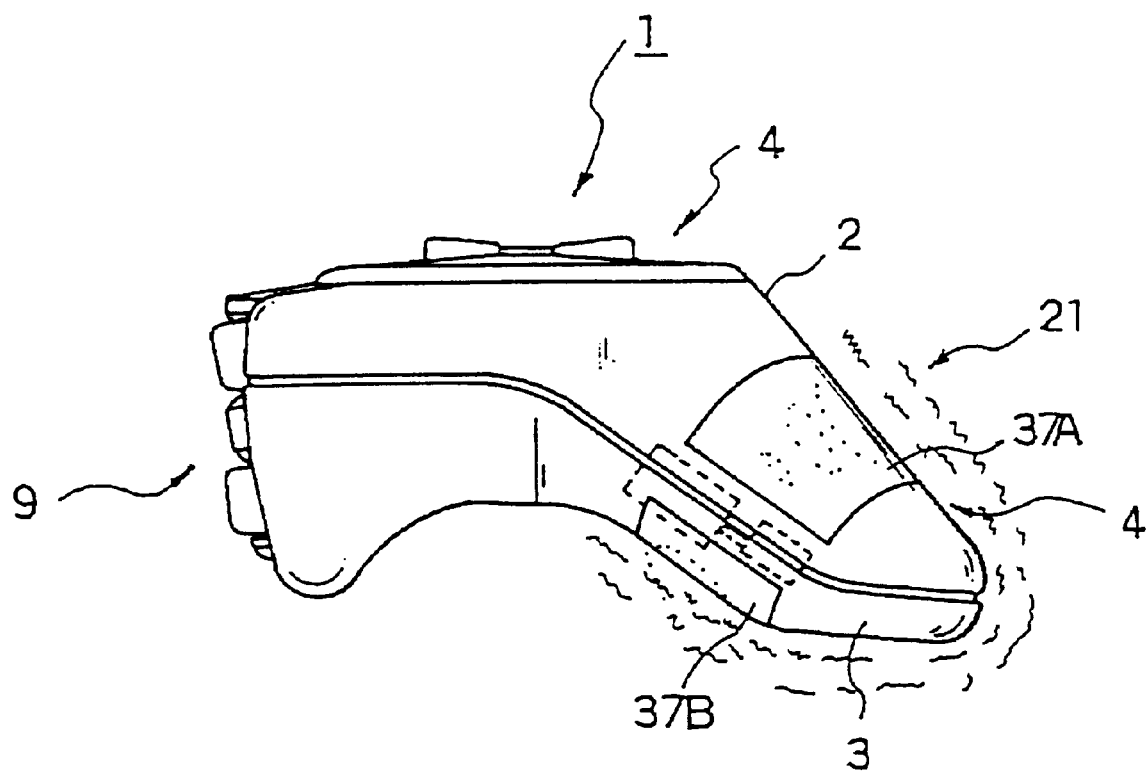
FIG. 11 is a right side view showing a control support according to an alternate embodiment.
Figure 12:
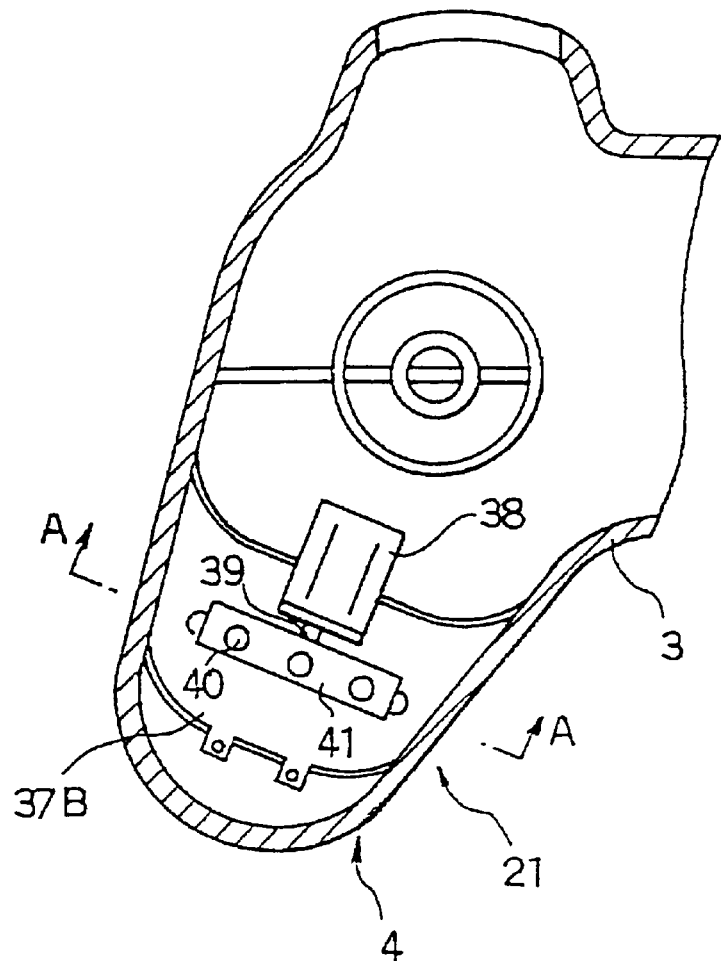
FIG. 12 is a plan view showing the internal arrangement of the control support according to the alternate embodiment.
Figure 13:
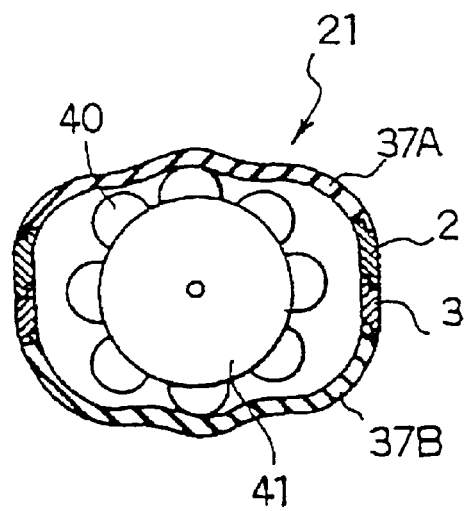
FIG. 13 is a sectional view taken along line A—A of FIG. 12.

Now, an alternate embodiment is described for the control module using the response member with the motor 24 according to the present invention by referring to FIGS. 11 to 13.

The game machine control module 1 of this embodiment has a construction in which the response member 21 is expanded or deformed at the location supported by the palm, as shown in FIGS. 11 to 13. That is, the game machine control module 1 is constructed in such a manner that, for the first control support 4, parts of the portion supported by the palm of the left hand are cut away, resilient members 37A and 37B being mounted to close the cut-away parts, and deformed or expanded by relatively or partially pushing out them, whereby dynamic transmission is applied to the palm, or so-called bodily sensation of response is fed back.

Here, the resilient members 37A and 37B may be made of, for example, rubber members, resin members, or fabric members.

The response member 21 is substantially same as that of the first embodiment described in conjunction with FIG. 2 other than its structure and mounting, so that same reference numerals are used for description. The bidirectional serial communication is also performed in the similar technique.

The response member 21 is constructed by cutting away a part of the portion of the first control support 4 constituted by the upper and lower cases 2 and 3 to which the palm abuts, and mounting the resilient members 37A and 37B to close the cut-away portions. Then, it comprises therein, as shown in FIG. 12, a motor 38 being drivingly rotated, and a column-shaped rotating member 41 that is mounted on the rotating shaft 39 of the motor 38 and has a plurality of projections 40 at suitable positions. The resilient members 37A and 37B thus mounted have, as shown in FIG. 13, a structure longer in the longitudinal direction and shorter in the lateral direction at the portion of the first control support 4 where the palm abuts. Therefore, when the column-shaped rotating member 41 rotates, its projections 40 rotate to press the upper portion of the resilient member 37A of the upper case 2 and the lower portion of the resilient member 37B of the lower case 3 so that they are pushed out outward. This can generate vibration by causing the upper and lower portions of the portion of the first control support 4 where the palm abuts to deform or expand outward, and causing the projections 40 to beat the resilient members 37A and 37B, whereby ambience to the user can be enhanced by the feel and feedback function to the dynamic transmission to the palm, as shown in FIGS. 11 and 13.

Figure 14:
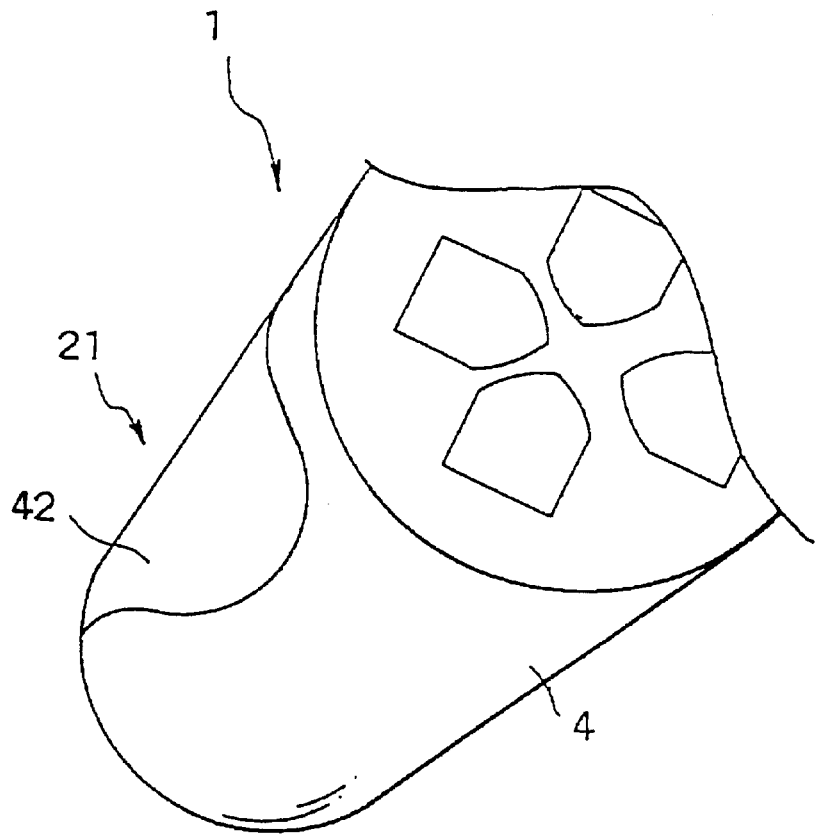
FIG. 14 is a partial plan view showing the control support according to the alternate embodiment.
Figure 15:
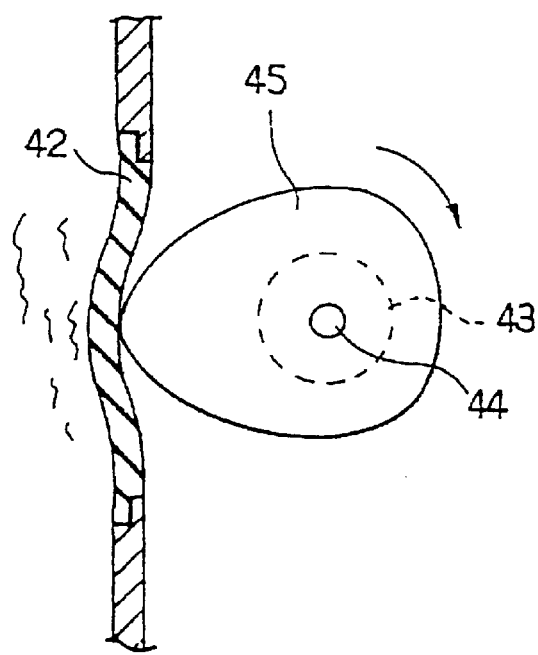
FIG. 15 is a partial sectional view showing the internal arrangement of the control support of FIG. 14.

In addition, description is given on the alternate embodiment of the control module using a response member with a motor 24 by referring to FIGS. 14 and 15.

The game machine control module 1 is arranged, as shown in FIGS. 14 and 15, so that the response member 21 provided on the game machine control module 1 is deformed or expanded. That is, the game machine control module 1 is constructed in such a manner that the first control support 4 supported by the palm of the left hand is formed by a resilient member 42 at a portion where the palm abuts, and mounted therein with a motor 43 and a cam-shaped rotating member 45 mounted on the rotating shaft 44 of the motor 43.

When the motor 43 is drivingly rotated, the cam-shaped rotating member 45 beats or presses the resilient member 42 from inside, causing it to outwardly bulge or deform and also to generate vibration. Its dynamic transmission is received by the palm as bodily sensation, so that ambience can be obtained.

While the two alternate embodiments of the present invention described above is arranged, as shown in FIG. 5, to contain and position in the first control support 4 supported by the palm of the left hand, the response member 21 of the present invention may be contained and positioned, as shown in FIG. 5, in the second control support 5 supported by the palm of the right hand.

In addition, while the two alternate embodiments of the present invention described above are arranged to contain and position the motor 43 of the response member 21 in the first control support 4 supported by the palm of the left hand, it may be contained and positioned, as shown in FIG. 5, in both the first and second control supports 4 and 5.

Furthermore, when the motors are positioned in both the first and second control supports 4 and 5, it may be possible to mount motors or the response members 21 of the same size, or motors with different size (that is, motors generating different magnitude of vibration). Thus, when the motors with different size are mounted, they may be simultaneously or selectively vibrated, so that there is provided another advantage that the performance of the game can be further enhanced.

(2) Second Embodiment

Figure 16:
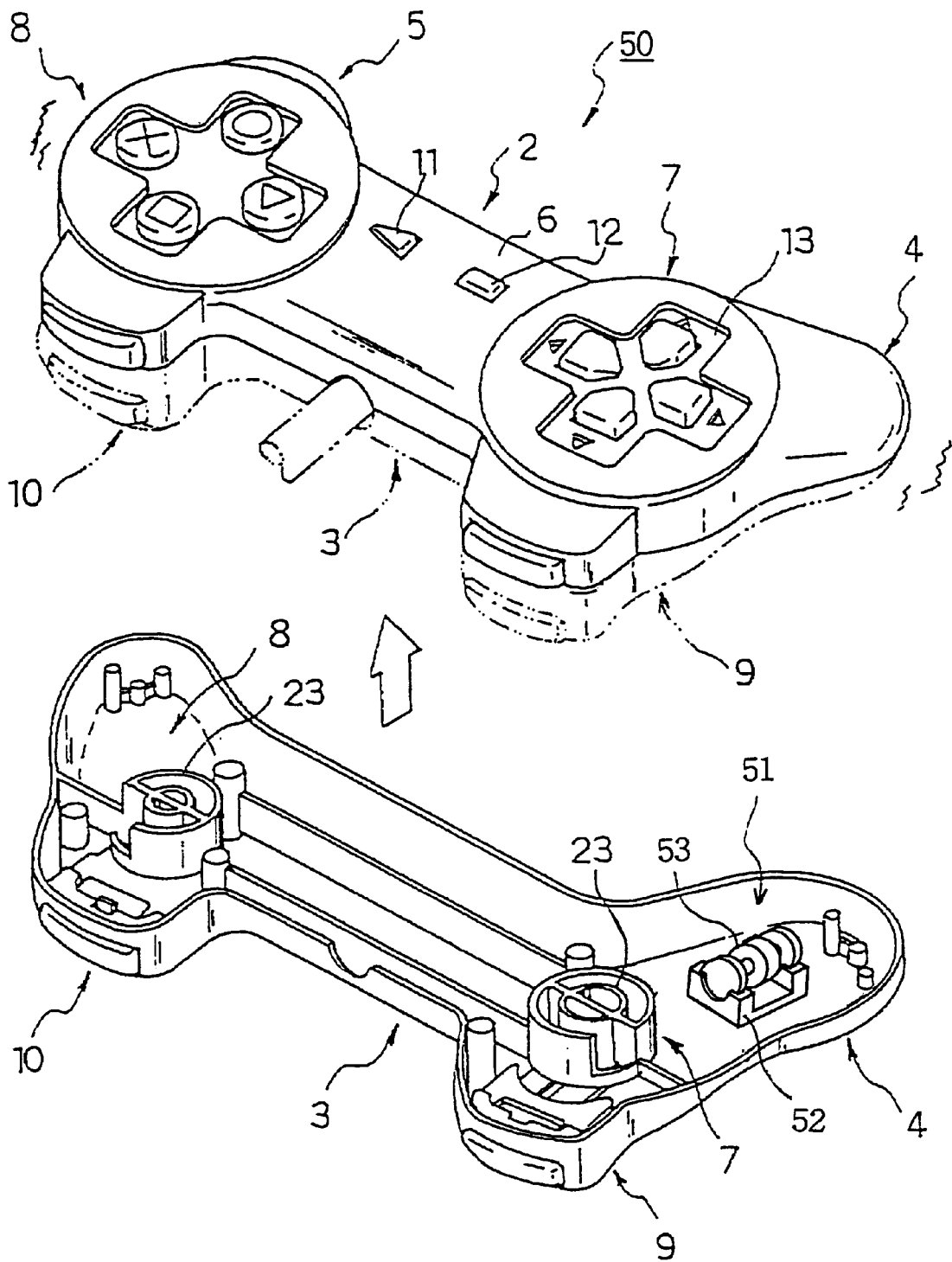
FIG. 16 is a perspective view showing the arrangement of a second embodiment of the game machine control module according to the present invention.

FIG. 16 identifies components corresponding to those in FIG. 2 with the same reference numerals, and shows a second embodiment of the game machine control module according to the present invention, wherein a response member 51 is mounted on a response member positioning section 52 formed in the first control support 4 of the lower case 3. The response member 51 has a linearly reciprocating vibrator 53.

Figure 17:
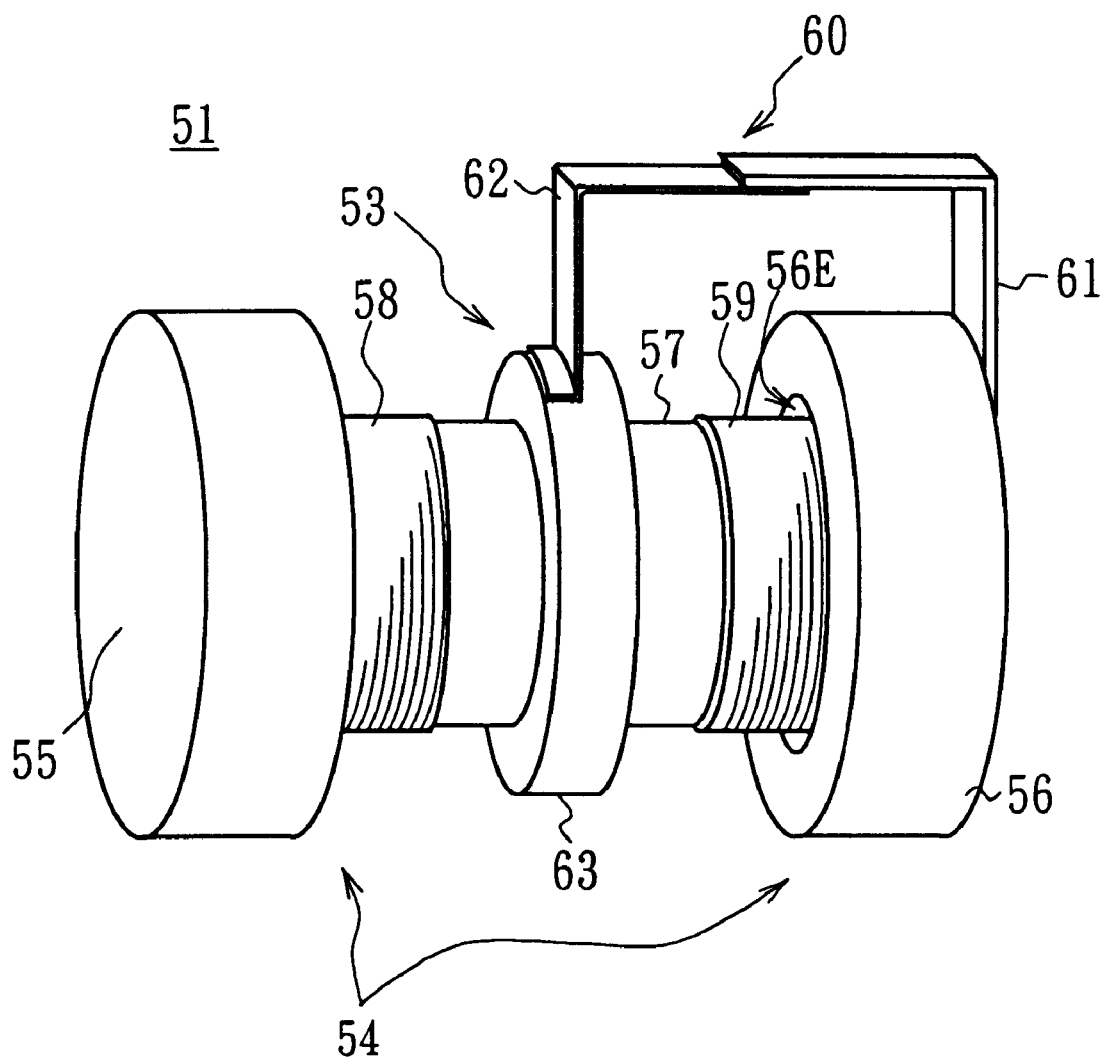
FIG. 17 is a perspective view showing the arrangement of a response member according to the second embodiment.

That is, as shown in FIG. 17, the response member 51 of the second embodiment forms the vibrator 53 by securing a weight 63 substantially at the center of a cylindrical coil bobbin 57, and forms a stator 54 with two magnetic members 55 and 56 that cause the vibrator 53 to reciprocate and oscillate in the axial direction of the coil bobbin 57.

Conductive wires are wound around each end of the coil bobbin in the opposite direction to form a first coil 58 and a second coil 59. The coil bobbin 57 thus mounted with the coils 58 and 59 on each end are loosely inserted with both ends into loose fitting holes 55E and 56E (FIG. 17) drilled in the magnetic members 55 and 56, and is supported so that it can be reciprocated by a hanger 60 consisting of a support member 61 and a leaf spring 62.

Figure 18:
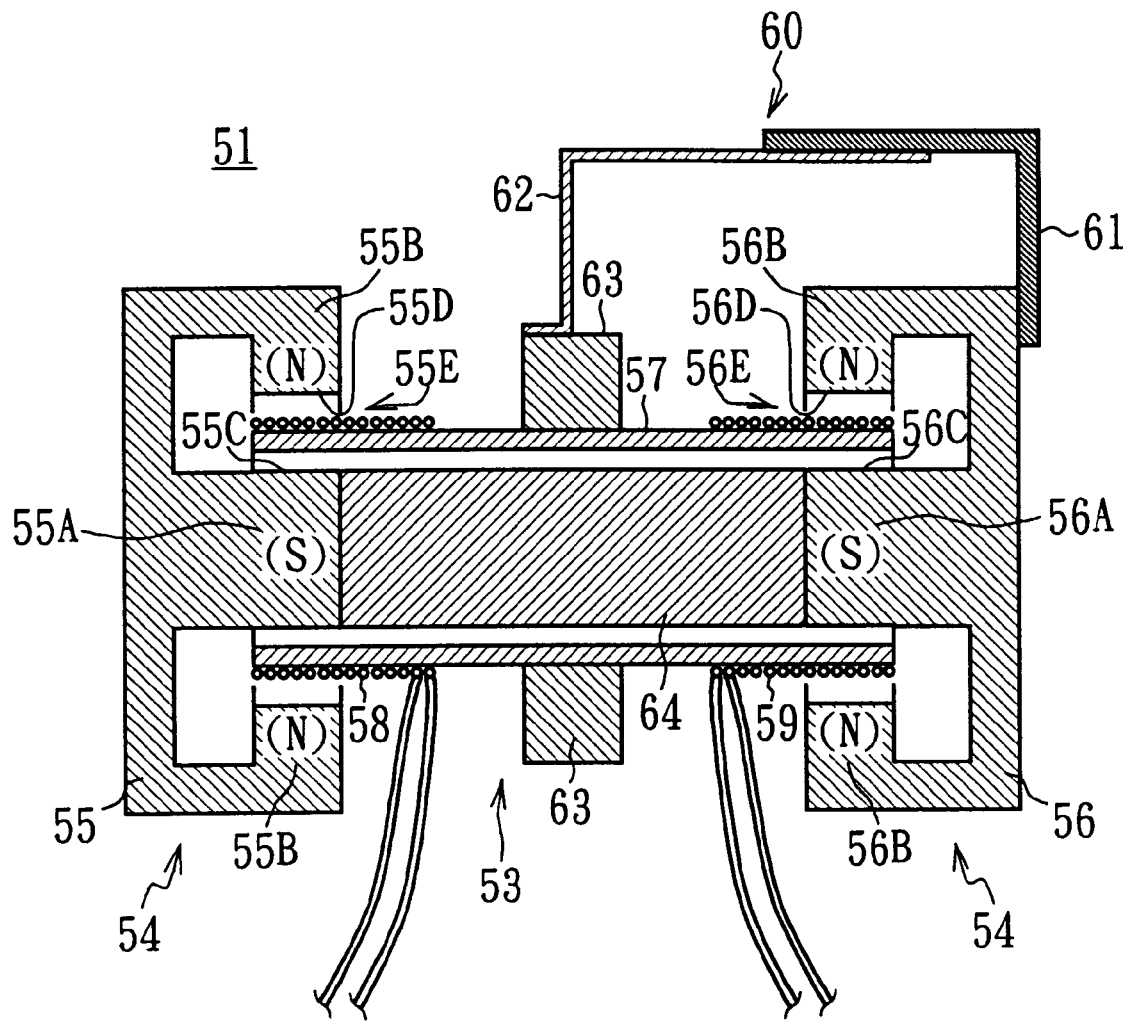
FIG. 18 is a sectional view showing the arrangement of a response member according to the second embodiment.

FIG. 18 shows a sectional view of the response member 51 in which two magnetic members 55 and 56 forming the stator 54 have substantially column-shaped outer shapes, and projectingly formed with column-shaped magnetic poles (S poles) 55A and 56A along their axes. The magnetic members 55 and 56 are formed by inserting and securing a core 64 between these two magnetic poles 55A and 56A. Here, members connected with the magnetic members 55 and 56 is not limited to be the core 64, but may be nonmagnetic resin members.

In addition, ring-shaped projecting magnetic poles (N poles) 55B and 56B are formed at opposite positions with a predetermined interval on the peripheral surfaces of the magnetic poles 55A and 56A, respectively. Accordingly, the magnetic member 55 has magnetic flux density B in the gap between the magnetic poles 55A and 55B (loose fitting hole 55E), while the magnetic member 56 has magnetic flux density B in the gap between the magnetic poles 56A and 56B (loose fitting hole 56E). The loose fitting hole 55E in the magnetic member 55 is loosely fitted with one end of the coil bobbin 57 that forms the vibrator 53, and a coil 58 wound around that end is positioned to cross the magnetic flux. In addition, the magnetic member 56 is similarly arranged so that the other end of the coil bobbin 57 is loosely fitted into the loose fitting hole 56E, and a coil 59 wound around that end is positioned to cross the magnetic flux.

Figure 19A:
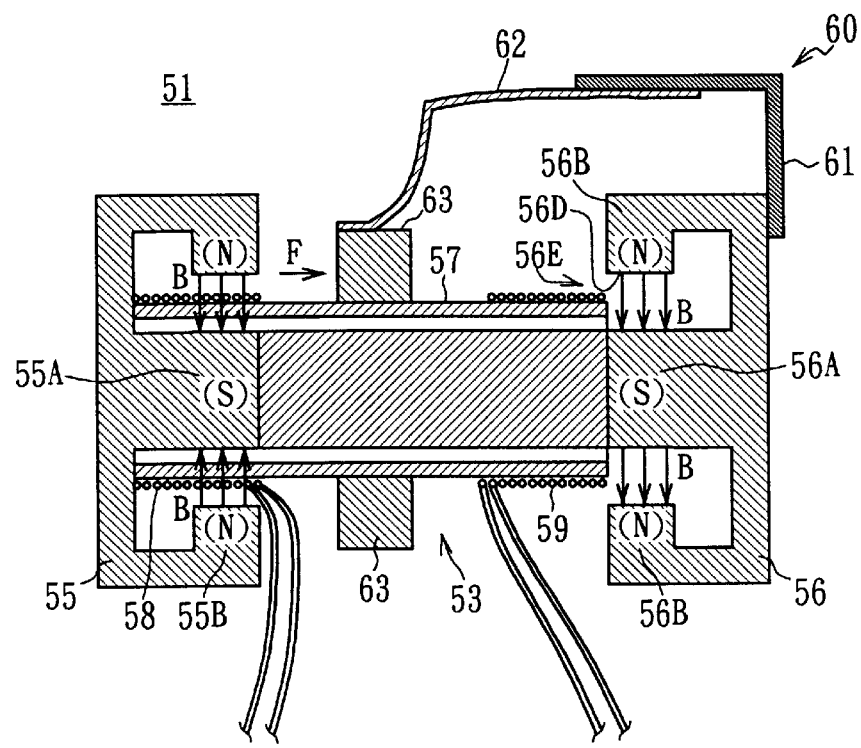
FIGS. 19A and 19B are sectional views used for illustrating the operation of the response member according to the second embodiment.

Here, as shown in FIG. 19A, an initial state is assumed that the end formed with the coil 58 of the vibrator 53 is moved to the left to abut the magnetic member 55. When drive current I58 as shown in FIG. 20A is applied to the coil 58, and drive current I59 as shown in FIG. 20B is applied to the coil 59, in the initial state (time t=0), the drive current $I_{58}$ flows through the coil 58, but the drive current $I_{59}$ does not flow through the coil 59.

Figure 19B:
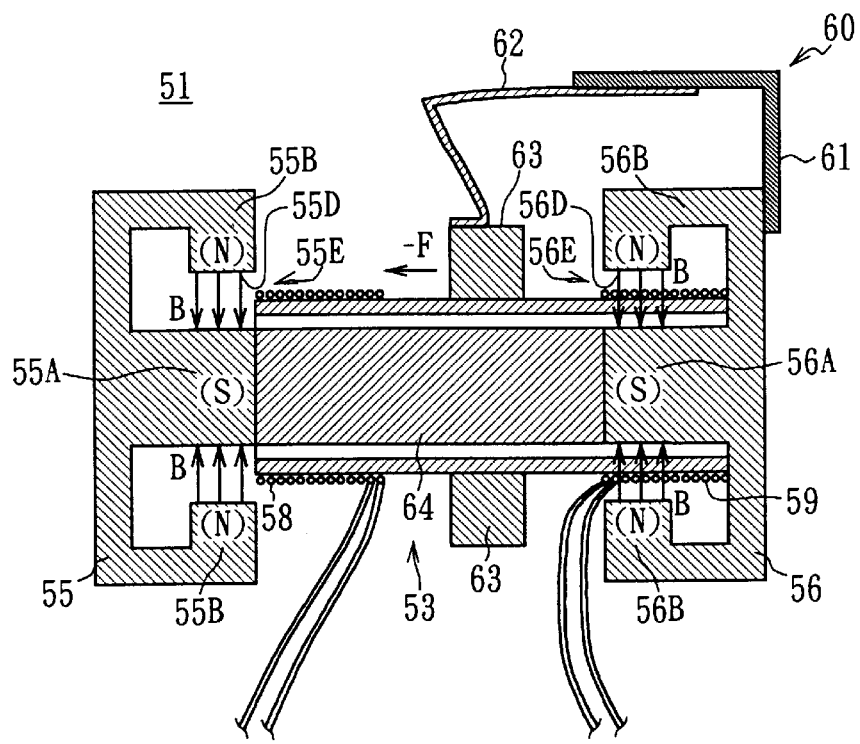

Thus, force F=$I_{58}$×B acts on the coil 58, whereby the vibrator 53 moves to the right (that is, the direction toward the magnetic member 56), and, as shown in FIG. 19B, the end of the vibrator 53 formed with the coil 59 stops at a position where it abuts the magnetic member 56.

Figure 20A:
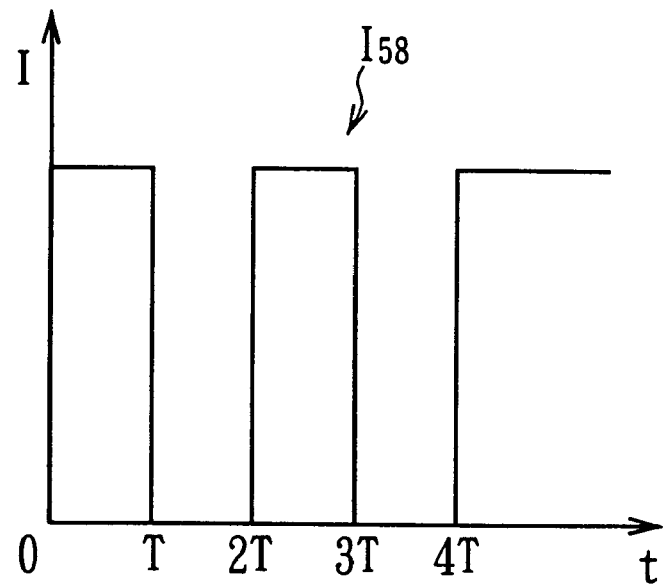
FIGS. 20A and 20B are signal waveforms showing drive current waveforms of a vibrator.
Figure 20B:
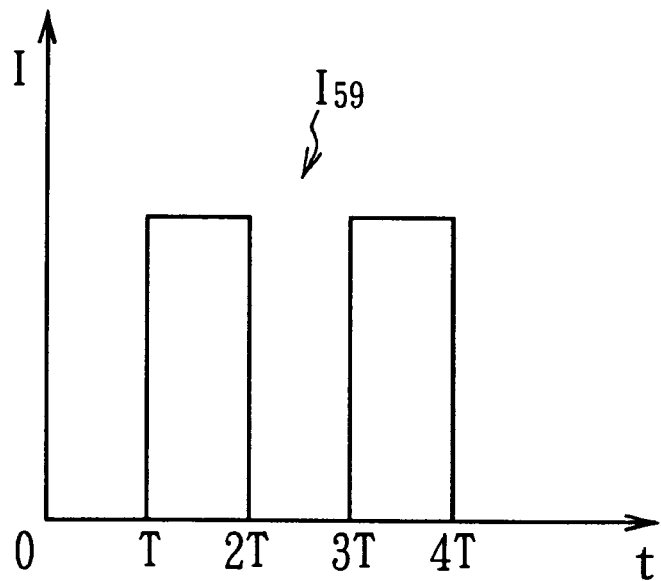

Then, at the time where t=T, the drive current $I_{59}$ flows through the coil 59, as shown in FIG. 20B, and the drive current $I_{58}$ does not flow through the coil 58, as shown in FIG. 20A. Therefore, as the winding direction is opposite on the coils 58 and 59, force −F acts on the coil 59. Consequently, the vibrator 53 moves to the left (that is, the direction toward the magnetic member 55), and returns to the initial state shown in FIG. 19A.

Thus, the vibrator 53 reciprocates or oscillates between the magnetic members 55 and 56 by alternately applying the drive current $I_{58}$ and $I_{59}$ to the coils 58 and 59 in the similar manner.

Incidentally, when the cycles of the drive current $I_{58}$ and $I_{59}$ are changed, the oscillating frequency can be varied for the vibrator 53, while, when the current values of $I_{58}$ and $I_{59}$ are changed, the force F (or, acceleration) acting on the vibrator 53 can be changed. In addition, when the magnetic members 55 and 56 is made larger in their size, the flux density B is increased, so that the force F acting on the vibrator 53 can be increased. In this case, when the magnetic members 55 and 56 are used as the stator 54, unlike to the case where they are mounted on the vibrato, only mass of the stator is increased even if the magnetic members 55 and 56 are made larger, and mass of the vibrator remains unchanged, so that sufficient vibration in practical use can be generated.

Figure 21:
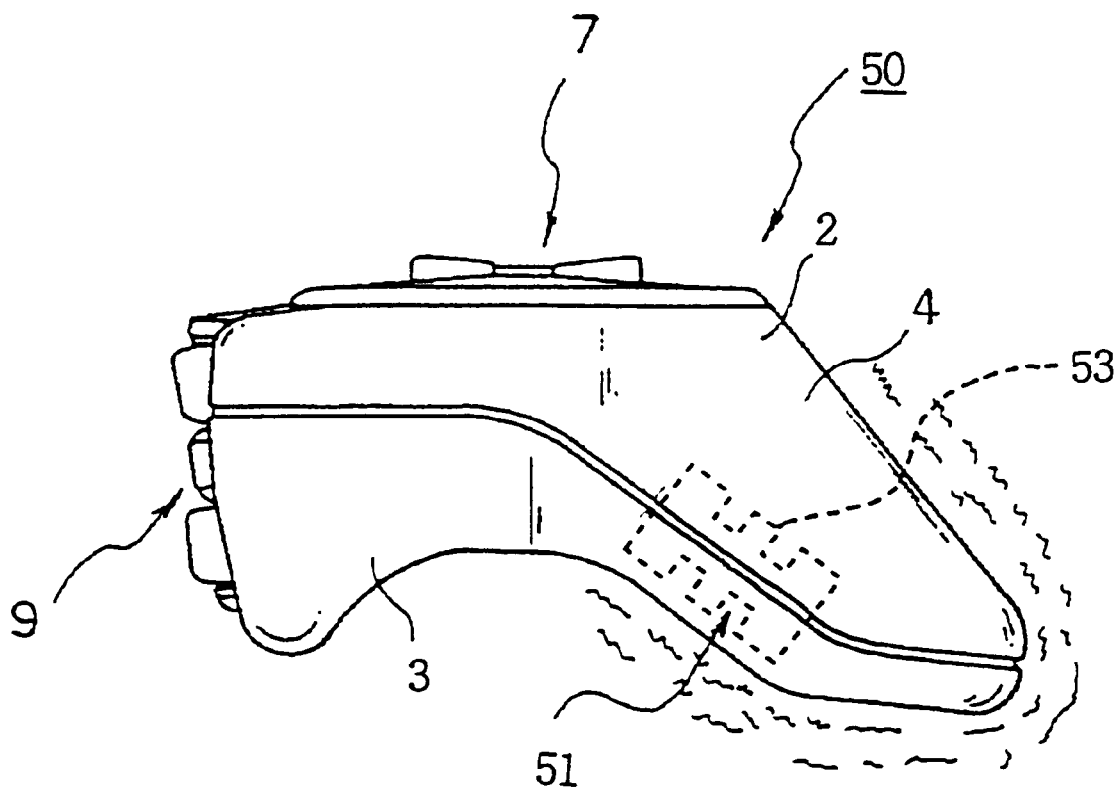
FIG. 21 is a right side view showing a vibrating state of the control module according to the second embodiment.

Thus, when the vibrator 53 is vibrated by applying the drive current $I_{58}$ and $I_{59}$ (hereinafter collectively called the drive current I) to the coils 58 and 59, the vibration is transmitted to the first control support 4 through the response member positioning section 52 securing the stator 54 on the lower case 2 (FIG. 16) (FIG. 21). The vibration transmitted to the first control support 4 is transmitted not only to the first control support 4, but also to the casing of the lower and upper cases 3 and 2, so that the entire module is vibrated. Magnitude of the vibration generated by the vibrator 53 can be arbitrarily varied by the drive current I applied to the coils 58 and 59 of the response member 51, whereby magnitude of the vibration can be varied on the responsive member 51.

Figure 22:
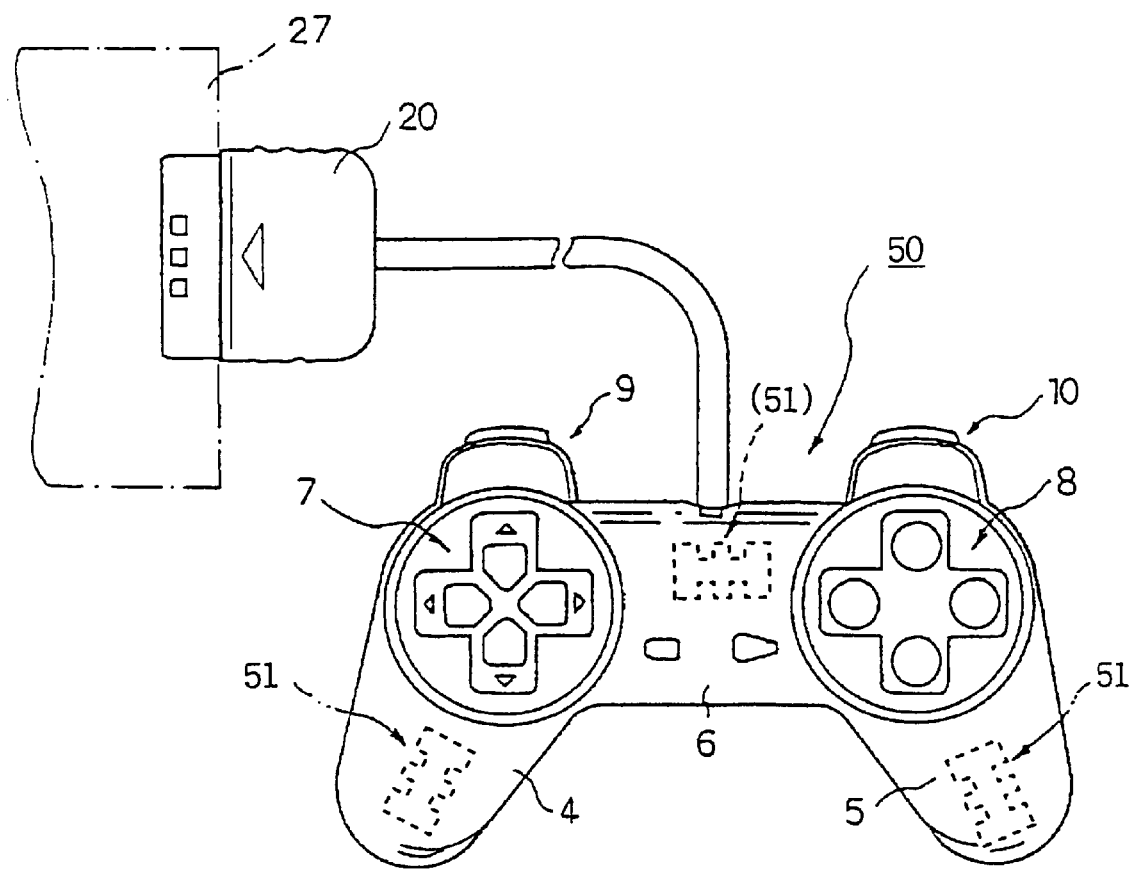
FIG. 22 is a plan view showing the arrangement of a vibrator according to the second embodiment.

Incidentally, a space in which the response member 51 can be mounted may be the space in the positions of the first and second control supports 4 and 5 supported by the palms, or the space existing in front of the start/select section 6 defined between the two control supports 7 and 8, as shown in FIGS. 16 and 22. In the embodiment, it is contained and positioned in the first control support 4 supported by the palm of the left hand.

Figure 23:
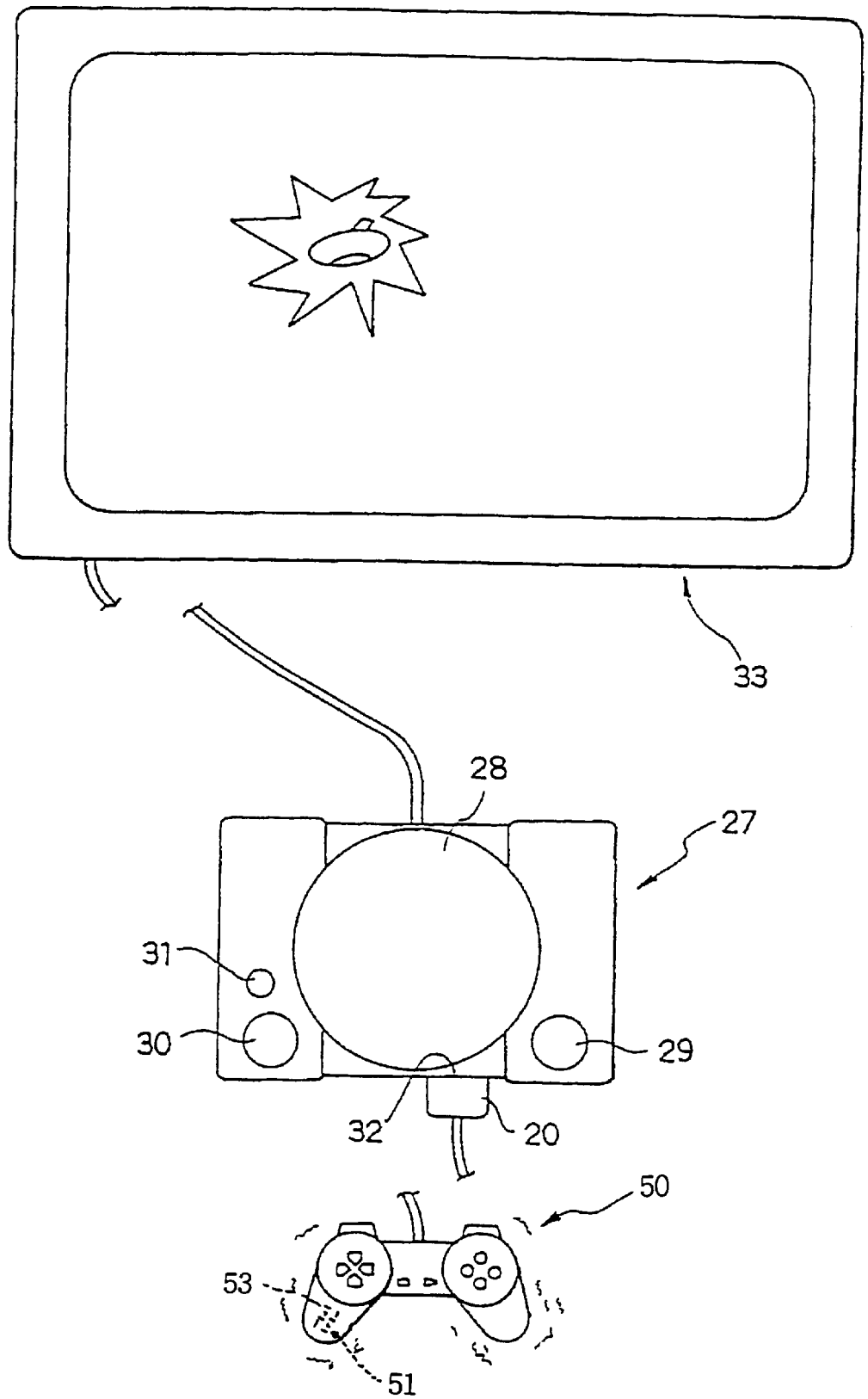
FIG. 23 is a schematic diagram showing an operation state the game machine according to the second embodiment.

Thus, as the response member 51 is mounted in the first control support 4 of the lower case 3, or the portion supported by the palm of the left hand, in playing a game by connecting the game machine control module 50 and the game machine 27 to a monitor 33 of a TV receiver or the like, as shown in FIG. 23, the entire game machine control module 50 can be vibrated for a predetermined period of time by vibrating the vibrator 53 of the response member 51 in response to a specific signal from the game machine 27 depending on the type of a game, for example, when the opponent is defeated in a grappling game, a target is shot in a shooting game, or an action target is an air plane and attacked on the screen. Thus, the game machine control module 50 itself vibrates through operation of the control button by the user to feed back it as bodily sensation to the user, so that ambience can be further improved.

Here, the game machine 27 contains, as shown in FIG. 23, a CD-ROM drive that has a function capable of reproducing a CD-ROM as a video recording medium, and has a lid member 28 on the top thereof for accepting and closing the CD-ROM. It further comprises a closing switch 29 for opening and closing the lid member 28, a power switch 30 for supplying electric power, a reset switch 31 for initializing the operation of the game machine 27, and a connection section 32 capable of connecting two sets of the control modules. When the connector 20 of the game machine control module 50 is connected to the connection section 32, bidirectional communication can be established with the game machine 27. The embodiment is described for an arrangement where one set of the game machine control module 50 is connected. When two sets of the game machine control modules are connected, the operation and arrangement of the other control module are same, the description of which is omitted.

Figure 24:
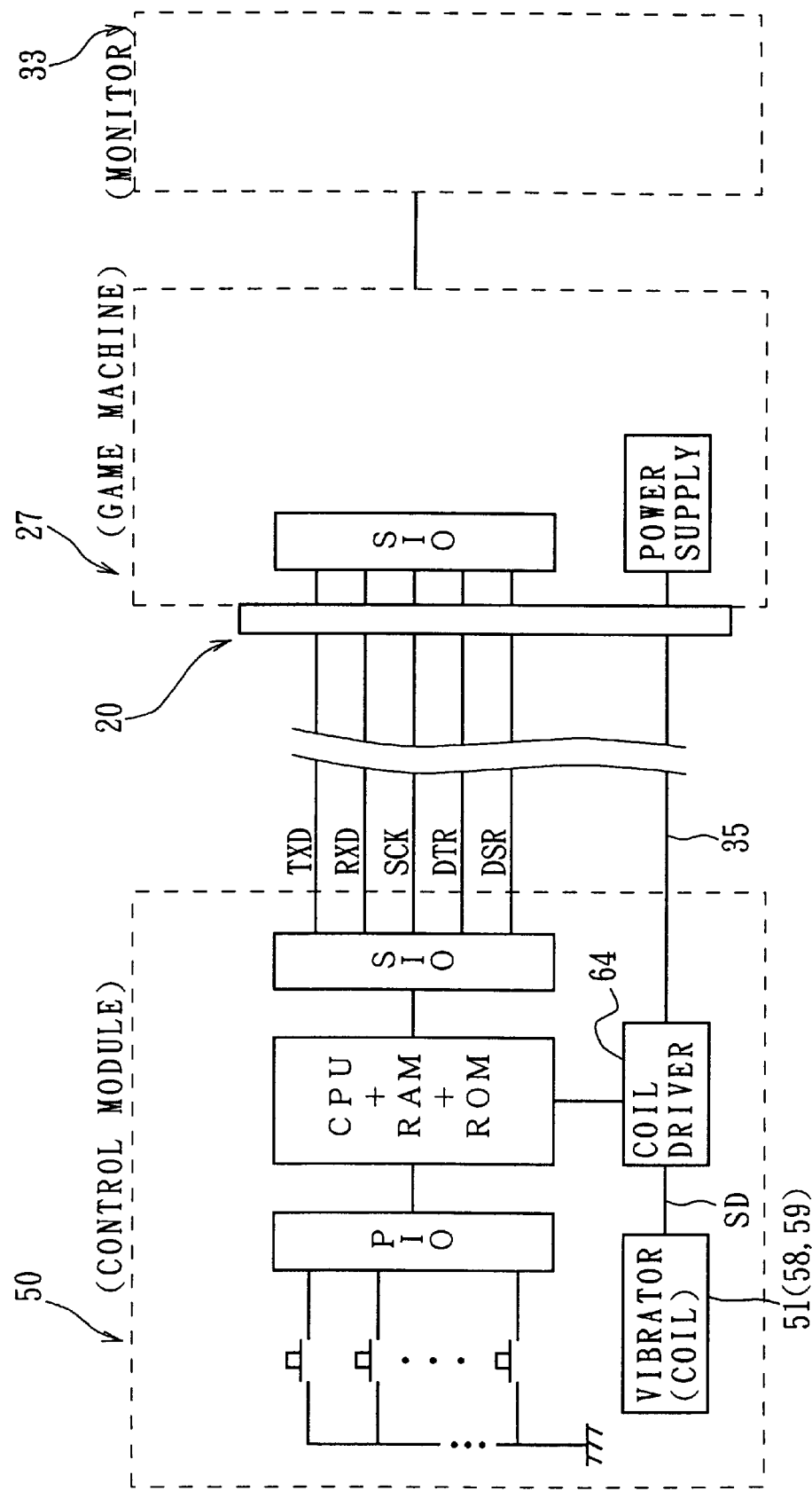
FIG. 24 is a block diagram showing connections of the game machine body and the game machine control module.

In order to vibrate the entire game machine control module 50 bar vibrating the vibrator 53 of the response member 51 as described above, it is necessary to provide a function allowing bidirectional communication between the game machine control module 50 and the game machine 27. The bidirectional communication function can be provided, as shown in FIG. 24, by connecting the connector 20 for bidirectional communication with the game machine control module 50 to the game machine 27.

An arrangement attaining the bidirectional communication function on the game machine control module 50 comprises a serial I/O interface SIO performing serial communication with the game machine 27, a parallel I/O interface PIO for inputting control data from a plurality of control buttons, a one-chip microcomputer consisting of a CPU, a RAM and a ROM, and a motor driver 34 for vibrating the vibrator 53 of the response member 51. The coils 58 and 59 of the vibrator 53 is vibrated by supply voltage and current from a coil driver 64.

The game machine 27 is provided with a serial I/O interface SIO for performing serial communication with the game machine control module 50. When the connector 20 of game machine control module 50 is connected, the serial I/O interface SIO is connected to the serial I/O interface SIO on the game machine control module 50 through the connector 20, whereby bidirectional communication or bidirectional serial communication can be established. Other detailed arrangement of the game machine 27 is omitted.

Signal and control lines for establishing the bidirectional serial communication include a signal line TXD (Transmit X' for Data) for data transmission for sending data from the game machine 27 to the game machine control module 50, a signal line RXD (Received X' for Data) for data transmission for sending data from the game machine control module 50 to the game machine 27, a signal line SCK (Serial Clock) for serial synchronization clock for extracting data from the respective data transmission signal lines TXD and RXD, a control line DTR (Data Terminal Ready) for establishing and interrupting communication of the game machine control module 50 as a terminal, and a control line DSR (Data Set Ready) for flow control for transferring a large amount of data.

In addition, a cable consisting of the signal and control lines for performing the bidirectional communication includes, as shown in FIG. 23, a power supply cable 35 directly led out from the power supply of the game machine 27 in addition to the signal and control lines. The power supply cable 35 is connected to the coil driver 64 on the game machine control module 50 to supply the electric power for rotating the motor.

In procedure for the bidirectional serial communication with such arrangement, the game machine 27 as shown in FIG. 24, for example, first confirm selection data on the control line DTR to cause the game machine 27 to communicate the game machine control module 50, and to capture control data (button information) of the control buttons of the first to fourth control sections 7, 8, 9, and 10. Then, the game machine control module 50 waits for reception of a subsequent signal from the signal line TXD. Then, the game machine 27 issues an identification code identifying the game machine control module 50 to the data transmission signal line TXD. Thus, the game machine control module 50 receives the identification code through the signal line TXD.

As the identification code identifies the game machine control module 50, communication is started with the game machine 27 since then. That is, the game machine 27 sends control data or the like to the game machine control module 50 through the data transmission signal line TXD, whereas the game machine control module 50 sends control data from control by the control buttons or the like to the game machine 27 through the data transmission signal line RXD. In this manner, the bidirectional serial communication is performed between the game machine 27 and the game machine control module 50. This communication is terminated when the game machine 27 outputs selection discontinue data through the control line DTR.

As described, if the bidirectional serial communication function is provided, the game machine control module 50 can send control data mainly from the control buttons to the game machine 27, while the game machine 27 can deliver to the game machine control module 50 dynamic transmission data for vibrating the vibrator 53 of the response member 51. The dynamic transmission data for vibrating the vibrator 53 is preset by a game CD-ROM loaded on the game machine 27, and feedback is performed by the dynamic transmission in a predetermined period of time from the game machine 27 to the game machine control module 50 itself depending on an action target of the game player. This is described in detail in conjunction with the flowcharts of FIGS. 25 and 26 designating components corresponding to those of FIGS. 7 and 8 with the same reference numerals by referring to FIGS. 16 and 24.

The user loads a specific game CD-ROM in the game machine 27, sets start of the game with the start switch 11 of the game machine control module 50 shown in FIG. 16, and sets various functions through operation of the select switch 12, whereby the game is ready for play through operations of the first to fourth control sections 7, 8, 9, and 10.

Figure 25:
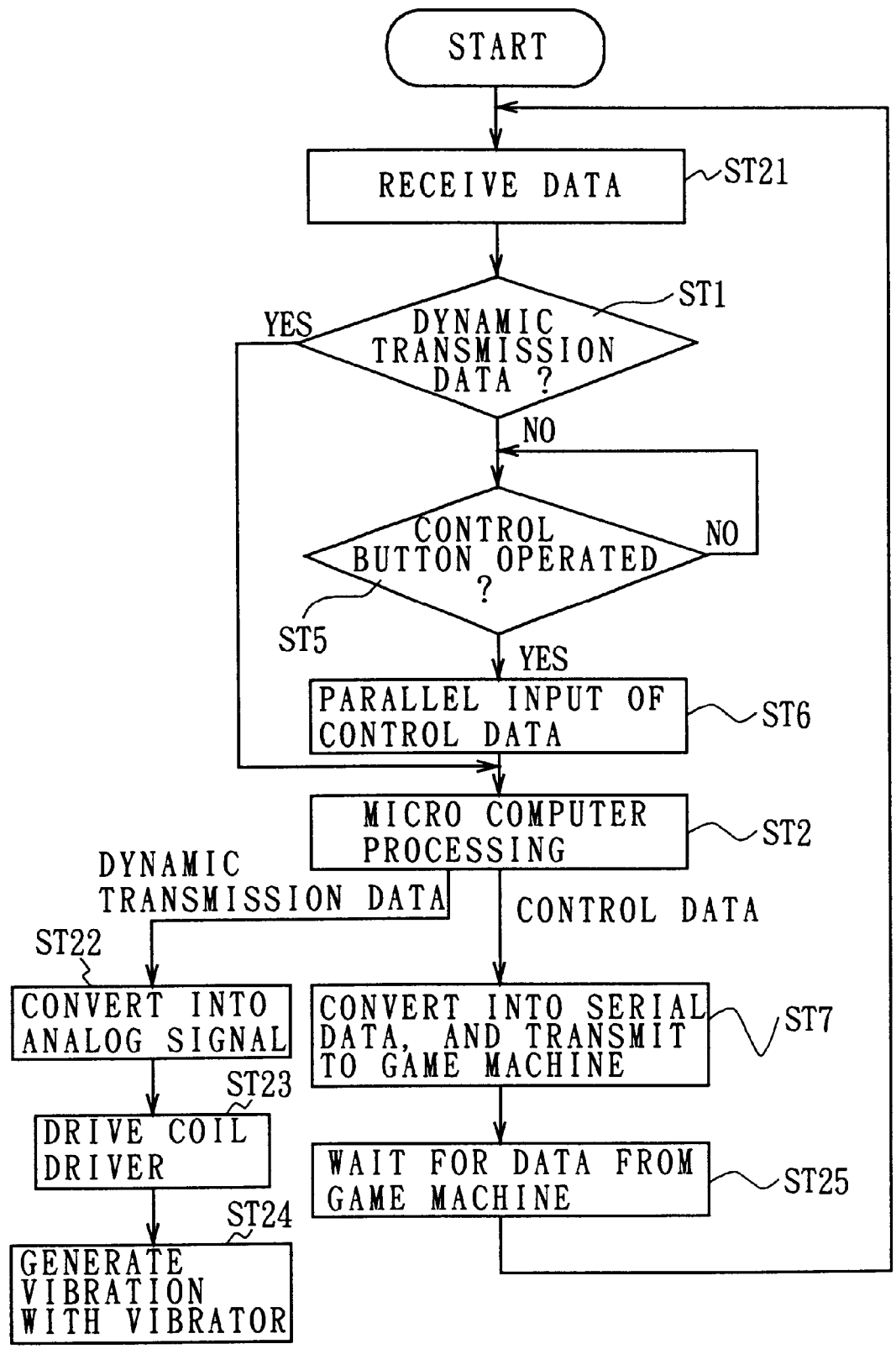
FIG. 25 is a flowchart showing processing procedure on the game machine control module.

Then, as the game is started, the microcomputer of the game machine control module 50 consisting of the CPU, the RAM and the ROM shown in FIG. 24 continuously monitors through the serial interface SIO at step ST21 shown in FIG. 25 that dynamic transmission data for hit is sent from the game machine 27 through the serial I/O interface SIO. The dynamic transmission data contains a control signal for voltage and current for vibrating the vibrator 53 shown in FIG. 24, and duration for vibrating the vibrator 53. Then, as the game progresses, if there is the dynamic transmission data in data sent from the game machine 27, it drives the coil driver 64, and supplies the voltage supplied from the game machine 27 to the coils 58 and 59 of the vibrator 53 for a predetermine period of time.

That is, after step ST1 detects the dynamic transmission data in the data signal received by the game machine control module 50, the microcomputer processes the dynamic transmission data in step ST2. Thee resulting dynamic transmission data is converted into an analog signal in step ST22, which in turn drives the coil driver 64 (FIG. 24) in the following step ST23. Thus, the coil driver 64 supplies the drive current I to the coils 58 and 59 of the vibrator 53 to vibrate the vibrator 53 in step ST24.

In addition, if the data signal supplied to the game machine control module 50 from the game machine 27 is not the dynamic transmission data, the microcomputer of the game machine control module 50 proceeds from step ST1 of FIG. 25 to step ST5, and waits for operation of the control buttons. If affirmative acknowledgment is obtained here, it means that the control button of the game machine control module 50 is operated. In this case, the microcomputer proceeds to step ST6, and captures control data through the parallel I/O interface PIO.

The control data input in the microcomputer is processed by the microcomputer in step ST2 of FIG. 25, and converted into serial data in step ST7, and sent to the game machine 27 through the serial I/O interface SIO (FIG. 24). Thereafter, the game machine control module 50 waits for data from the game machine 27 in step ST25.

Figure 26:
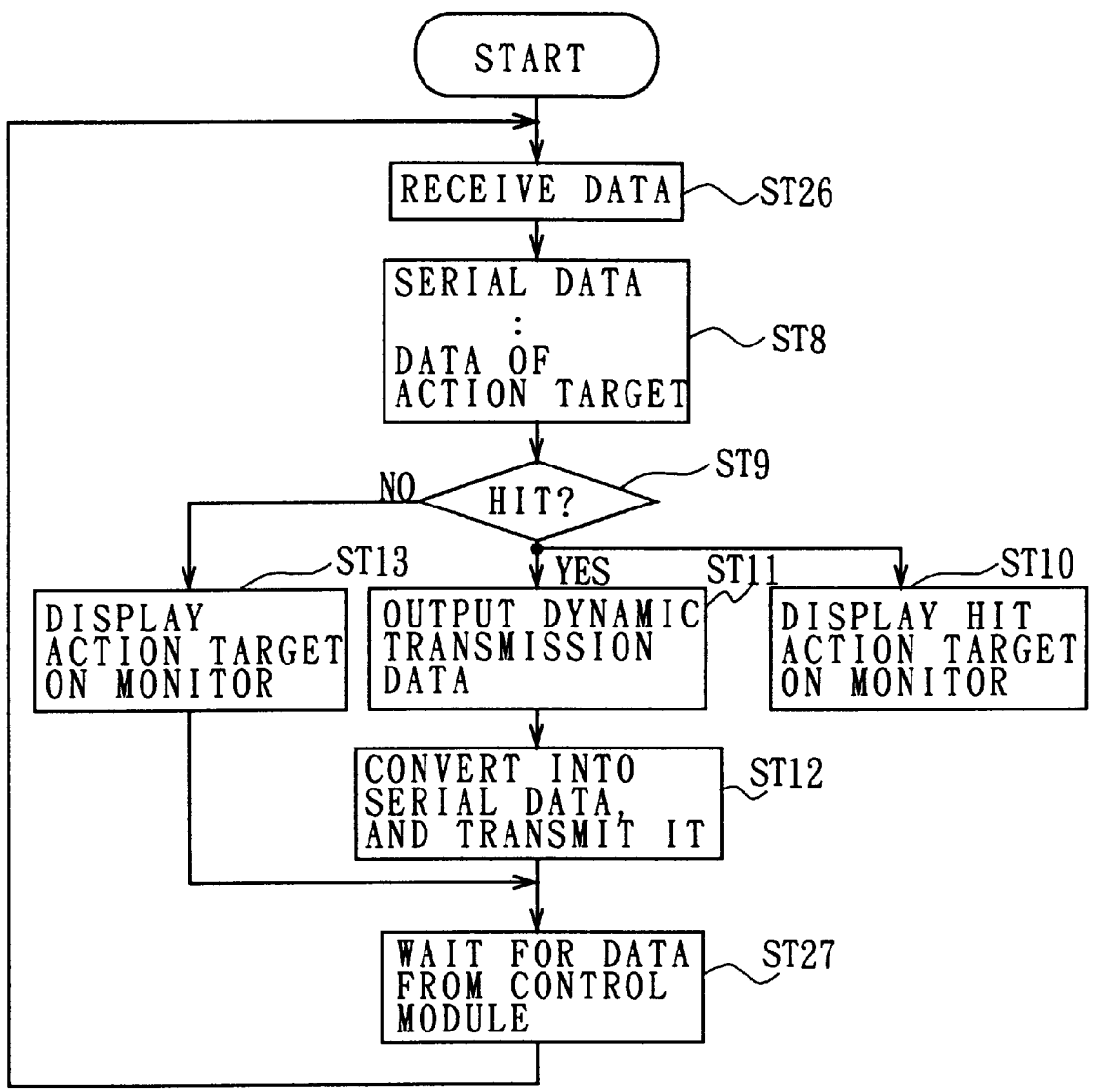
FIG. 26 is a flowchart showing processing procedure on the game machine body.

The game machine 27 receives data from the game machine control module 50 in step ST26 shown in FIG. 26, compares data of the action target with the received serial data in the following step ST8, and determines a hit state in step ST9.

Here, if the data of the action data matches the serial data, that is, if a hit is detected, the process proceeds from step ST9 to step ST10 to display the hit action target on the screen of the monitor, to output the dynamic transmission data in step ST11, to convert it into serial data in step ST12, and to send the serial data to the game machine control module 50 as a specific response signal through the serial I/O interface SIO (FIG. 24). When the dynamic transmission data is detected by the microcomputer of the game machine control module 50 as described in conjunction with steps ST1, ST2, and ST3 of FIG. 25, it supplies electric power to the coils 58 and 59 of the vibrator 53 through the coil driver 64 (FIG. 24) to vibrate the vibrator 53. This vibration vibrates the entire game machine control module 50.

On the other hand, if negative acknowledgement is obtained in step ST9 (FIG. 26), it means that the data of the action target does not match the serial data from the game machine control module 50, that is, that a hit is not detected. In this case, the central processing unit (CPU) of the game machine 27 proceeds to step ST13 to display the action target on the screen of the monitor based on the operation of the control button, and then proceeds to step ST27 to wait for data from the game machine control module 50.

While it is arranged that the dynamic transmission data generated a hit described above is received as a specific response signal by the game machine control module 50 from the game machine 27, the arrangement may be to send it from the game machine 27 to the game machine control module 50 via mono-directional communication.

Figure 27A:
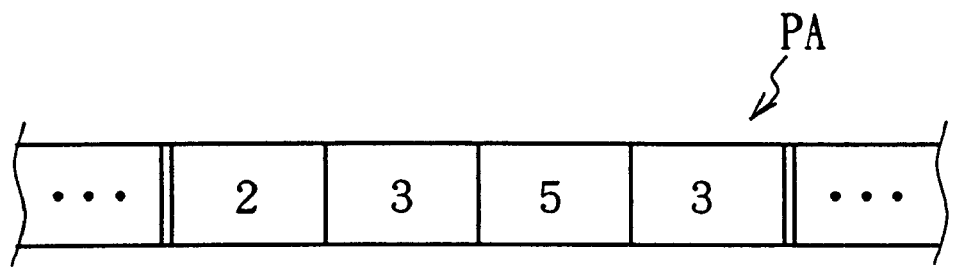
FIGS. 27A and 27B are schematic diagrams and a waveform showing data of current value applied to a coil and a current waveform, respectively.

Here, FIG. 27A particularly shows packet data PA for driving the coils 58 and 59 of the vibrator 53 among the dynamic transmission data sent from the game machine 27 to the game machine control module 50. In this embodiment, one packet is constituted by four current value data. Respective microcomputer of the game machine 27 and the game machine control module 50 process data in every 1/60 seconds (one frame). Accordingly, the packet data PA is also sent from the game machine 27 to the game machine control module 50 in every 1/60 seconds.

Therefore, the drive current value applied to the coils 58 and 59 of the vibrator 53 can be varied by the number of current value data in one frame interval by distributing the four current value data in one packet to one frame interval in every 1/4 frame interval.

In other words, the dynamic transmission data transferred from the game machine 27 to the game machine control module 50 in a frame interval is data processed by the microcomputer of that game machine control module 50, whereby the packet data PA is read out. In the case of FIG. 27A, four current value data "2", "3", "5", and "3" are read out as the packet data PA, converted into analog signals, and delivered to the coil driver 64 described in conjunction with FIG. 23.

Figure 27B:
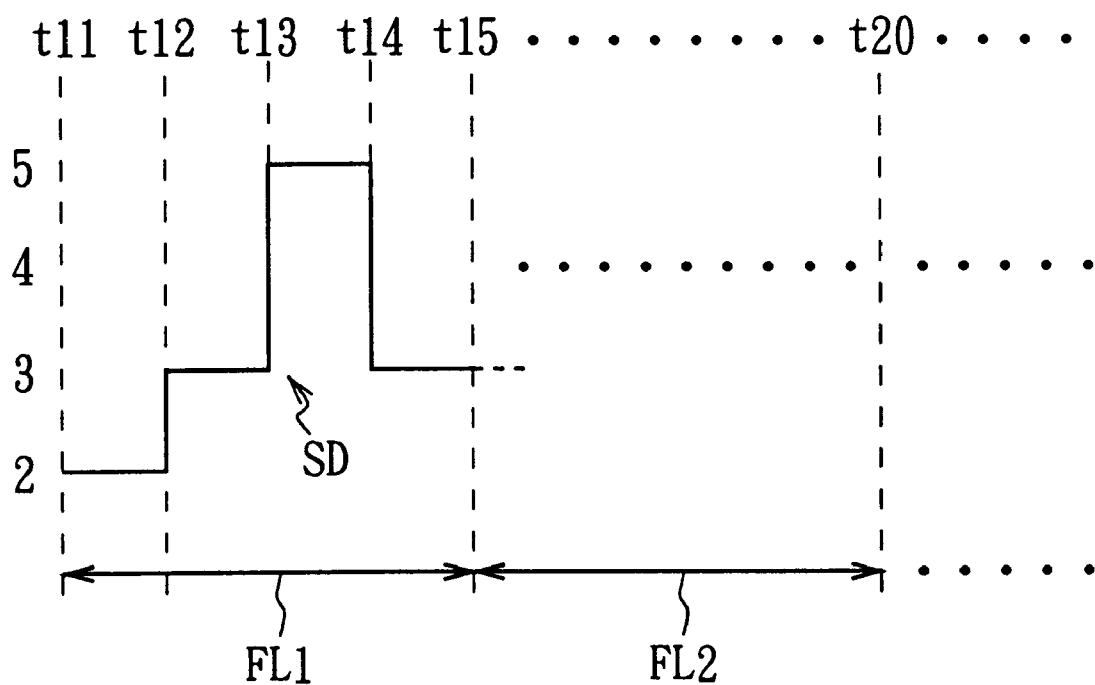

The coil driver 64 obtains a drive current signal SD shown in FIG. 27B by analog amplifying the values converted into analog signals with the electric power supplied from the game machine 27. The drive current signal SD corresponds to the current value data "2", "3", "5", and "3" of the packet data PA. It becomes a current value corresponding to the first current value data "2" for the beginning 1/4 frame (time t11–t12) interval in the first frame interval FL1 (time t11–t15), a current value corresponding to the second current value data "3" for the 1/4 frame following the beginning 1/4 frame (time t12–t13), a current value corresponding to the third current value data "5" for the 1/4 frame following it (time t13–t14), and a current value corresponding to the fourth current value data "3" for the last 1/4 frame (time t14–t15) provided form the coil driver 64 to the coils 58 and 59.

Even if the transfer timing is every 1/60 seconds for the dynamic transmission data transferred from the game machine 27 to the game machine control module 50, it is possible to contain and transfer a plurality of current value data (four for the embodiment) in the packet for that dynamic transmission data, whereby the game machine control module 50 can distribute the plurality of current value data in one frame interval and obtain a drive current signal SD.

Consequently, the vibrator 53 is driven by the drive current signal SD that varies in a time interval shorter than the time interval (one frame interval) where the dynamic transmission data is sent. In this manner, it is possible to set the frequency of the vibrator 53 by arbitrarily varying the waveform of the drive current signal SD with a shorter time interval and various current value data, while acceleration can be set for the rotation of the motor 24 by the current value.

Incidentally, various values are set for the current value data set for the packet data PA depending on magnitude of impact applied on an action target during progress of the game in the game machine 27. In this case, various numbers in addition to four are assigned as the number of current value data assigned to one packet. Therefore, various drive current waveforms are set according to progress of the game, whereby a high current value is alternately applied to the coils 58 and 59 for a short period of time, for example, in a scene where a high impact is applied to the action target, so that large vibration such as an impact is generated on the game machine control module 50. On the other hand, in a scene where low and continuous vibration such as idling of a car is generated on the action target, a low current value is alternately applied to the coils 58 and 59 for a long period of time, whereby vibration as if idling of a car is generated on the game machine control module 50.

Thus, when the response member 51 having the vibrator 53 is used, vibration similar to vibration generated on a virtual action target is generated on the game machine control module 50 according to progress of the game played on the screen, whereby the user operating the game machine control module 50 can experience the game with ambience.

Figure 28:
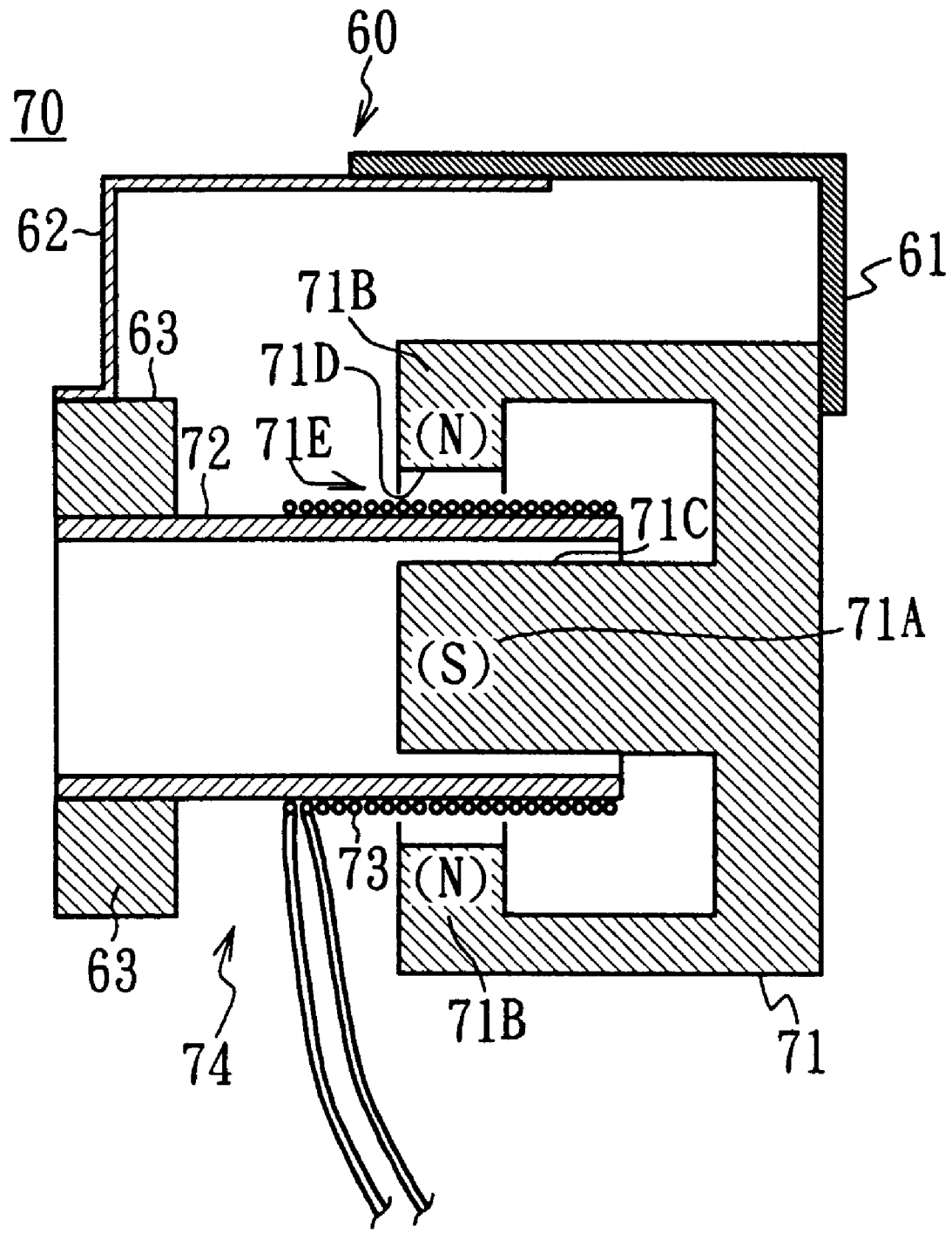
FIG. 28 is a sectional view showing another embodiment of the response member.

While the above-mentioned second embodiment has been described for a case where the vibrator 53 reciprocates between the two magnetic members 55 and 56, the present invention is not limited to such arrangement, but may be arranged to cause one magnetic member 71 to vibrate a vibrator 74 as shown in FIG. 28 identifying corresponding components to those of FIG. 18 with the same reference numerals.

In this case, the vibrator 74 is constituted by forming a coil 73 only on one end of a cylindrical coil bobbin 72, and loosely fitting the coil 73 into a loose fitting hole 71E that is formed between magnetic poles 71A and 71B of the magnetic member 71. In this case, the region of the coil bobbin 72 on which the coil 73 is arranged in such a manner that, in both where the coil bobbin 72 moves to the right most position (that is, in the direction toward the magnetic member 71), and moves to the left most position (that is, in the direction apart from the magnetic member 71), the coil 73 exists at a position crossing the flux in the loose fitting hole 71E.

As described, the response member 70 can be made compact as a whole by arranging the vibrator 74 to be vibrated with one magnetic member 71.

Figure 29:
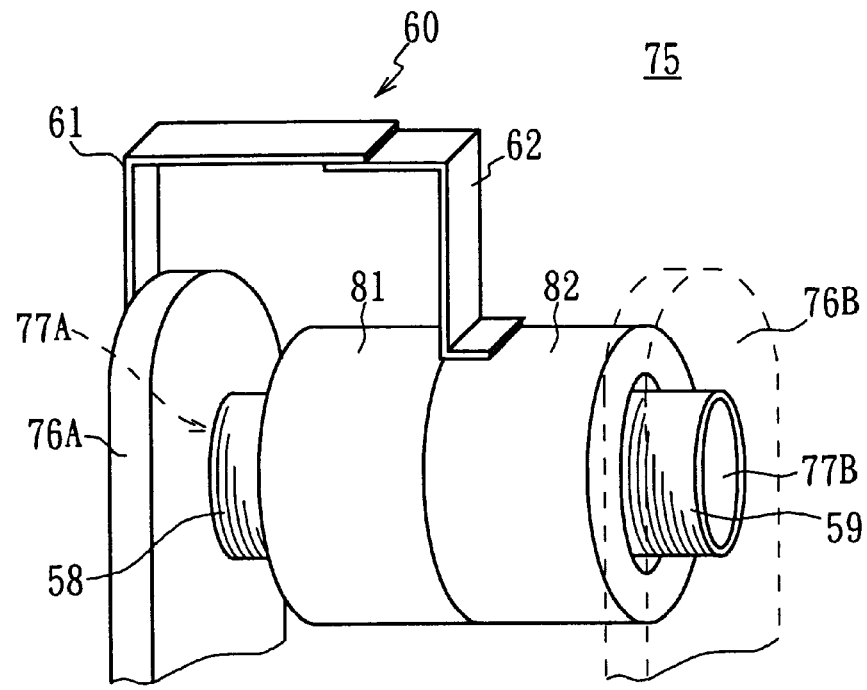
FIG. 29 is a perspective view showing the another embodiment of the response member.
Figure 30:
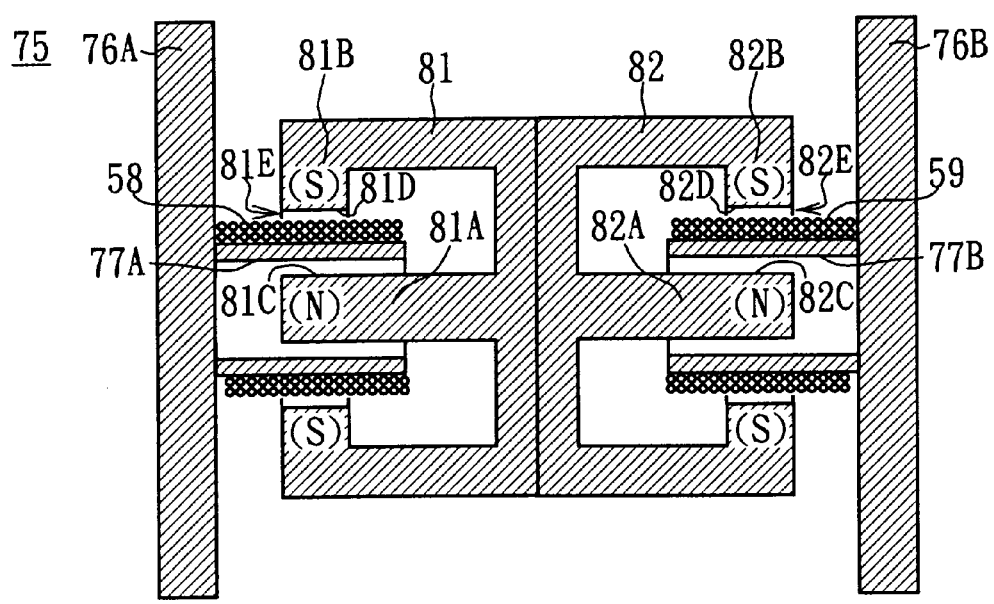
FIG. 30 is a sectional view showing still another embodiment of the response member.

In addition, while the second embodiment described above is described for a case where the coil bobbin 57 formed with the coils 58 and 59 (FIGS. 17 and 18) is vibrated as the vibrator 53, the present invention is not limited to it, but may be arranged, for example, in such a manner that the coils 58 and 59 are used as stators, and magnetic members 81 and 82 are vibrated as vibrators, as shown in FIGS. 29 and 30 designating components corresponding to those of FIGS. 17 and 18 with the same reference numerals.

That is, in FIG. 29, the response member 75 secures coil bobbins 77A and 77B on support members 76A and 76B that are secured on the upper and/or lower cases 2 and/or 3 of the game machine control module. The coil bobbins 77A and 77B are formed with the coils 58 and 59 that are formed by winding conductive wires in opposite directions.

As its sectional view is shown in FIG. 30, the magnetic members 81 and 82 have column-shaped magnetic poles 81A and 82A projecting from its center, and ring-shaped magnetic poles 81B and 82B positioned at opposite locations on the peripheral surfaces of the magnetic poles 81A and 82A with a predetermined interval.

The magnetic member 81 is held by loosely fitting the coil 58 into a loose fitting hole 81E formed between the magnetic poles 81A and 81B, while the magnetic member 82 is held by loosely fitting the coil 59 into a loose fitting hole 82E formed between the magnetic poles 82A and 82B. In addition, the magnetic members 81 and 82 are secured together by their rear surfaces, and held by a hanger 60 to be laterally movable.

Thus, similar to the above-mentioned case in conjunction with FIGS. 20A and 20B, the integrated magnetic members 81 and 82 can be vibrated by alternately applying drive current to the coils 58 and 59, whereby the vibration of the magnetic members 81 and 82 is transmitted to the entire game machine control module through support members 76A and 76B.

Figure 31:
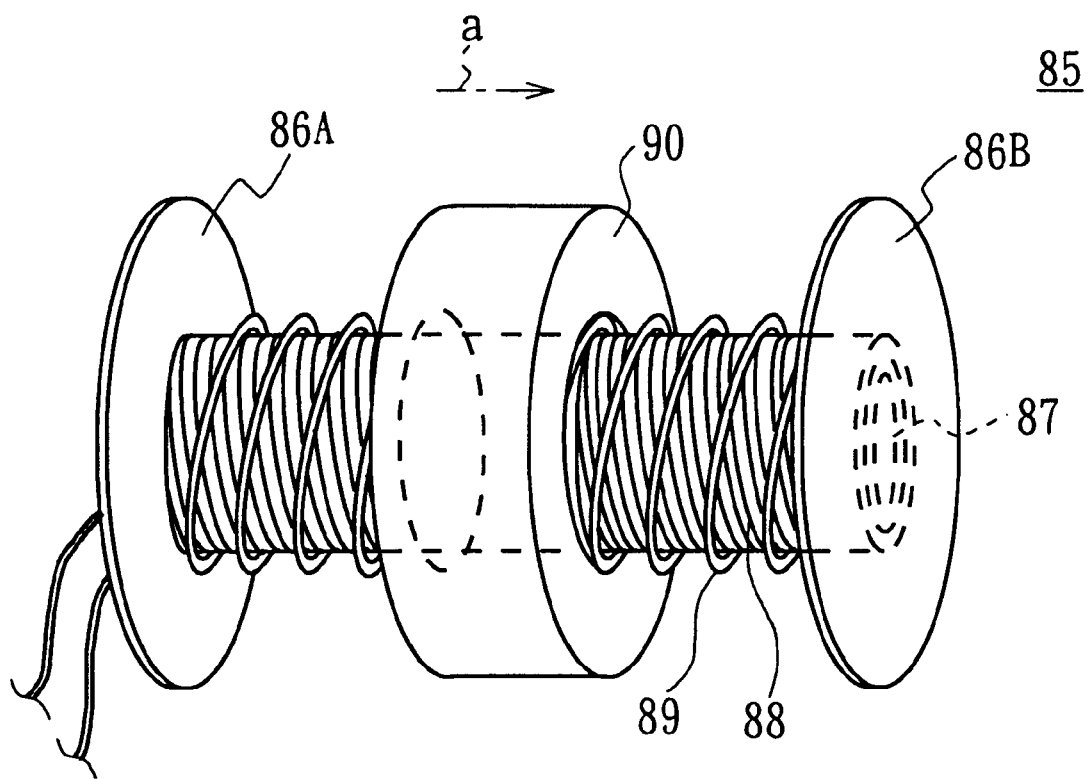
FIG. 31 is a perspective view showing yet another embodiment of the response member.

In addition, while the second embodiment has been described for a case where the coil bobbin 57 formed with the coils 58 and 69 (FIGS. 17 and 18) is vibrated as the vibrator 53, the present invention is not limited to it, but may be arranged to use a coil 88 as a stator and to vibrate a magnetic member 90 as a vibrator, as shown in FIG. 31.

That is, in FIG. 31, a response member 85 is constituted by a coil bobbin 87 secured between support members 86A and 86B secured on the upper and lower cases 2 and 3 of the game machine control module, and a coil 88 that is formed by winding conductive wire around the coil bobbin 67.

A disk-shaped magnetic member 90 is loosely fitted on the coil 88 with a predetermined interval, and held to be capable of rocking in the direction of arrow a and in the opposite direction by a spring 89. When the drive current is not applied to the coil 88, the magnetic member 90 is held substantially at the center of the coil 88 by the spring 89.

Figure 32A:
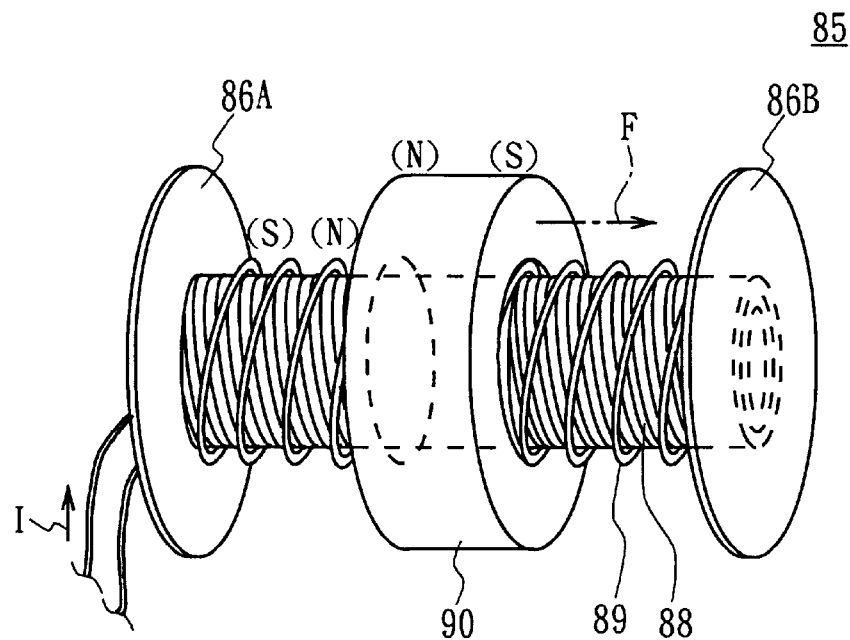
FIGS. 32A and 32B are perspective views showing further another embodiments of the response member.

In this state, when the drive current I is applied to the coil 88 in a predetermined direction, as shown in FIG. 32A, a magnetic field is formed by the coil 88, whereby force F acts on the magnetic member 90, causing it to move in the right direction in FIG. 32A (direction toward the support member 86B). Consequently, the magnetic member 90 moves toward the support member 86B.

Figure 32B:
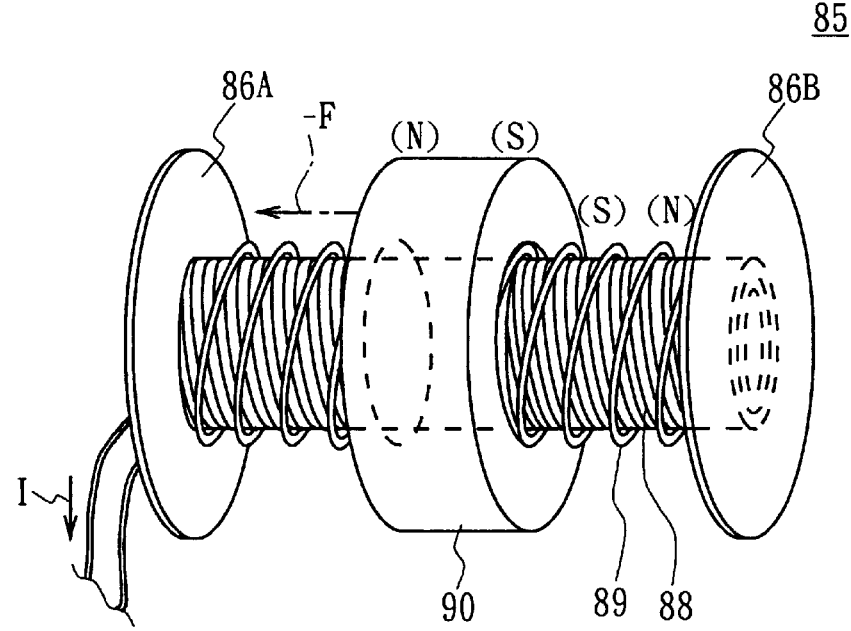

On the other hand, when the direction of the current applied to the coil 88 is reversed, force –F in a direction opposite to the case of FIG. 32A acts on the magnetic member 90, as shown in FIG. 32B. Consequently, the magnetic member 90 moves toward the support member 86A. Thus, the magnetic member 90 can be laterally vibrated by changing over the direction of current applied to the coil 88.

Thus, the vibration of the magnetic member 90 is transmitted to the entire game machine control mule through the support members 86A and 86B.

While the second embodiment of the present invention described above is arranged, as shown in FIG. 22, to contain and position the response member 51 in the first control support 4 supported by the palm of the left hand, it may be contained and positioned, as shown in FIG. 22, in at least two of spaces existing in the locations of the first and second control supports 4 and 5, and in front of the start/select section 6, or in all such spaces.

In addition, when the motors are mounted in at least two of spaces existing in the locations of the first and second control supports 4 and 5, and in front of the start/select section 6, or in all such spaces, it may be possible to mount motors or the response members 51 of the same size, or motors with different size (that is, motors generating different magnitude of vibration). Thus, when the motors with different size are mounted, they may be simultaneously or selectively vibrated, so that there is provided another advantage that the performance of the game can be further enhanced.

Furthermore, while the second embodiment has been described for a case where the game machine control module 50 is constituted by the upper and lower cases 2 and 3 made of hard resin, the present invention is not limited to it, but may be arranged in such a manner that parts of the upper and lower cases 2 and 3 are formed by resilient members, which are in turn vibrated by the response member 51, 70, 75, or 85.

Figure 33:
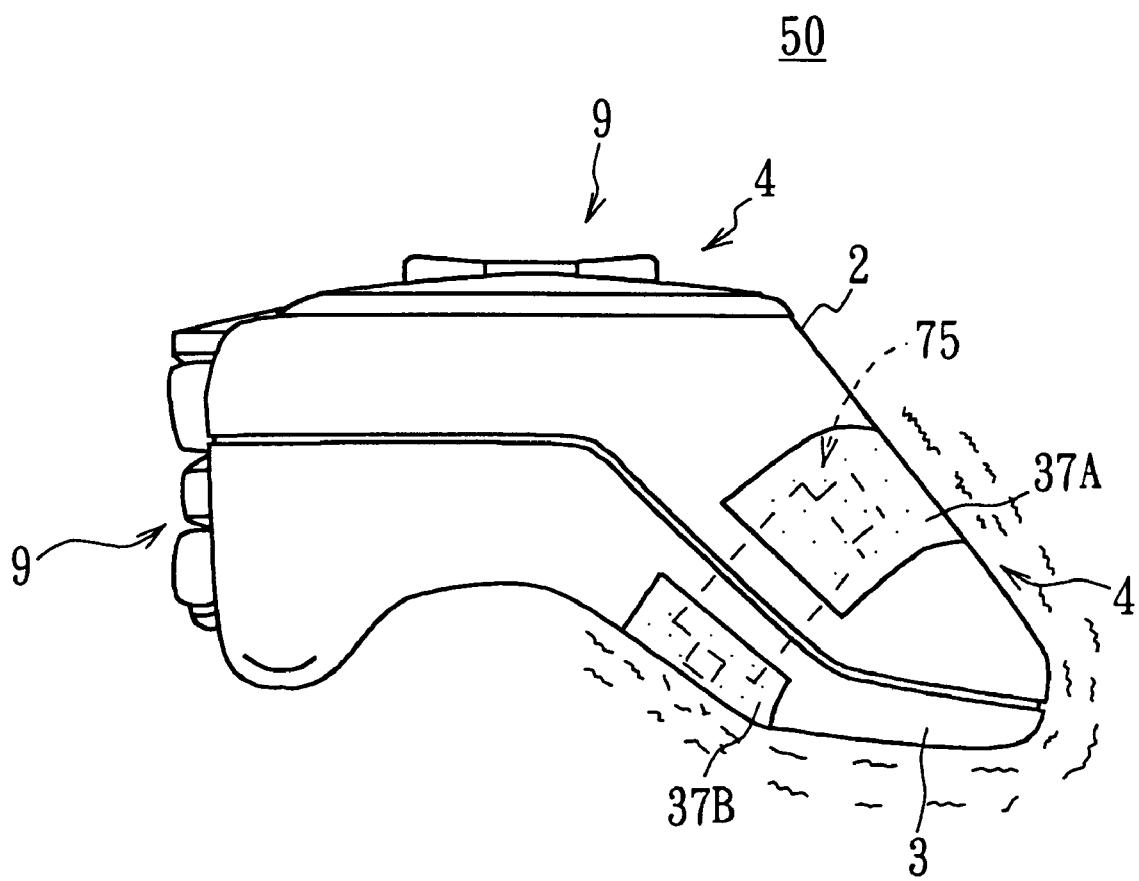
FIG. 33 is a right side view showing a vibrating state of the game machine control module according to an alternate embodiment.

That is, FIG. 33 identifies components corresponding to those of FIG. 11 with the same reference numerals, and shows an arrangement where resilient members 37A and 37B mounted on parts of the upper and lower cases 2 and 3 are vibrated by a response member 75. In the first control support 4 supported by the palm of the left hand, parts of the portion where the palm abuts are cut away, the resilient members 37A and 37B being mounted to close the cut-away parts, and deformed or expanded by relatively or partially pushing out them, whereby dynamic transmission is applied to the palm, or so-called bodily sensation of response is fed back.

Here, the resilient members 37A and 37B may be made of, for example, rubber members, resin members, or fabric members.

Figure 34:
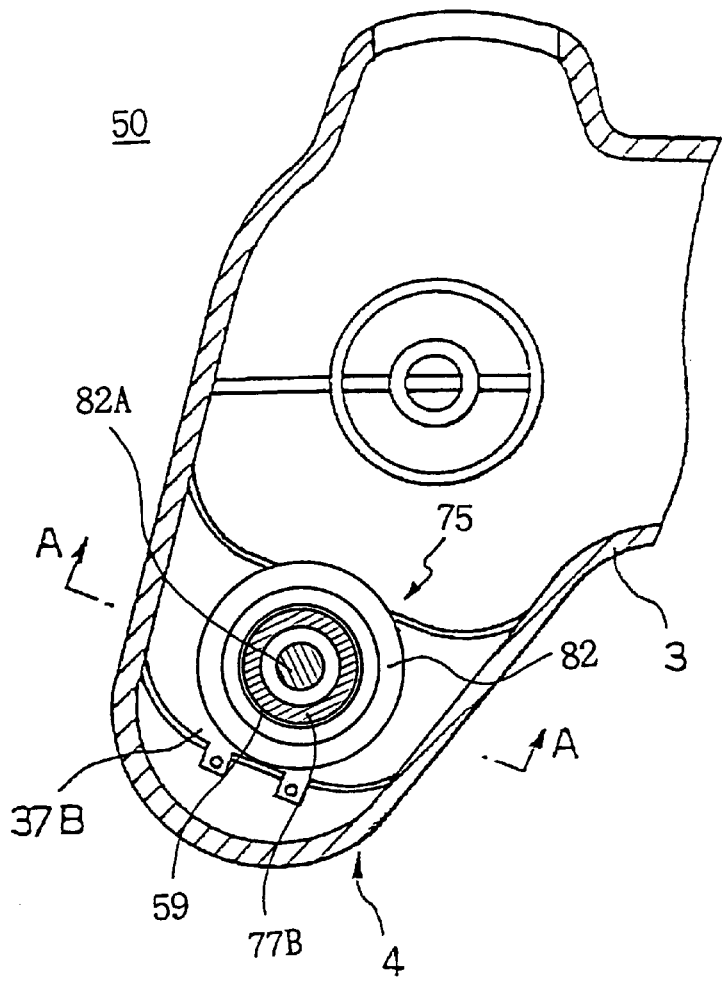
FIG. 34 is a plan view showing the internal arrangement of the game machine control module according to the alternate embodiment.
Figure 35:
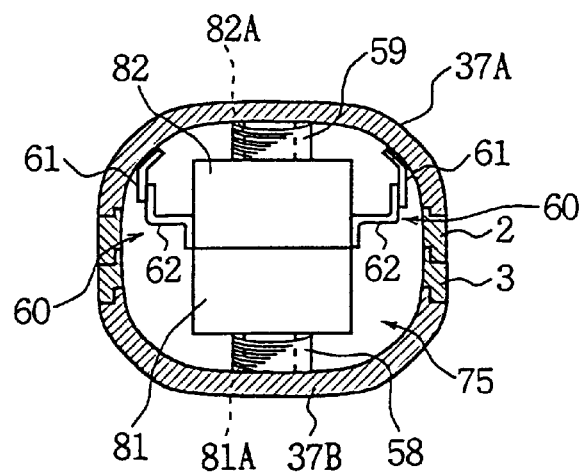
FIG. 35 is a sectional view taken along line A—A of FIG. 33.

The response member 75 is arranged in such a manner that parts of the portions of the first control supports 4 on the upper and lower cases 2 and 3 where the palm abuts are cut away, the resilient members 37A and 37B being mounted to close the cut-away parts. Then, the response member 75 is held therein by a hanger 60, as shown in FIGS. 34 and 35, so that it can vertically moves a vibrator (magnetic members 81 and 82).

In this case, a coil 58 of the response member 75 is secured on the resilient member 37B of the lower case 3 together with its coil bobbin 77A (FIG. 30). A coil 59 is secured on the resilient member 37A of the upper case 2 together with its coil bobbin 77B (FIG. 30). In addition, a column-shaped magnetic pole 81A (FIG. 35) of the magnetic member 81 abuts the resilient member 37B of the lower case 3 through inside of the column-shaped coil bobbin 77A (FIG. 30) formed with the coil 58. A column-shaped magnetic pole 82A (FIGS. 34 and 35) of the magnetic pole 82 abuts the resilient member 37A of the upper case 2 through inside of the column-shaped coil bobbin 77B (FIG. 30) formed with the coil 59.

Therefore, in this state, when drive current is alternately applied to the coils 58 and 59, the vibrator (magnetic members 81 and 82) vertically vibrates, so that the resilient members 37B and 37A are expanded and contracted by the respective magnetic poles 81A and 82A. Consequently, the resilient members 37A and 37B are outwardly deformed or expanded above and below the portions of the first control support 4 where the palm abuts, whereby ambience to the user can be enhanced by the feel and feedback function to the dynamic transmission on the palm.

While the second embodiment has been described for a case where the game machine control module 50 is constituted by the upper and lower cases 2 and 3 made of hard resin, the present invention is not limited to it, but may be arranged in such a manner that parts of the first control support 4 that the user supports with his or her palm of the left hand are formed by resilient members, which are in turn vibrated by the response member 51, 70, 75, or 85.

Figure 36:
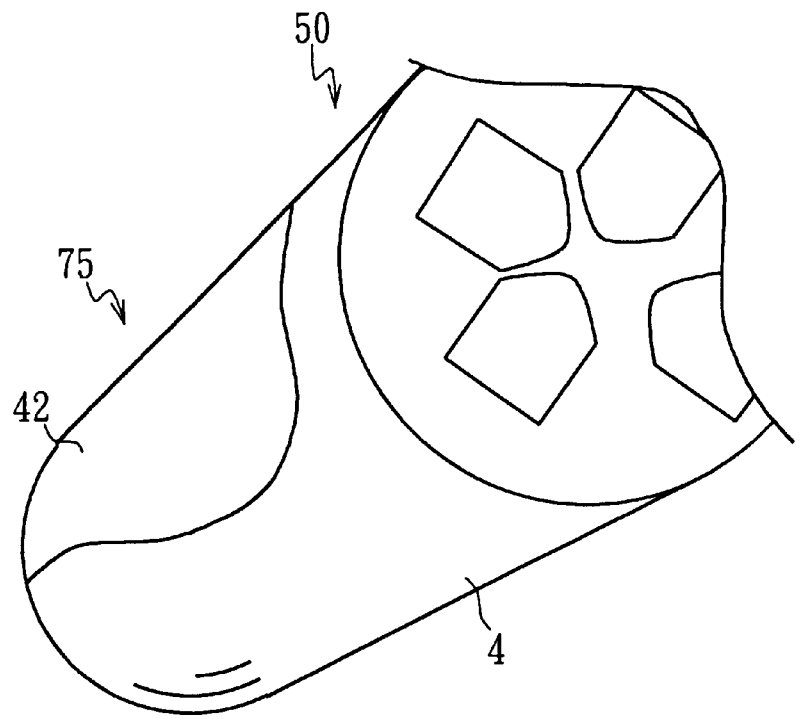
FIG. 36 is a plan view showing the game machine control module according to the alternate embodiment.
Figure 37:
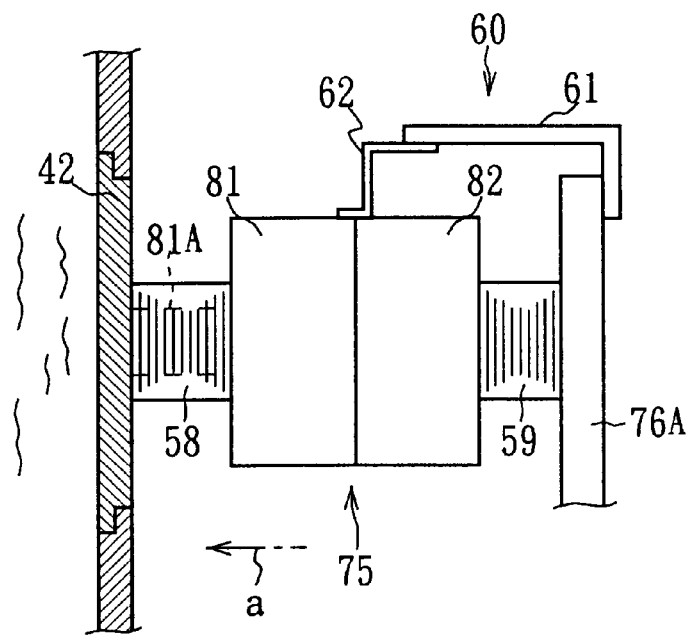
FIG. 37 is a partial sectional view showing the arrangement of the vibrator according to the alternate embodiment.

That is, FIGS. 36 and 37 identify components corresponding to those of FIGS. 14 and 15 with the same reference numerals, and show an arrangement where a resilient member 42 provided at a part of the control support 4 is vibrated by a response member 75. The response member 75 is held therein by a hanger 60.

In FIG. 37, a support member 76A is secured on the upper or lower case 2 or 3. Secured on the support member 76A are the hanger 60 and a coil bobbin 77B (FIG. 30) formed with a coil 59. In addition, a coil bobbin 77A (FIG. 30) formed with a coil 58 is secured inside the resilient member 42. A magnetic pole 81A of a magnetic member 81 abuts the resilient member 42 through inside of the coil bobbin 77A.

Therefore, when drive current is alternately applied to the coils 58 and 59, the magnetic members 81 and 82 are vibrated in the direction of arrow a and the opposite direction, so that the magnetic pole 81A of the magnetic members 81 deforms or expands the resilient member 42 outward. Thus, the dynamic transmission is transmitted to the user as bodily sensation through the palm abutting the resilient member 42, whereby ambience to the user can be enhanced.

While the second embodiment shown in FIGS. 33 and 37 is arranged to contain and position the response member 82 of the present invention in the first control support 4 supported by the palm, it may be contained and positioned, as shown in FIG. 5, in the second control support 5 supported by the palm of the right hand.

In addition, while the second embodiment shown in FIGS. 33 and 37 is arranged to contain and position the motor 24 of the response member 21 in the first control support 4 supported by the palm of the left hand, it may be contained and positioned, as shown in FIG. 5, in both the first and second control supports 4 and 5.

Furthermore, when the motors are positioned in both the first and second control supports 4 and 5, it may be possible to mount motors or the response s of the same size, or motors with different size (that is, motors generating different magnitude of vibration). Thus, when the motors with different size are mounted, they may be simultaneously or selectively vibrated, so that there is provided another advantage that the performance of the game can be further enhanced.

While the second embodiment has been described for a case where the vibrator is linearly vibrated, the present invention is not limited to it, but may use a vibrating method where the vibrator reciprocates along a predetermined curve.

In addition, while the second embodiment has been described for a case where the vibrator is hanged by the leaf spring 62, the present invention is not limited to it, but may use various other hanger means such as a coil spring. In this case, the number of hanger means is not limited to one, but the vibrator may be hanged at a plurality of positions by using a number of hanger means.

Furthermore, while the second embodiment has been described for a case where a current value at each timing of drive current applied to each coil of the response member 51 (or, 70, 75, or 85) is transferred to the game machine control module 50 of the game machine 27 as packet data, the present invention is not limited to it, but may be arranged in such a manner that data representing shapes of drive current waveforms are transferred from the game machine 27 to the game machine control module 50, which in turn generates current waveforms according to the waveform data.

(3) Third Embodiment

Figure 38:
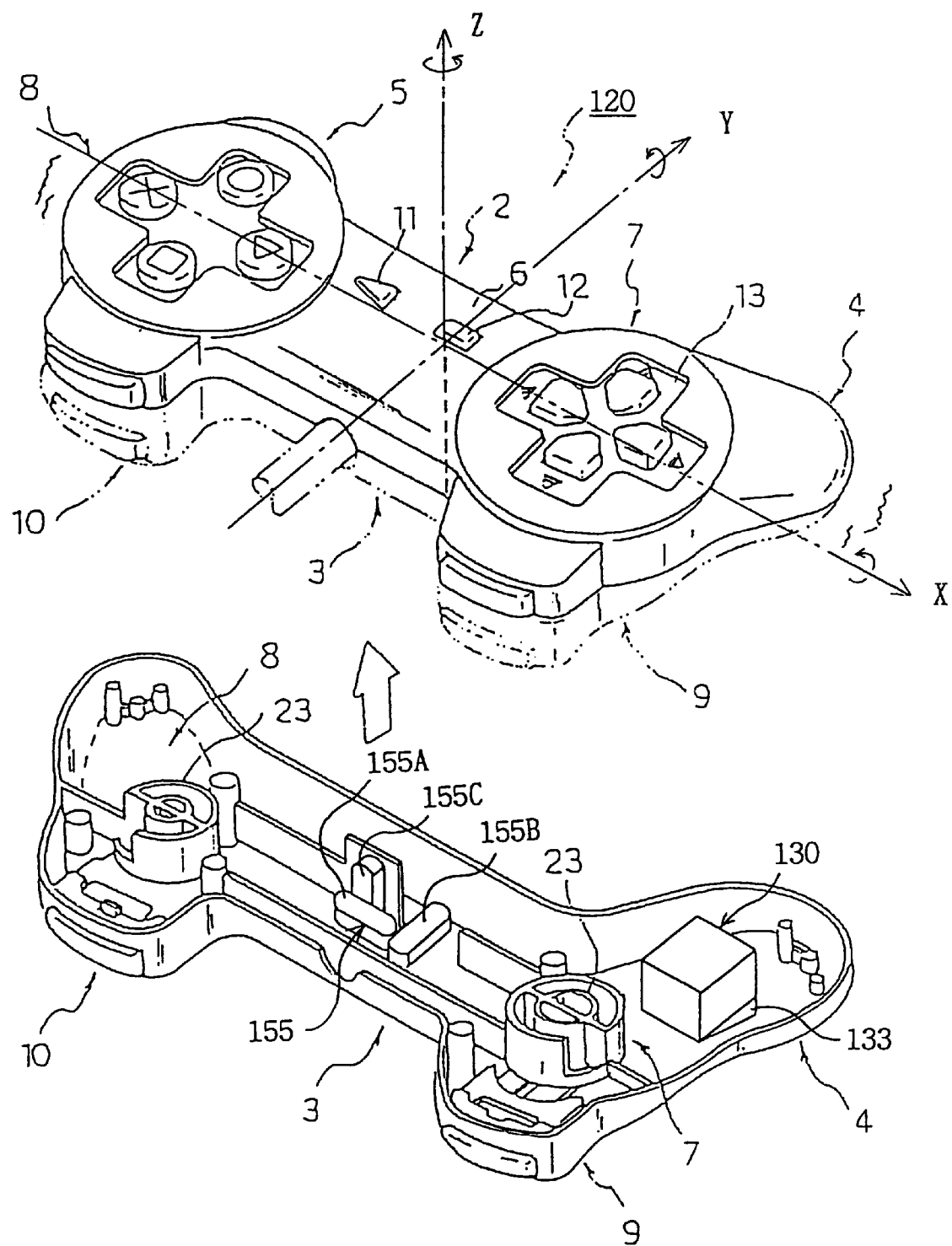
FIG. 38 is a perspective view showing the arrangement of the game machine control module according to a third embodiment.

FIG. 38 identifies components corresponding to those in FIG. 2 with the same reference numerals, and shows a third embodiment of the game machine control module according to the present invention, wherein a response member 130 is substantially horizontally mounted on a response member positioning section 133 formed in the first control support 4 of the lower case 3, and an angular velocity sensor (gyroscope sensor) 155 for the game machine control module 120 is provided substantially at the center region of the lower case 3.

Figure 39:
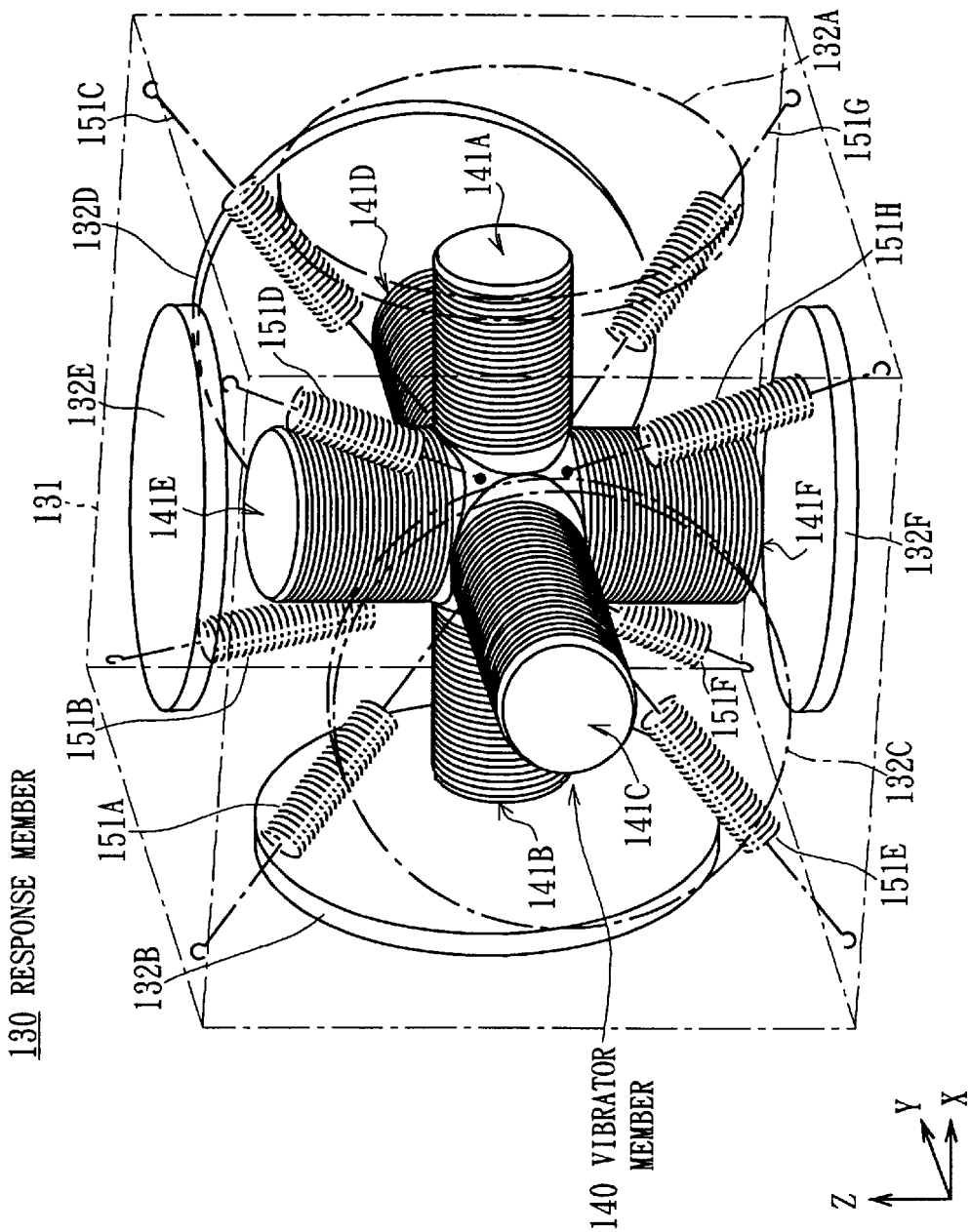
FIG. 39 is a perspective view showing the arrangement of the response member according to the third embodiment.

The response member 130 has, as shown in FIG. 39, a vibrator member 140 that is rockably hanged by a plurality of coil springs 151A–151H in a substantially cubic casing 131 with six sides.

Figure 40:
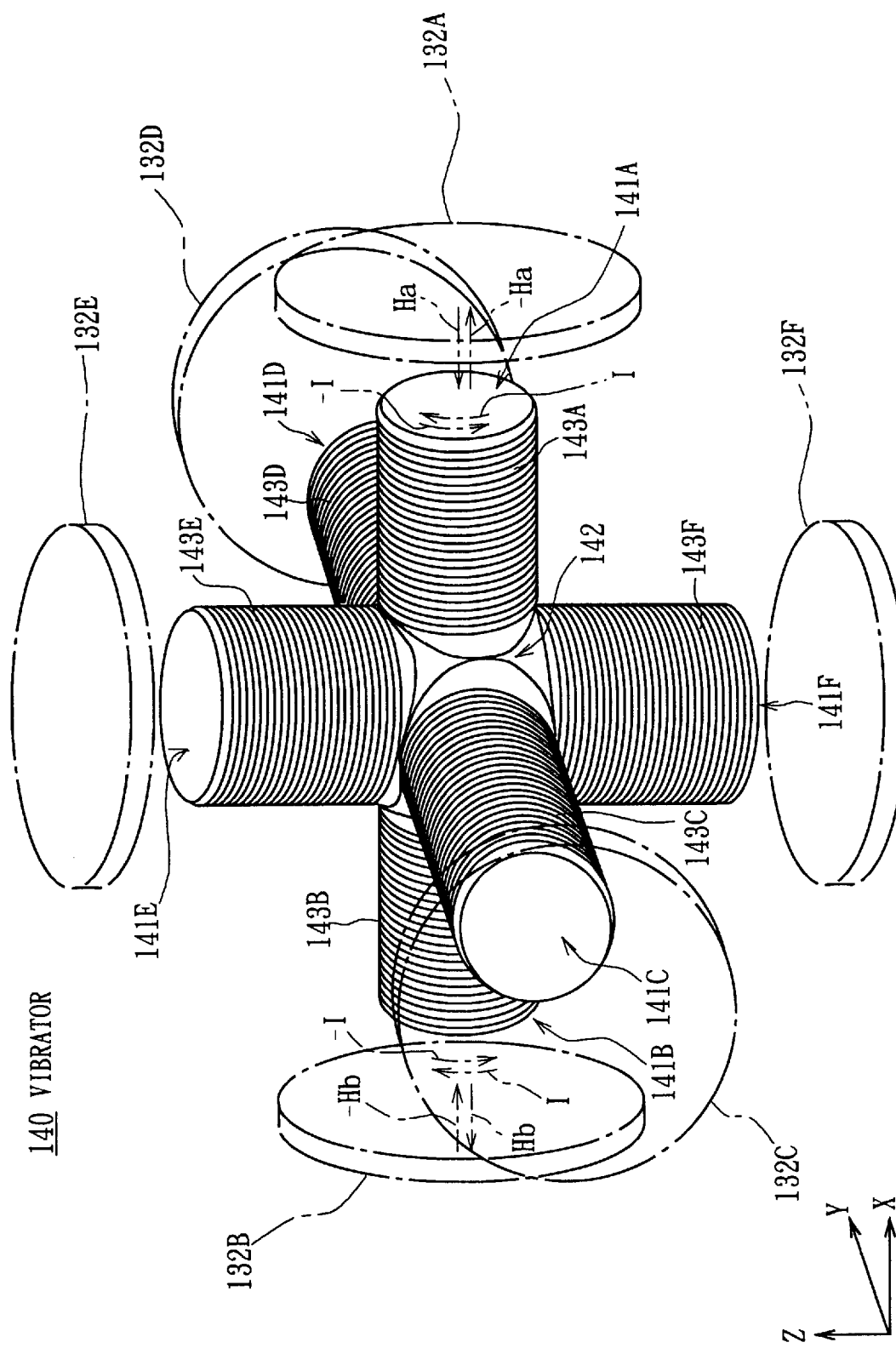
FIG. 40 is a perspective view showing the arrangement of the vibrator member according to the third embodiment.

As shown in FIG. 40 that identifies components corresponding to those in FIG. 39 with the same reference numerals, the vibrator member 140 has X-axis vibrators 141A and 141B vibrating in the X-axis direction, Y-axis vibrators 141C and 141D vibrating in the Y-axis direction, and Z-axis vibrators 141E and 141F vibrating in the Z-axis direction. The vibrators 141A–141F are secured at the center of the vibrator member 140, and integrated as a whole.

The X-axis vibrators 141A and 141B are formed with coils 143A and 143B by winding conductive wires in the same direction around cores, respectively. Therefore, when drive current I is supplied to the coils 143A and 143B, magnetic fields Ha and Hb are generated in the direction corresponding to that of the drive current I.

At the moment, the X-axis vibrator 141A receives attraction from a magnet 132A on the casing 131 (FIG. 39) opposite to the end of the X-axis vibrator 141A, and moves in a direction closing to the magnet 132A. On the other hand, the X-axis vibrator 141B receives repulsion from a magnet 132B on the casing 131 (FIG. 39) opposite to the end of the X-axis vibrator 141B, and moves in a direction separating from the magnet 132B. Consequently, the vibrator member 140 integrated with the X-axis vibrators 141A and 141B is moves as a whole in the same direction as these vibrators (positive direction of X-axis).

On the other hand, when drive circuit (–I) is supplied to the coils 143A and 143B of the X-axis vibrator 141A and 141B in the opposite direction to the drive current I, magnetic fields –Ha and –Hb are generated in the direction corresponding to the drive current –I.

At the moment, the X-axis vibrator 141A receives repulsion from the magnet 132A, and moves in a direction separating from the magnet 132A. On the other hand, the X-axis vibrator 141B receives attraction from the magnet 132B, and moves in a direction closing to the magnet 132B. Consequently, the vibrator member 140 integrated with the X-axis vibrators 141A and 141B moves as a whole in the direction same as the X-axis vibrators 141A and 141B (negative direction of X-axis).

Thus, the vibrator member 140 as a whole oscillates between the magnets 132A and 132B in the X-axis direction by changing the direction of the drive current I supplied to the X-axis vibrators 141A and 141B in a short period of time.

Similarly, on the Y-axis vibrators 141C and 141D, by supplying drive current to coils 143C and 143D wound around the Y-axis vibrators 141C and 141D, respectively, while changing its direction, the Y-axis vibrators 141C and 141D oscillate in the Y-axis direction between magnets 132C and 132D of the casing 131 (FIG. 39) opposite to the ends of these vibratos. Consequently, the vibrator member 140 integrated with the Y-axis vibrators 141C and 141D vibrates as a whole in the direction same as the Y-axis vibrators 141C and 141D (direction of Y-axis).

Furthermore, similarly, on the Z-axis vibrators 141E and 141F, by supplying drive current to coils 143E and 143F wound around the Z-axis vibrators 141E and 141F, respectively, while changing its direction, the Z-axis vibrators 141E and 141F oscillate in the Z-axis direction between magnets 132E and 132F of the casing 131 (FIG. 39) opposite to the ends of these vibrators. Consequently, the vibrator member 140 integrated with the Z-axis vibrators 141E and 141F vibrates as a whole in the direction same as the Z-axis vibrators 141E and 141F (direction of Z-axis).

Incidentally, when the cycle of the drive current I is changed, the oscillating frequency can be varied for the vibrator member 140, while, when the current value of I is changed, the force F (or, acceleration) acting on the vibrator member 140 can be changed.

Figure 41:
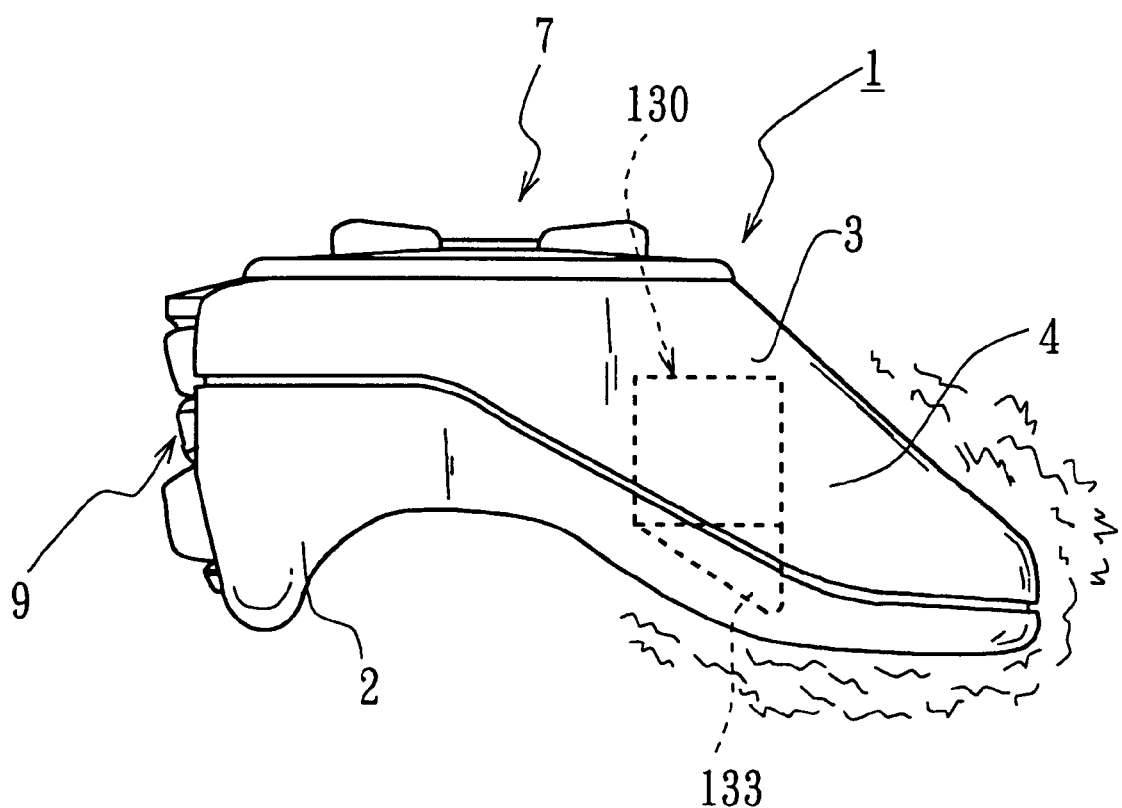
FIG. 41 is a side view showing a vibrating state of the control module by vibration of the vibrating member.

Thus, when the vibrator member 140 is vibrated by supplying the drive current I to the coils 143A–143F corresponding to the respective axes, the vibration is transmitted to the first control support 4 through a response member positioning section 133 (FIG. 38) as shown in FIG. 41. The vibration transmitted to the first control support 4 is transmitted to not only the first control support 4 but also the casings of the upper and lower cases 2 and 3, so that the entire module is vibrated. In this manner, it is possible to arbitrarily vary the states of vibration generated by the vibrator member 140 such as direction, amplitude and acceleration with the drive current I applied to the respective coils 143A–143F mounted on the vibrator member 140 of the response member 130.

Figure 42:
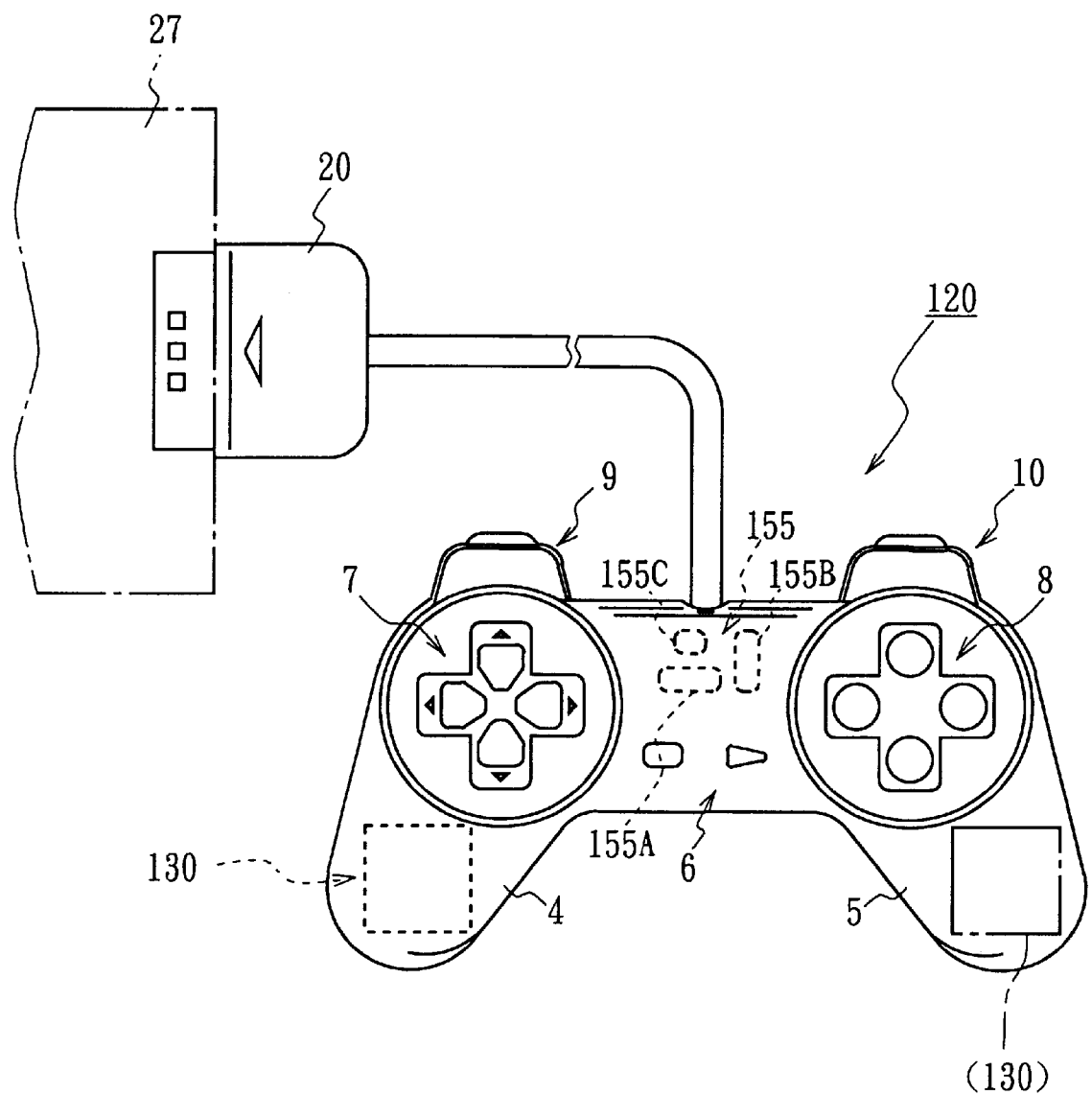
FIG. 42 is a plan view showing the arrangement of the response member.
Figure 43:
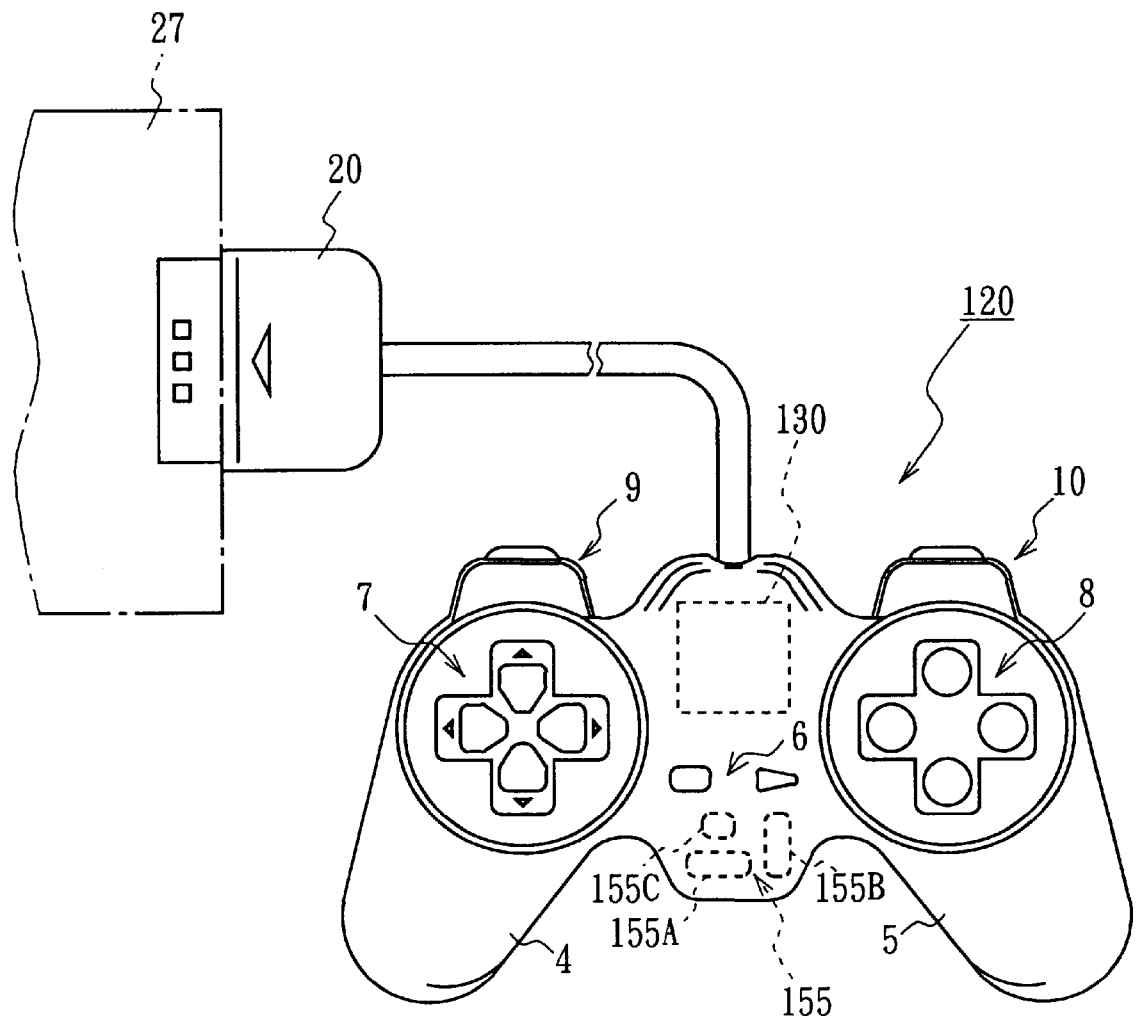
FIG. 43 is a plan view showing another arrangement of the response member.

Incidentally, a space in which the response member 130 may be mounted are in the first or second control support 4 or 5 supported by the palm, as shown in FIG. 42. In addition, it may be possible to utilize a region substantially at the center or the game machine control module 120 between the first and second control supports 4 and 5, the region being formed to have a large space, as shown in FIG. 43.

Figure 44:
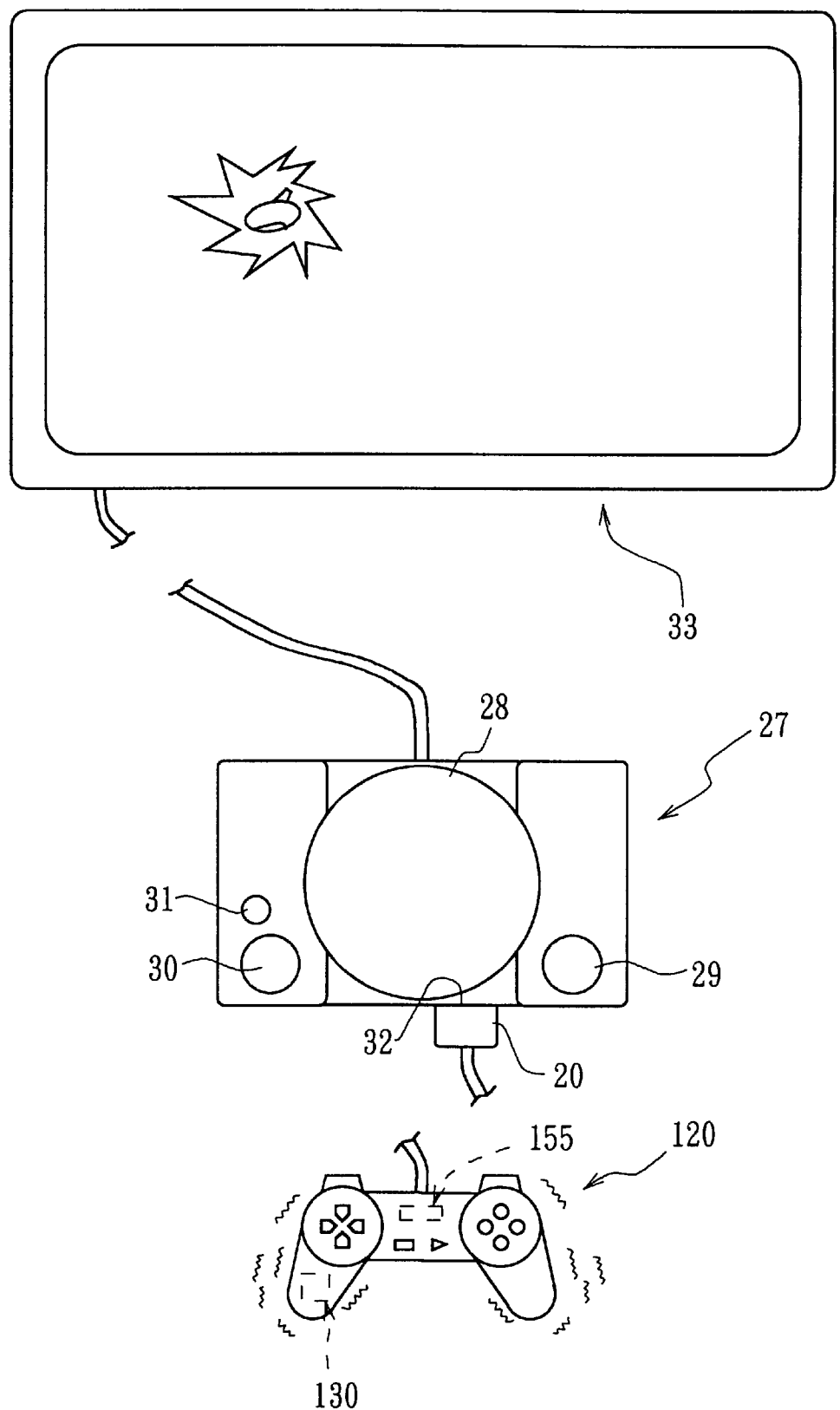
FIG. 44 is a plan view showing an operating state of the game machine.

In this manner, as the response member 130 is mounted, for example, in the portion of the first control support 4 of the lower case 3 that is supported by the palm, in playing a game by connecting the game machine control module 120 and the game machine 27 to a monitor 33 of a TV receiver or the like, the entire game machine control module 120 can be vibrated for a predetermined period of time by drivingly rotating the vibrator member 140 of the response member 130 in response to a specific signal from the game machine 27 depending on the type of a game, for example, when the opponent is defeated in a grappling game, a target is shot in a shooting game, or an action target is an air plane and attacked on the screen, as shown in FIG. 44.

Thus, the game machine control module 120 itself vibrates through operation of the control button by the user to feed back it as bodily sensation to the user, so that ambience can be further improved.

Here, the game machine 27 contains, as shown in FIG. 44, a drive for a CD-ROM as a video recording medium, and has a lid member 28 on the top thereof for accepting and closing the CD-ROM. It further comprises a closing switch 29 for opening and closing the lid member 28, a power switch 30 for supplying electric power, a reset switch 31 for initializing the operation of the game machine 27, and a connection section 32 capable of connecting two sets of the control modules. When the connector 20 of the game machine control module 120 is connected to the connection section 32, bidirectional communication can be established with the game machine 27. While the embodiment is described for an arrangement where one set of the game machine control module 120 is connected, when two sets of the game machine control modules are connected, the operation and arrangement of the other control module are same, the description of which is omitted.

Figure 45:
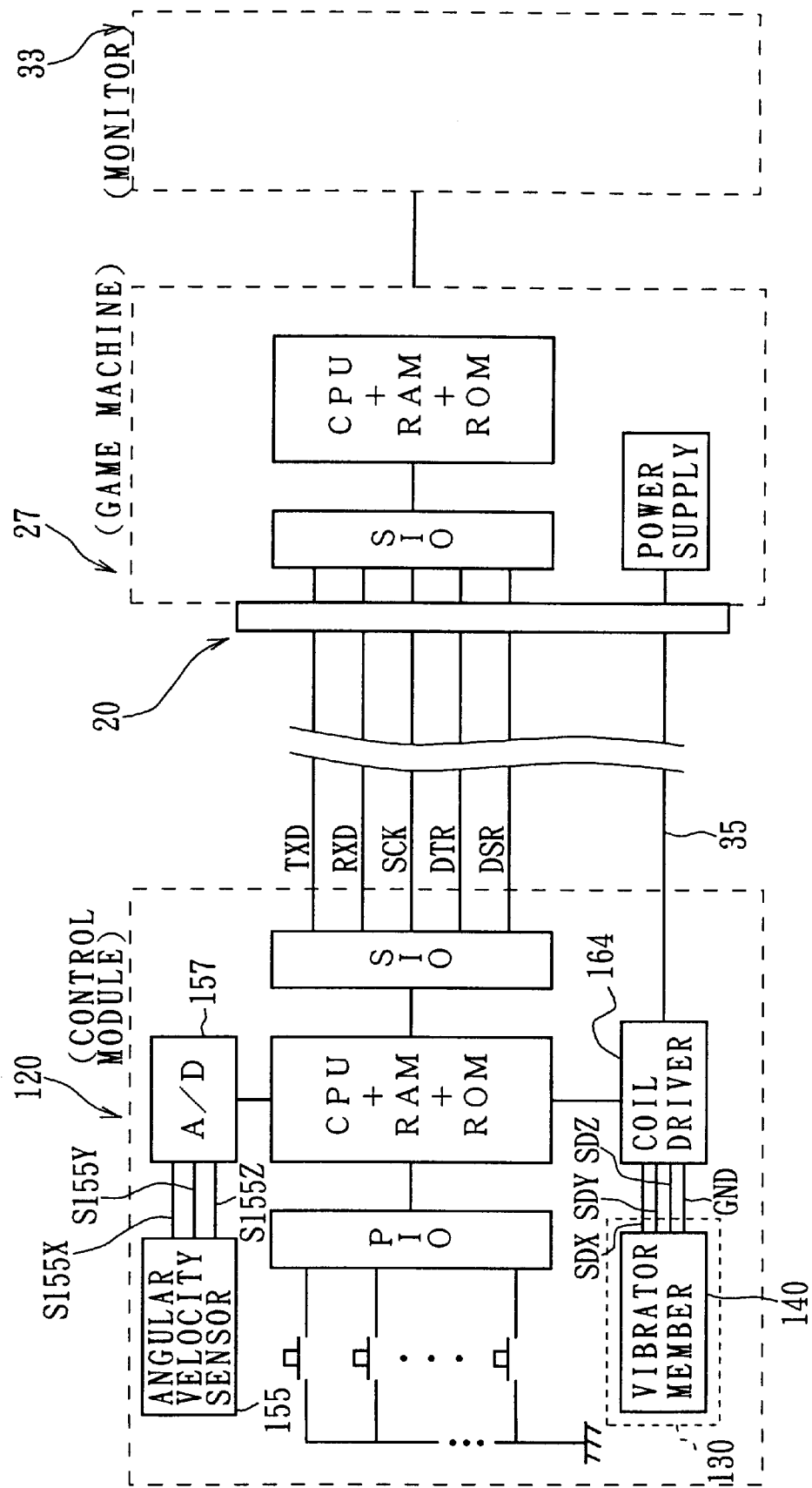
FIG. 45 is a block diagram showing a connection of the game machine body and the control module according to the third embodiment.

In order to vibrate the entire game machine control module 120 by driving the vibrator member of the response member 130 as described above, it is necessary to provide a function allowing bidirectional communication between the game machine control mule 120 and the game machine 27. As shown in FIG. 45, the bidirectional communication function can be accomplished by connecting the connector 20 for bidirectional serial communication with the game machine control module 120 to the game machine 27.

An arrangement attaining the bidirectional communication function on the game machine control module 120 comprises a serial I/O interface SIO performing serial communication with the game machine 27, a parallel I/O interface PIO for inputting control data from a plurality of control buttons, a one-chip microcomputer consisting of a CPU, a RAM and a ROM (hereinafter called a microcomputer), and a coil driver 164 for vibrating the vibrator member 140 of the response member 130.

The coils 143A and 143B of the X-axis vibrators 141A and 141B of the vibrator member 140 are vibrated by an X-axis direction drive current SDX from the coil driver 164; the coils 143C and 143D of the Y-axis vibrators 141C and 141D of the vibrator member 140 are vibrated by a Y-axis direction drive current SDY; and the coils 143E and 143F of the Z-axis vibrators 141E and 141F of the vibrator member 140 are vibrated by a Z-axis direction drive current SDZ.

The game machine 27 is provided with a serial I/O interface SIO for performing serial communication with the game machine control module 120. When the connector 20 of game machine control module 120 is connected, the serial I/O interface SIO is connected to the serial I/O interface SIO on the game machine control module 120 through the connector 20, whereby bidirectional communication or bidirectional serial communication can be established. Other detailed arrangement of the game machine 27 is omitted.

Signal and control lines for establishing the bidirectional serial communication include a signal line TXD (Transmit X' for Data) for data transmission for sending data from the game machine 27 to the game machine control module 120, a signal line RXD (Received X' for Data) for data transmission for sending data from the game machine control module 120 to the game machine 27, a signal line SCK (Serial Clock) for serial synchronization clock for extracting data from the respective data transmission signal lines TXD and RXD, a control line DTR (Data Terminal Ready) for establishing and interrupting communication of the game machine control module 120 as a terminal, and a control line DSR (Data Set Ready) for flow control for transferring a large amount of data.

In addition, a cable consisting of the signal and control lines for performing the bidirectional communication includes, as shown in FIG. 45, a power supply cable 35 directly led out from the power supply of the game machine 27 in addition to the signal and control lines. The power supply cable 35 is connected to the coil driver 164 on the game machine control module 120 to supply the electric power for rotating the vibrator member 140.

Here, as described in conjunction with FIG. 38, the game machine control module 120 is provided with the angular velocity sensor 155 for detecting rotation angular velocity around respective axes of rotation (X-, Y-, and Z-axes) of the game machine control module 120. The angular velocity sensor 155 has an X-axis angular velocity sensor 155A for detecting rotation angular velocity around the X-axis, a Y-axis angular velocity sensor 155B for detecting rotation angular velocity around the Y-axis, and a Z-axis angular velocity sensor 155C for detecting rotation angular velocity around the Z-axis. Thus, it detects rotation angular velocity components around the respective axes (X-, Y-, and Z-axes) according to change of angle of the game machine control module 120.

Figure 46:
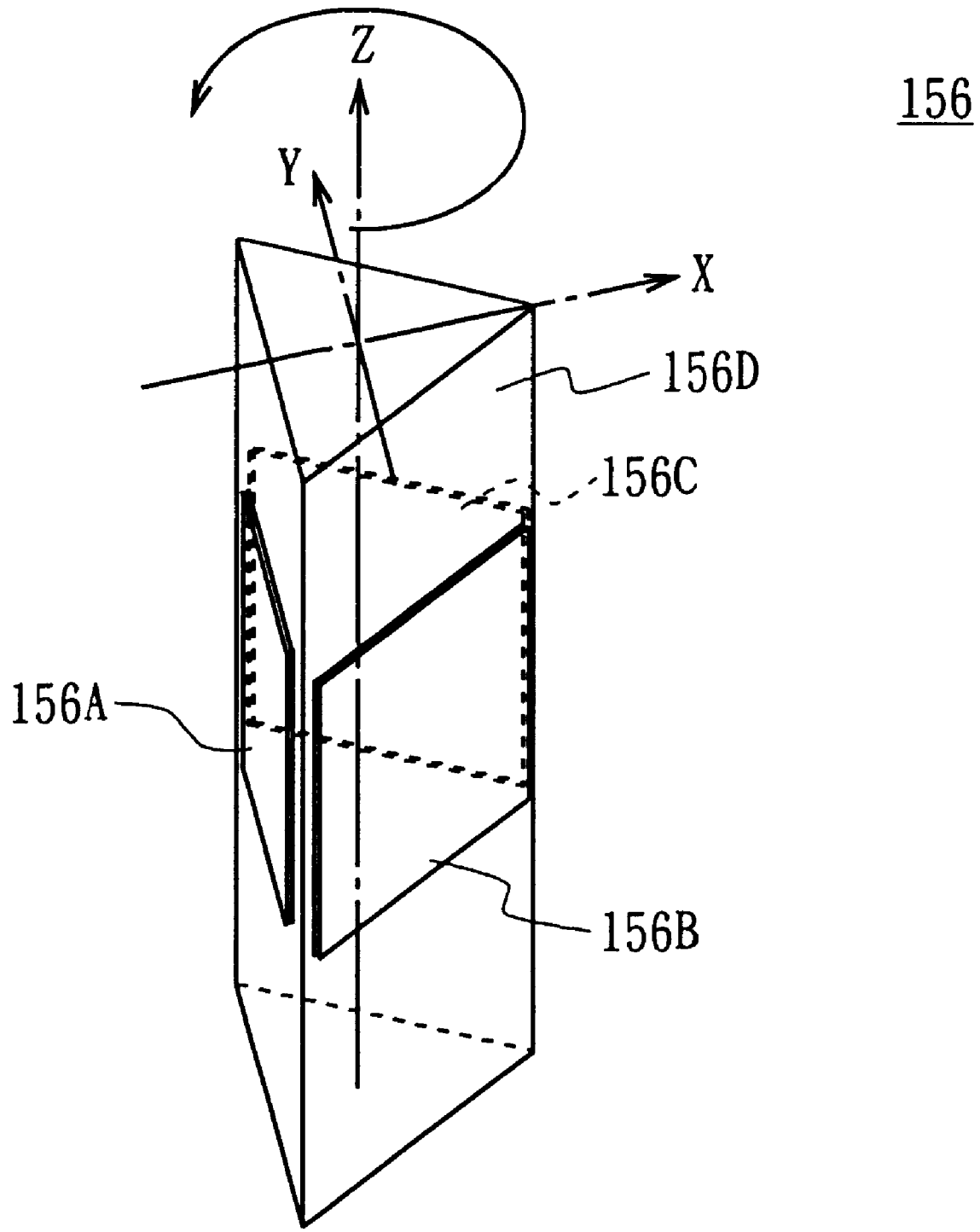
FIG. 46 is a perspective view showing the arrangement of an angular velocity sensor.

FIG. 46 shows the arrangement of a gyroscope sensor 156 of piezoelectric vibrator type constituting the Z-axis angular velocity sensor 155C. It is formed by positioning an equilateral triangle pole-shaped member 156D made of Elinvar, constant resiliency metal material, with the center line aligned to the Z-axis direction. Piezoelectric ceramic elements 156A, 156B, and 156C are adhered on the surface of Elinvar member 156. A motion component around the Z-axis is determined for the game machine control module 120 on which the gyroscope sensor 156 secured by detecting the Coriolis force of the Elinvar member 156D, and converting its vibration into vibration torque equal to frequency of a tuning fork, thereby the rotation angular velocity component around the Z-axis being determined as variation of voltage.

Incidentally, the X-axis and Y-axis angular velocity sensors 155A and 155B are also provided with gyroscope sensors with the same configuration as that of the gyroscope sensor 156 shown in FIG. 46 to align the X- and Y-axes, respectively.

Figures 47, 48:
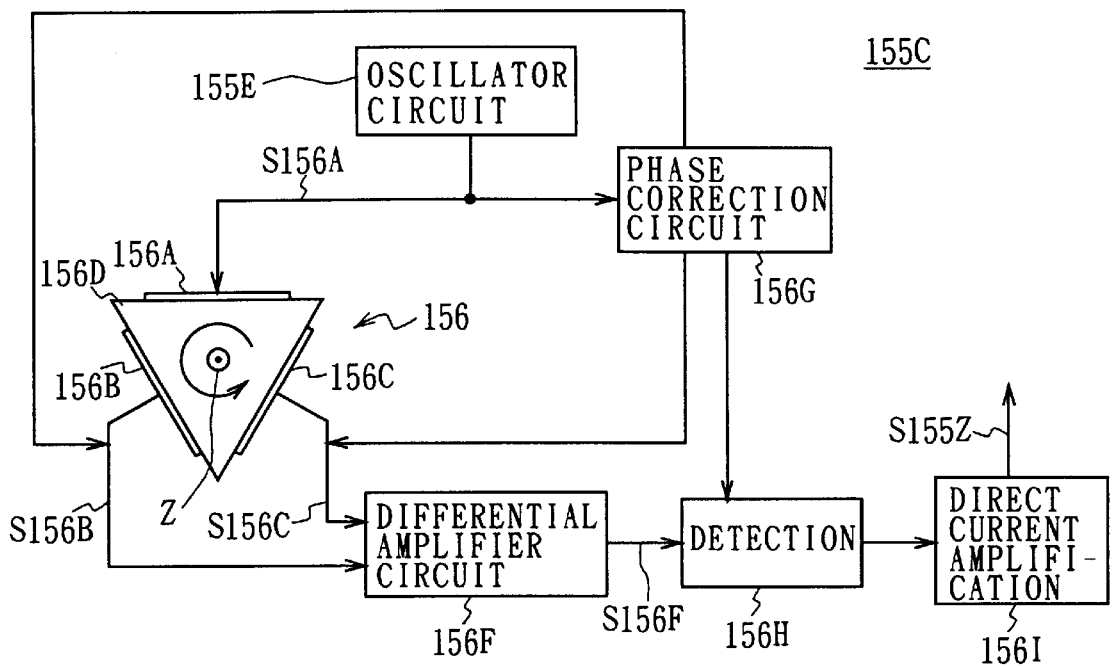
FIG. 47 is a block diagram showing the arrangement of a Z-axis angular velocity sensor.
FIG. 48 is a schematic diagram showing serial communication data according to the third embodiment.

Here, FIG. 47 shows the arrangement of the Z-axis angular velocity sensor 155C including the gyroscope sensor 156, in which an oscillator circuit 155E oscillates the piezoelectric ceramic element 156A for excitation by sending an oscillation signal S156A thereto. When there is no rotation, oscillation of the excitation piezoelectric ceramic element 156A reaches other two piezoelectric elements 156B and 156C at the same time. Then, these two piezoelectric elements 156B and 156C send to a differential amplifier circuit 156F oscillation detection signals S156B and S156C with the same amplitude in phase matched to that from a phase correction circuit 156G.

At the moment, the differential amplifier circuit 156F outputs a differentially amplified output signal S156F at a signal level of substantially zero, so that a direct current amplifier circuit 156I outputs an angular velocity detection signal S155Z at a voltage value of substantially zero volt accordingly.

On the other hand, when the game machine control module 120 is moved, distortion is caused on the gyroscope sensor (Elinvar member 156D) of the Z-axis angular velocity sensor 155C according to the rotational component of the movement around the Z-axis. Then, the two piezoelectric ceramic elements 156B and 156C outputs oscillation detection signals S156B and S156C with different values.

This causes the differential amplifier circuit 156F to output a differentially amplified signal S156F at a signal level corresponding to difference of amplification to a detector circuit 156H. The detector circuit 156H detects components of the differentially amplified signal S156F at positive signal level, and sends it to the direct current amplifier circuit 156I.

The direct current amplifier circuit 156I amplifies direct current components in the detection output waveform sent from the detector circuit 156H, and outputs an angular velocity detection signal S155Z at a voltage level corresponding to the rotation angular velocity component around the Z-axis of the gyroscope sensor 156. The angular velocity detection signal S155Z around the Z-axis thus obtained is sent to an analog/digital converter circuit 157 of FIG. 45, and to the microcomputer after conversion to a digital signal.

Incidentally, the X- and Y-axis angular velocity sensors 155A and 155B has the similar arrangement to the Z-axis angular velocity sensor 155C described above in conjunction with FIG. 47, and output an angular velocity detection signal S155A corresponding to the rotation angular velocity component around the X-axis and an angular velocity detection signal S155B corresponding to the rotation angular velocity component around the Y-axis to the microcomputer through the analog/digital converter circuit 157, respectively.

The microcomputer of the game machine control module 120 determines the attitude of the game machine control module 120 based on the rotation angular velocity components around the respective axes (X-, Y-, and Z-axes) obtained from such angular velocity sensor 155. It can always generate vibration same as the dynamic transmission data specified by the game machine 27 while avoiding variation in vibration due to the dead weight of the vibrator member 140 hanged by the casing 131 (FIG. 39) by correcting the X-axis direction drive current SDX, the Y-axis direction drive current SDY, and the Z-axis direction drive current SDZ.

In procedure for the bidirectional serial communication performed between the game machine control module 120 and the game machine 27, the game machine 27 as shown in FIG. 45, for example, first confirm selection data on the control line DTR to cause the game machine 27 to communicate the game machine control module 120, and to capture control data (button information) of the control buttons of the first to fourth control sections 7, 8, 9, and 10. Then, the game machine control module 120 waits for reception of a subsequent signal from the signal line TXD. Then, the game machine 27 issues an identification code identifying the game machine control module 120 to the data transmission signal line TXD. Thus, the game machine control module 120 receives the identification code through the signal line TXD.

As the identification code identifies the game machine control module 120, communication is started with the game machine 27 since then. That is, the game machine 27 sends control data or the like to the game machine control module 120 through the data transmission signal line TXD, whereas the game machine control module 120 sends control data from control by the control buttons or the like to the game machine 27 through the data transmission signal line RXD. In this manner, the bidirectional serial communication is performed between the game machine 27 and the game machine control module 120. This communication is terminated when the game machine 27 outputs selection discontinue data through the control line DTR.

If such bidirectional serial communication function is provided, the game machine control module 120 can send control data mainly from the control buttons to the game machine 27, while the game machine 27 can deliver to the game machine control module 120 dynamic transmission data for vibrating the vibrator member 140 of the response member 130. The dynamic transmission data for vibrating the vibrator member 140 is preset by a game CD-ROM loaded on the game machine 27, and feedback is performed by the dynamic transmission in a predetermined period of time from the game machine 27 to the game machine control module 120 itself depending on an action target of the game player.

Thus, data transmitted and received between the game machine 27 and the game machine control module 120 is transmitted by byte after packetizing into a packet consisting of 5-byte data, as shown in FIG. 48.

In FIG. 48, data transmitted from the game machine 27 to the game machine control module 120 through the signal line TXD has the first and second bytes containing as protocol identifiers data 0×01 and 0×42 represented by hexadecimal numbers to be transmitted, the third byte assigned with undetermined data, and the fourth and fifth bytes that are dynamic transmission data TXD1 and TXD2 to be transmitted as vibration control data for the response member 130 (vibrator member 140) of the game machine control module 120.

Figure 49:
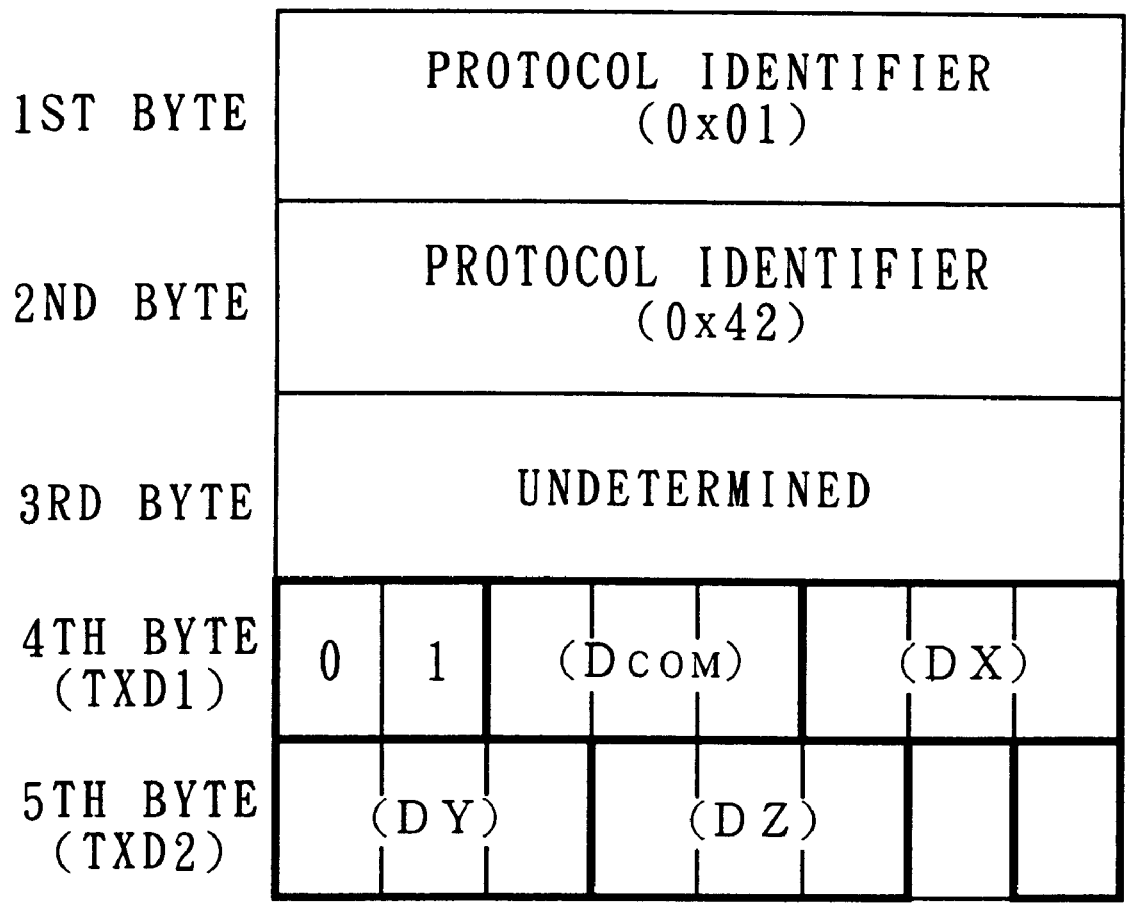
FIG. 49 is a schematic diagram showing serial communication data according to the third embodiment.

That is, as shown in FIG. 49, the fourth data is assigned in the most significant two bits with data "01" (binary) representing a control command for the vibrator member, and in subsequent three bits vibration direction control data $D_{COM}$ representing the vibration direction of the vibrator member 140.

The vibration direction control data $D_{COM}$ is data representing any one of the X-axis vibrators 141A, 141B, the Y-axis vibrators 141C, 141D, and the Z-axis vibrators 141E, 141F provided in correspondence to each direction of the vibrator member 140 described above in conjunction with FIG. 39, or combination of them, and can specify seven vibration directions according to 3-bit data. Incidentally, these seven vibration directions are the X-axis direction, the Y-axis direction, the Z-axis direction, the combination of the X-axis and Y-axis directions, the combination of the X-axis and Z-axis directions, the combination of Y-axis and Z-axis directions, and the combination of all axis directions.

In addition, the data shown in FIG. 49 is appended with vibration data DX in the most significant three bits in the fourth byte, vibration data DY in the most significant three bits in the fifth byte, and vibration data DZ for the Z-axis in three bits following the vibration data DY for the Y-axis direction in addition to the vibration direction control data $D_{COM}$ specifying the vibration direction. The vibration data DX, DY, or DZ for each axis direction is used according to any one of the vibration directions specified by the vibration direction control data $D_{COM}$ in the fourth bytes or a combination of them.

Each of these vibration data DX, DY, and DZ represents a current value in vibrating the vibrator for each axis with 3-bit data. The microcomputer of the game machine control module 120 converts the vibration data DX, DY, and DZ into analog values. The analog signal drives the coil driver 164 (FIG. 45), whereby drive current with a current value represented by the vibration data DX, DY, or DZ is applied to the coil of the vibrator corresponding to the axis specified by received data at the moment.

Figure 50:
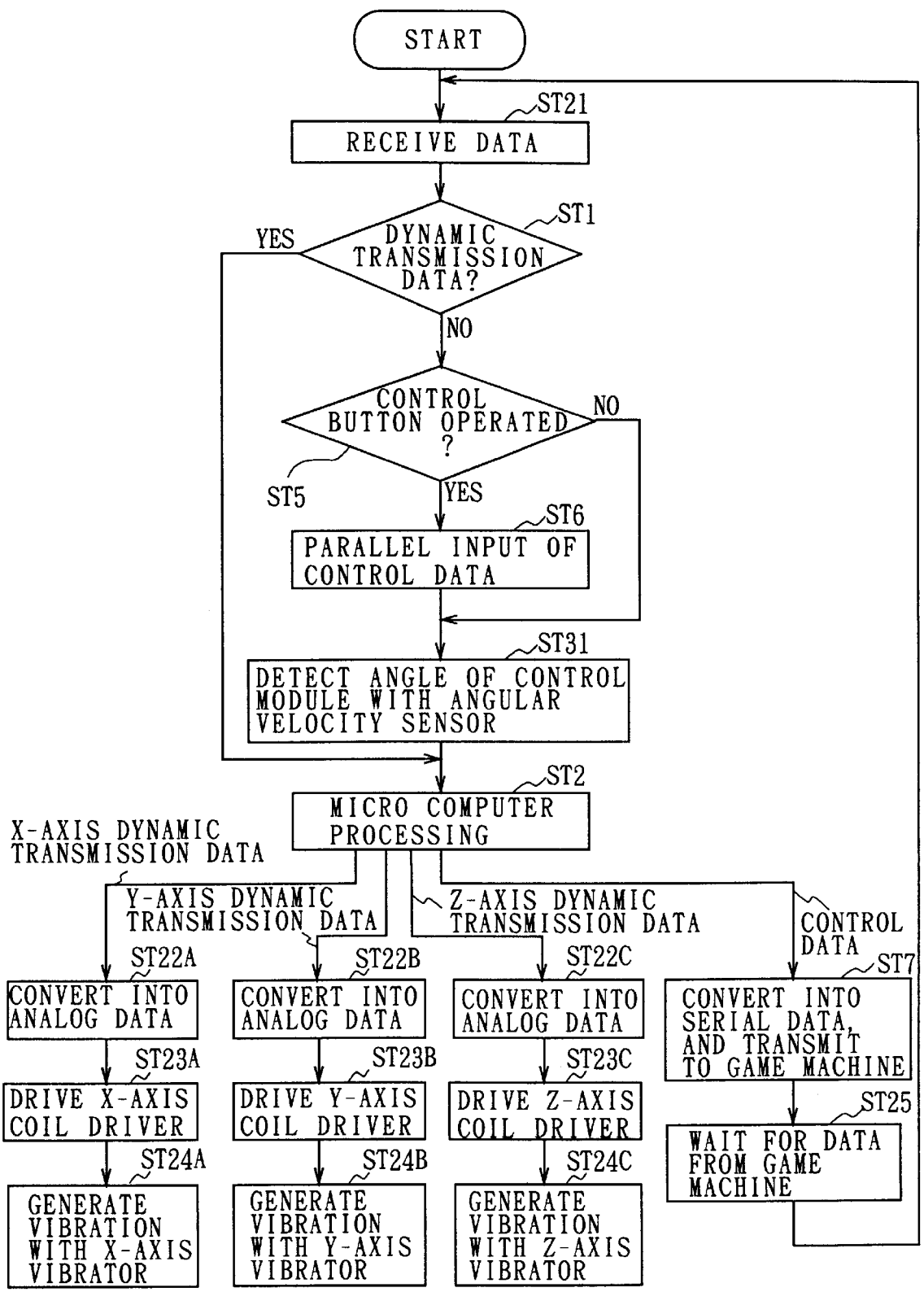
FIG. 50 is a flowchart showing processing procedure on the game machine control module according to the third embodiment.
Figure 51:
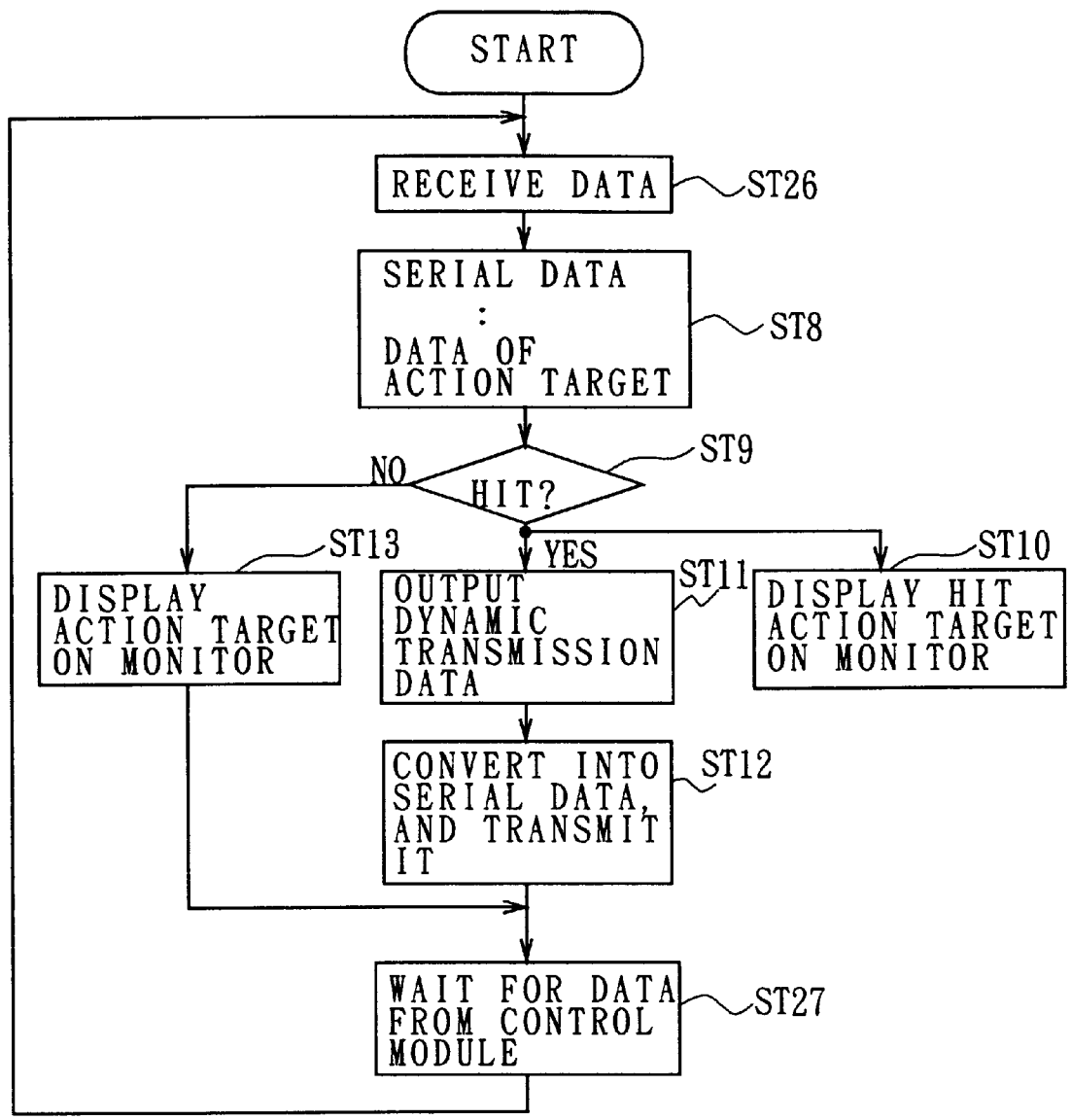
FIG. 51 is a flowchart on the game machine body according to the third embodiment.

This is described in detail in conjunction with the flowcharts of FIGS. 50 and 51 identifying components corresponding to those of FIGS. 25 and 26 with the same reference numerals by referring to FIGS. 38 and 45.

The user loads a specific game CD-ROM in the game machine 27, sets start of the game with the start switch 11 of the game machine control module 120 shown in FIG. 38, and sets various functions through operation of the select switch 12, whereby the game is ready for play through operations of the first to fourth control sections 7, 8, 9, and 10.

Then, as the game is started, the microcomputer of the game machine control module 120 consisting of the CPU, the RAM and the ROM shown in FIG. 45 continuously monitors through the serial interface SIO at step ST21 shown in FIG. 50 that dynamic transmission data for hit is sent from the game machine 27 through the serial I/O interface SIO. The dynamic transmission data contains a vibration direction and current data for the vibrator member 140 shown in FIG. 45. Then, as the game progresses, if there is the dynamic transmission data in data sent from the game machine 27, it drives the coil driver 164, and supplies current supplied from the game machine 27 to the coils 143A–143F of the vibrator member 140 as the X-axis direction drive current SDX, the Y-axis direction drive current SDY, and the Z-axis direction drive current SDZ for a predetermined period of time.

That is, after step ST1 detects the dynamic transmission data TXD1, TXD2 (FIG. 49) in the data signal received by the game machine control module 120, the microcomputer processes the dynamic transmission data in step ST2. Here, the microcomputer previously captures in step ST31 angular velocity detection signals S155X, S155Y, and S155Z obtained from the angular velocity sensors described above in conjunction with FIGS. 46 and 47, determines attitude of the game machine control module 120 based on the angular velocity detection signals S155X, S155Y, and S155Z, and corrects the dynamic transmission data TXD1 and TXD2 based on the attitude information.

The correction is arranged to correct the drive current applied to the coils 143A–143F of the vibrator member 140 in such a manner that the drive current has a value to generate less magnetic force in the direction to which the vibrator member 140 is attracted by the gravity, and a value to generate much magnetic force in the opposite direction.

Therefore, regardless of the game machine control module 120 at any angle to the vertical direction (attitude), the vibrator member 140 can generate appropriate vibration for the progress of game set by the CPU on the game machine 27 while avoiding variation in vibration on the vibrator member 140 due to gravity.

Steps ST22A, ST22B, and ST22C convert, among the dynamic transmission data thus corrected, data corrected on the basis of the vibration data DX, DY, and DZ representing vibration component in each axis direction in the direction (X-axis direction, Y-axis direction, or Z-axis direction, or combination of them) specified by the vibration direction control data DCOM (FIG. 49) into analog signals, respectively. Then, in the following steps ST23A, ST23B, and ST23C, the coil driver 164 (FIG. 45) is driven by respective analog signals. Thus, the coil drive 164 supplies the drive current I to the coils 141A–141F of the vibrator member 140, whereby the vibrator member 140 vibrates in the direction specified at the moment in steps ST24A, ST24B, and ST24C.

On the other hand, if data supplied to the game machine control module 120 from the game machine 27 does not contain the dynamic transmission data TXD1 and TXD2, the microcomputer of the game machine control module 120 proceeds from step ST1 to step ST5 in FIG. 50, and waits for operation of the control button. If affirmative acknowledgment is obtained here, it means that the control button of the game machine control module 120 is operated. Then, the microcomputer proceeds step ST6 to capture the control data through the parallel I/O interface PIO, and proceeds to the following step ST31 to capture the attitude of the game machine control module 120 with the angular velocity detection signals S155X, S155Y, and S155Z from the angular velocity sensor 155.

The angular velocity detection signals S155X, S155Y, and S155Z input into the microcomputer are used as correction data based on the attitude of the game machine control module 120 described above in conjunction with steps ST22A–ST24A, ST22B–ST24B, and ST22C–ST24C.

In addition, the control data input into the microcomputer is processed in step ST2 in FIG. 50, converted into serial data in step ST7, and sent to the game machine 27 through the serial I/O interface SIO (FIG. 45). Thereafter, the game machine control module 120 waits for data from the game machine 27 in step ST25.

Data transmitted from the game machine control module 120 to the game machine 27 assigns, as shown in FIG. 48, an identifier for the game machine control module 120 in the upper four bits of the second byte, and data of data length/2 in the lower four bits of the second byte. In addition, it assigns an identifier (ACK) indicating that the data is response data in the third byte, and data of the button operated on the game machine control module 120 in the subsequent fourth and fifth bytes.

When such data from the game machine control module 120 is transmitted to the game machine 27, the game machine 27 receives the data from the game machine control module 120 in step ST26 shown in FIG. 51, compares data of an action target and the received serial data in the following step ST8, and determines a hit state in step ST9.

Here, if the data of the action data matches the serial data, that is, if a hit is detected, the process proceeds from step ST9 to step ST10 to display the hit action target on the screen of the monitor, to output the dynamic transmission data in step ST11, to convert it into serial data in step ST12, and to send the serial data to the game machine control module 120 as a specific response signal through the serial I/O interface SIO (FIG. 45). When the dynamic transmission data is detected by the microcomputer of the game machine control module 120 as described in conjunction with steps ST1, ST2, and ST3 in FIG. 50, it supplies electric power to the coils 143A–143F of the vibrator member 140 through the coil driver 164 (FIG. 45) to vibrate them. This vibration vibrates the entire game machine control module 120.

On the other hand, if negative acknowledgement is obtained in step ST9 (FIG. 51), it means that the data of the action target does not match the serial data from the game machine control module 120, that is, that a hit is not detected. In this case, the CPU proceeds to step ST13 to display the action target on the screen of the monitor based on the operation of the control button, and then proceeds to step ST27 to wait for data from the game machine control module 120.

The CPU of the game machine 27 processes data in every $1/60$ seconds (one frame), and, accordingly, the dynamic transmission data TXD1 and TXD2 are also transmitted from the game machine 27 to the game machine control module 120 in every $1/60$ seconds. Therefore, the drive current supplied to the coils 143A–143F of the game machine control module 120 and its direction are varied in every $1/60$ seconds based on the dynamic transmission data.

Thus, when the dynamic transmission data is transmitted from the game machine 27 to the game machine control module 120, and the vibrator member 140 is vibrated to a predetermined direction based on it, the user operating the game machine control module 120 is fed back with bodily sensation corresponding to the game being developed on the monitor screen as vibration of the game machine control module 120, so that he or she can play the game with further enhanced ambience.

While the third embodiment of the present invention described above is arranged, as shown in FIG. 42, to contain and position the response member 82 of the present invention in the first control support 4 supported by the palm of the left hand, it may be contained and positioned, as shown in FIG. 42, in the second control support 5 supported by the palm of the right hand.

In addition, while the third t of the present invention described above are arranged to contain and position the response member 130 of the present invention in the first control support 4 supported by the palm of the left hand, it may be contained and positioned, as shown in FIG. 42, in both the first and second control supports 4 and 5.

Furthermore, when the response members 130 are positioned in both the first and second control supports 4 and 5, it may be possible to mount the response members of the same size, or the response members with different size (that is, the response members generating different magnitude of vibration). Thus, when the response members with different size are mounted, they may be simultaneously or selectively vibrated, so that there is provided another advantage that the performance of the game can be further enhanced.

While the third embodiment has been described for a case where the value of drive current applied to the coils 143A–143F of the vibrator member 140 is specified by the dynamic transmission data TXD1 and TXD2 transmitted from the game machine 27 to the game machine control module 120 in every $1/60$ seconds, thereby changing the current value and its direction for the coils 143A–143F in every $1/60$ seconds at the shortest as described above in conjunction with FIG. 49, the present invention is not limited to it, but may divide the interval of $1/60$ seconds into a plurality of intervals by increasing the number of bytes of data, for example, shown in FIG. 49 to transmit the vibration data DX, DY, and DZ of respective axes in multiple times, and specify drive current values and directions for each divided interval.

With such arrangement, since it is possible to vary values and directions of the drive current applied to the coils 143A–143F of the vibrator member 140 in one frame interval by the number of vibration data DX, DY, and DZ, even if transmission timing is in every one frame ($1/60$ seconds) for the dynamic transmission data TXD1 and TXD1 transferred from the game machine 27 to the game machine control module 120, it is possible to apply varying drive current such as analog signals to the coils 143A–143F in a period of time shorter than the interval of one frame.

In addition, while the third embodiment has been described for a case where the current value and its direction of the drive current applied to the coils 143A–143F of the vibrator member 140 at each timing are transferred as the dynamic transmission data TXD1 and TXD2 in a packet from the game machine 27 to the game machine control module 120, the present invention is not limited to it, but may transfer data representing shapes of drive current waveforms from the game machine 27 to the game machine control module 120 to cause the game machine control module 120 to generate current waveforms corresponding to the waveform data.

Furthermore, while the third embodiment has been described for a case where the casing 131 hangs the vibrator member 140 with the coil springs 151A–151F, the present invention is not limited to it, but may use leaf springs, or float the vibrator member 140 in the casing.

Furthermore, while the third embodiment has been described for use of the vibrator member 140 having projections as the coil sections in the respective axis directions (X-, Y-, and Z-axes), the present invention is not limited to it, but may embed magnets in the respective axis directions (X-, Y-, and Z-axes) of a spherical member, and provide coil sections for the X-axis, Y-axis, and Z-axis directions at the positions of the casing corresponding to the magnets.

Furthermore, while the third embodiment has been described for a case where the vibrator member 140 integrated with the vibrators (X-axis vibrators 141A, 141B, Y-axis vibrators 141C, 141D, and Z-axis vibrator 141E, 141F) vibrating in the directions of respective axes (X-, Y-, and Z-axes) is used, the present invention is not limited to it, but may provide individual vibrators separately vibrating in each direction of axes.

Figure 52:
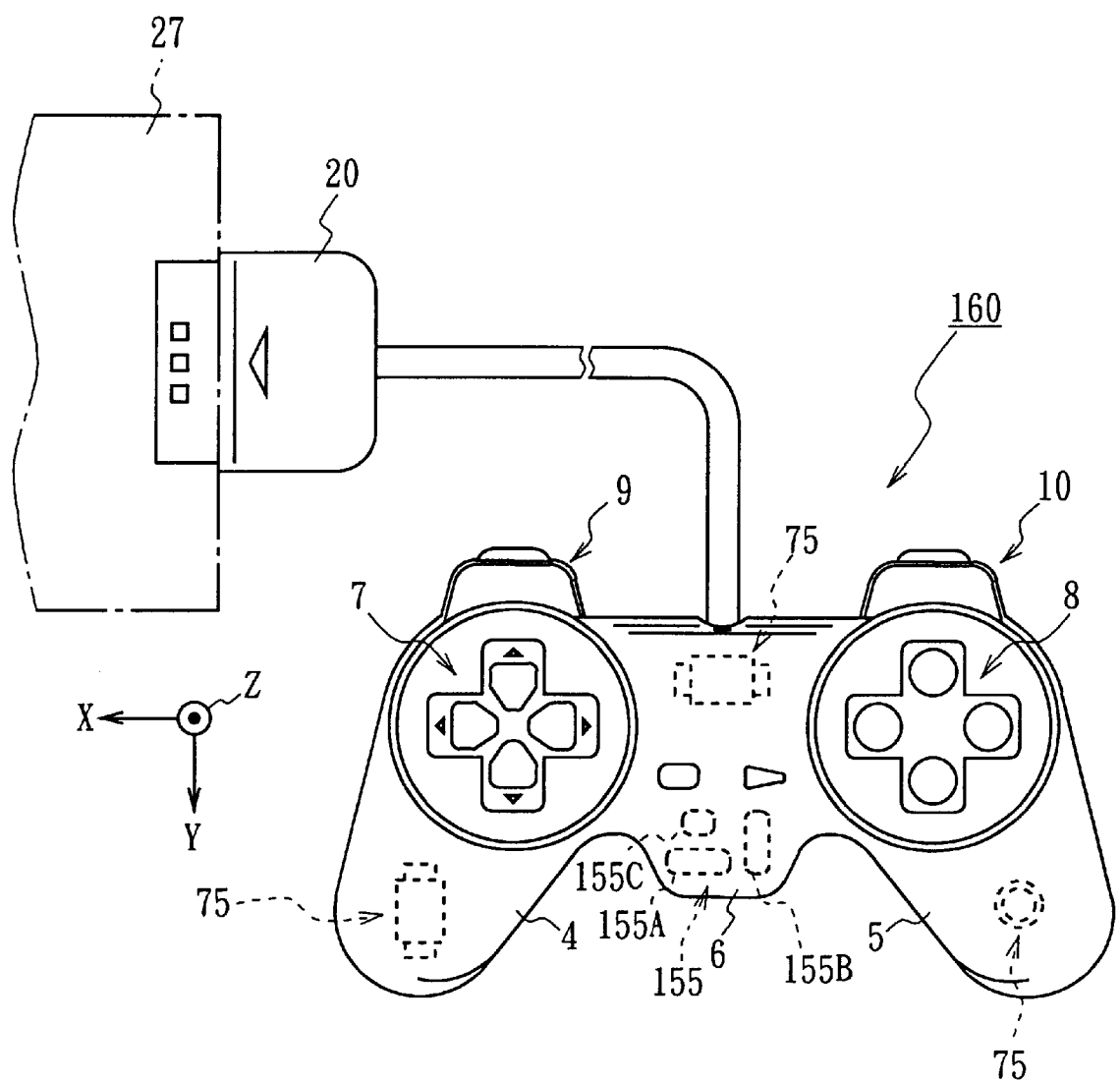
FIG. 52 is a plan view showing the arrangement of an independent response member.

In this case, for example, the response members 75 in a voice coil arrangement described above in conjunction with FIGS. 29 and 30 are individually mounted to vibrate in each of X-axis, Y-axis, and Z-axis directions, respectively, as shown in FIG. 52. With such arrangement, when the vibration data DX, DY, and DZ in the respective axis directions described above in conjunction with FIG. 49 are provided as drive current values for respective response members 75 for vibrating them, in the game machine 160, vibrations are combined for a plurality of response members 75, and vibration is generated in any directions as in the integrated vibrato member 140 (FIG. 39) described above in conjunction with FIG. 39.

Even in this case, it is possible to monitor the attitude of the game machine control module 160 with the angular velocity sensor 155, and to always generate vibration specified by the game machine 27 on the game machine control module 160 regardless of its attitude by correcting the value of drive current supplied to each response member 75.

Figure 53:
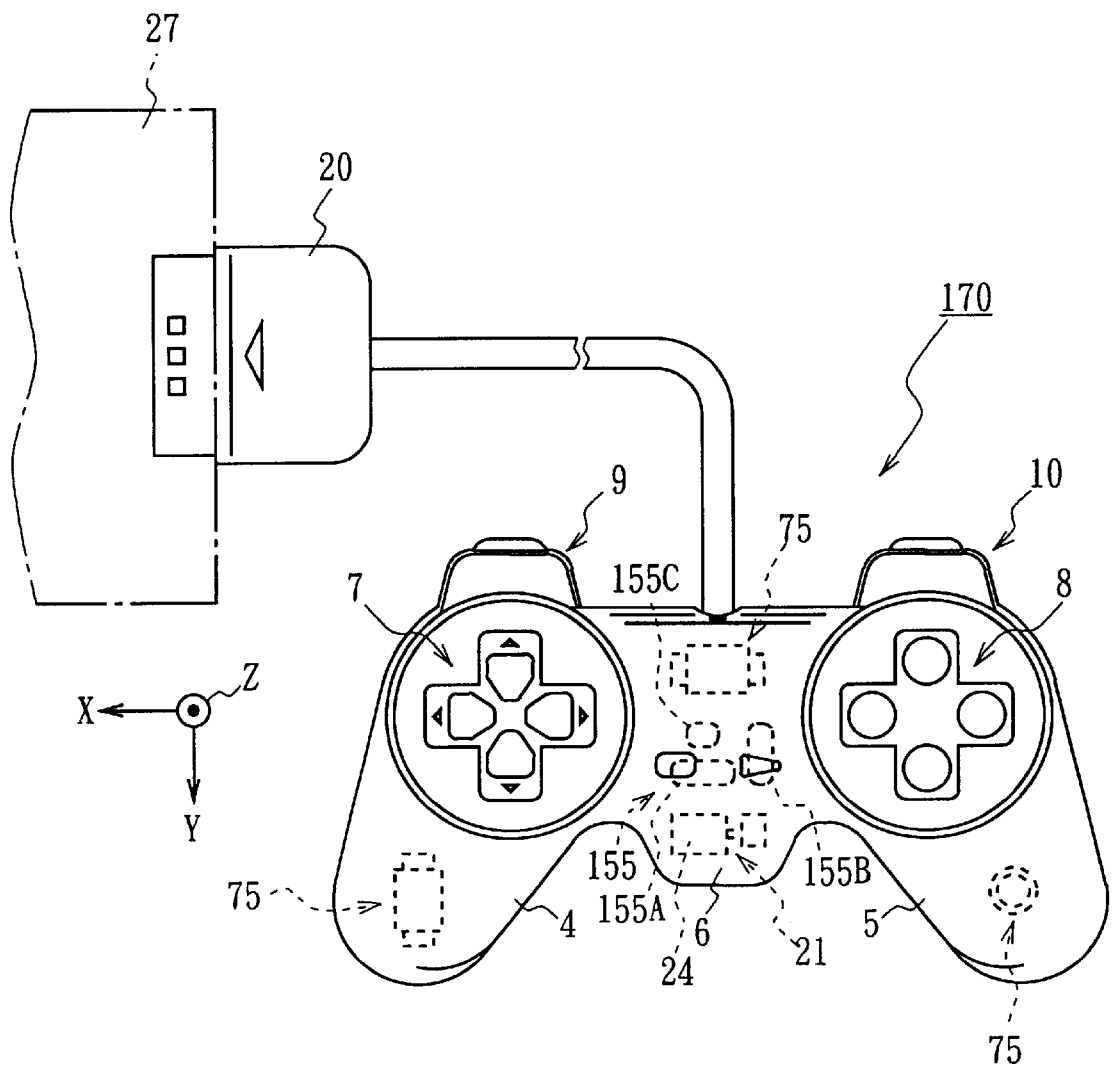
FIG. 53 is a plan view showing an example of combination of a voice coil and a motor.

In addition, while the game machine control module 160 of FIG. 52 has been described for a case where the response members 75 in each of which a vibrator linearly reciprocates to generate linear vibration are arranged in respective axis directions (X-axis, Y-axis, and Z-axis directions), the present invention is not limited to it, but may provide a response member 21 with the motor 24 described above in conjunction with FIG. 3 in addition to three response members 75 arranged in the respective axis directions, as shown in FIG. 53.

In this case, noting the fact that the response member 75 in the voice coil arrangement consumes much current, but can generate strong vibration, and that the response member 21 with the motor 24 consumes less current, but generates weak vibration, it is possible to generate vibration in various directions and with various magnitude with full ambience in accordance with progress of the game by combining and vibrating the response members 75 in the voice coil arrangement provided in the respective axis directions according to required directions of vibration when it is intended to generate strong vibration for a relatively short period of time, and by vibrating the response member 21 with the motor 24 when it is intended to generate weak vibration for a relatively long period of time. In addition, the response members 75 with higher current consumption can be driven only when it is required, so that current consumption required for vibration can be saved for the entire game machine control module 170.

In addition, while the game machine control module 160 of FIG. 52 has been described for a case where the response members 75 in each of which a vibrator linearly reciprocates to generate vibration are arranged in respective axis directions (X-axis, Y-axis, and Z-axis directions), the present invention is not limited to it, but, for example, may replace one or two of the response members arranged in the respective axis directions with the response member 21 with the motor 24 described above in conjunction with FIG. 2.

Figure 54:
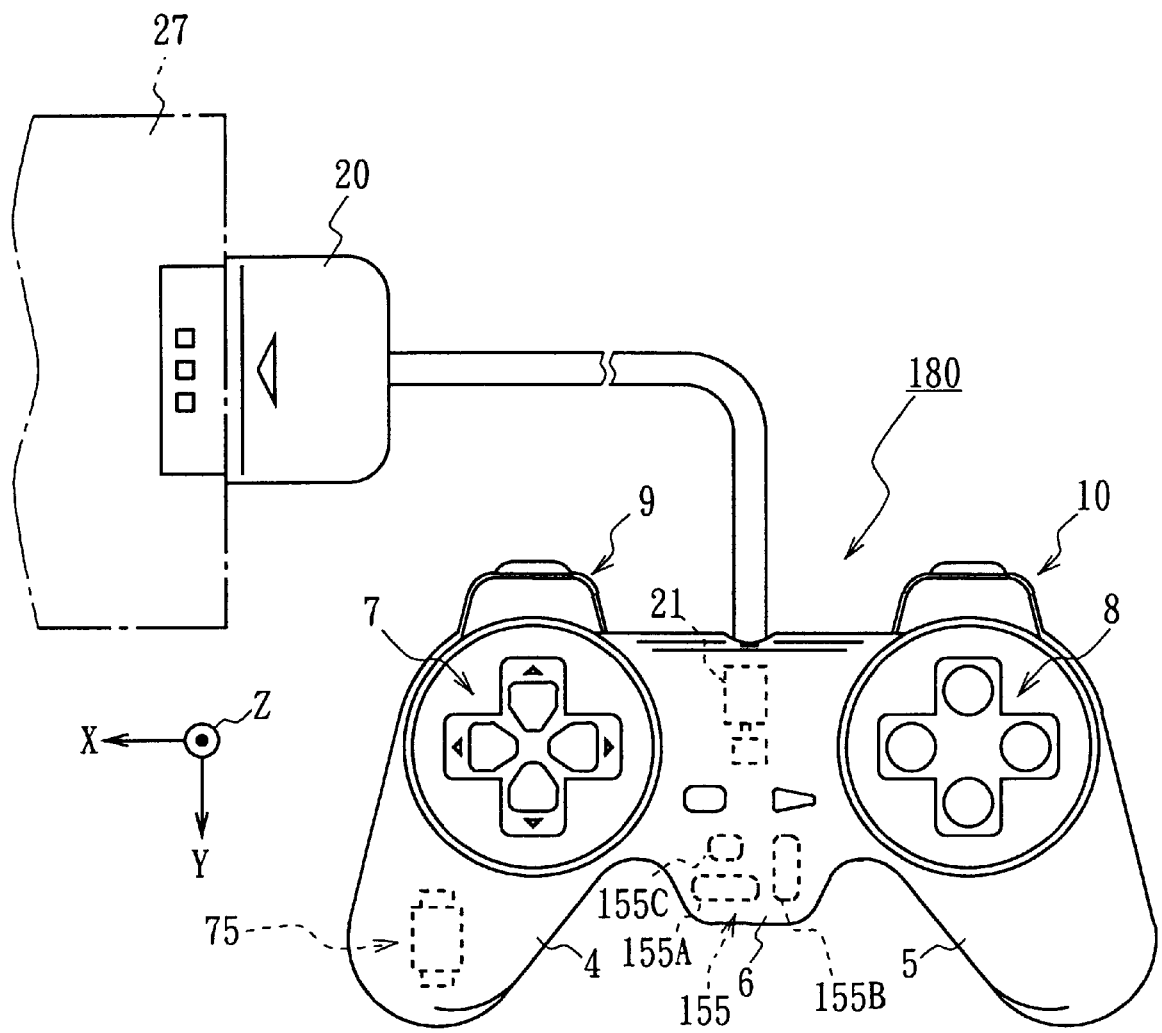
FIG. 54 is a plan view showing an example of combination of a voice coil and a motor.

That is, the game machine control module 180 shown in FIG. 54 represents an arrangement in which the response member 21 with the motor 24 described above in conjunction with FIG. 3 is provided as a member for generating vibration in the two-dimensional directions in the X-Z plane, and which has the response member 21 and a response member 75 in the voice coil arrangement for generating vibration in the Y-axis direction (one-dimensional direction).

If the response members 75 and 21 are arranged in this manner, it becomes possible to have the user operating the game machine control module 180 experience strong impact (vibration) particularly in the back-and-forth direction with the response member 75, and relatively small vibration in the horizontal and vertical directions for a long period of time.

Figure 55:
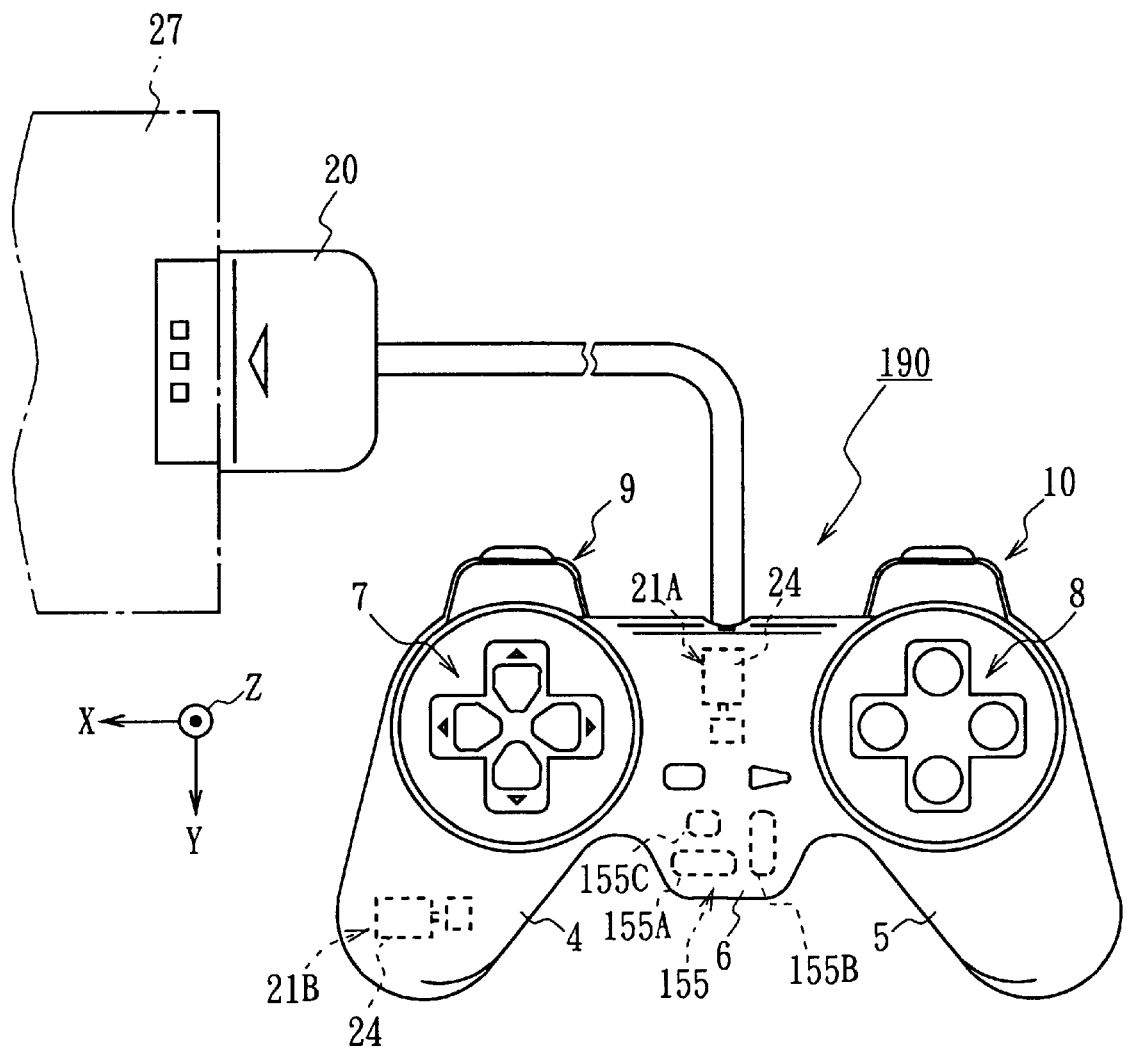
FIG. 55 is a plan view showing the arrangement of a plurality of response members using motors.

While the game machine control module 160 of FIG. 52 has been described for a case where the response members 75 in the voice coil arrangement are arranged in the respective axis directions (X-axis, Y-axis, and Z-axis directions), the present invention is not limited to it, but may arrange two response members 21A and 21B having motors 24, respectively, in place of the response member 75 in the voice coil arrangement, for example, as shown in FIG. 55, so that their directions of vibration are in the X-Z plane and the Y-Z plane (or, X-Y plane).

Figure 56:
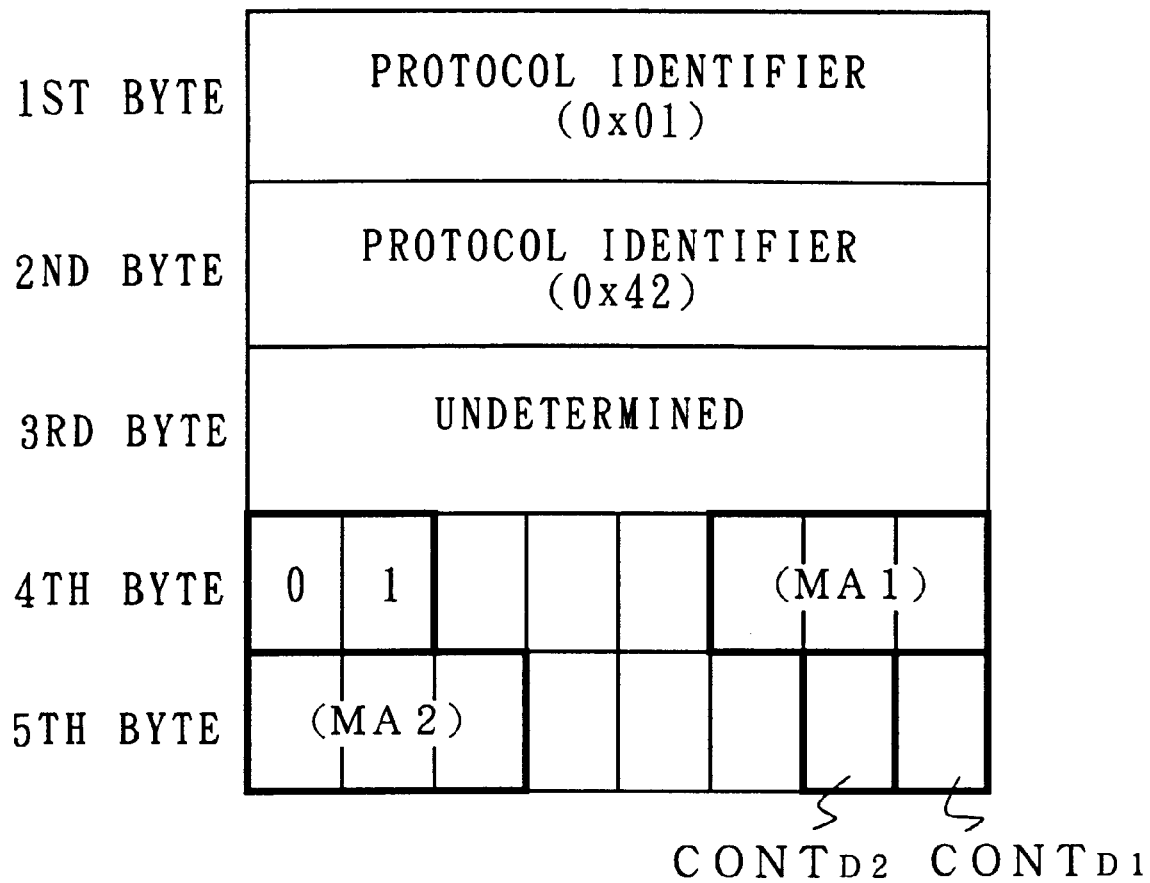
FIG. 56 is a schematic diagram showing serial communication data for the response member using a motor.

The game machine control module 190 can feed back various vibrations to the user according to progress of the game by generating vibrations in two planes. Incidentally, in vibration data transmitted from the game machine 27 to the game machine control module 190 with two response members 21A and 21B as shown in FIG. 56, the most significant two bits of the fourth byte are assigned with data "01" (binary) representing a control command for the driver, and the least significant three bits of the fourth byte are assigned with analog control data MA 1 representing the value of drive current applied to the first response member 21A. In addition, the most significant three bits of the fifth byte are assigned with analog control data MA 2 representing the value of drive current applied to the second response member 21B. Thus, when the microcomputer of the game machine control module 190 receives two analog control data MA 1 and MA 2, it converts the analog control data MA 1 and MA 2 into analog values, and controls the coil driver with the analog signals, thereby supplying drive currents specified by the analog data MA 1 and MA 2 to the response members 21A and 21B, respectively.

In addition, in FIG. 56, the least significant bit of the fifth byte is assigned with digital control data $CONT_{D1}$ indicating whether or not drive current with a predetermined value is supplied to the first response member 21A. It is determined whether or not the drive current is supplied to the first response member 21A by assigning "1" or "0" as the control data $CONT_{D1}$.

Similar to the above, the second least significant bit of the fifth byte is assigned with digital control data $CONT_{D2}$ indicating whether or not drive current with a predetermined value is supplied to the first response member 21B. It is determined whether or not the drive current is supplied to the first response member 21B by assigning "1" or "0" as the control data $CONT_{D2}$.

Figure 57:
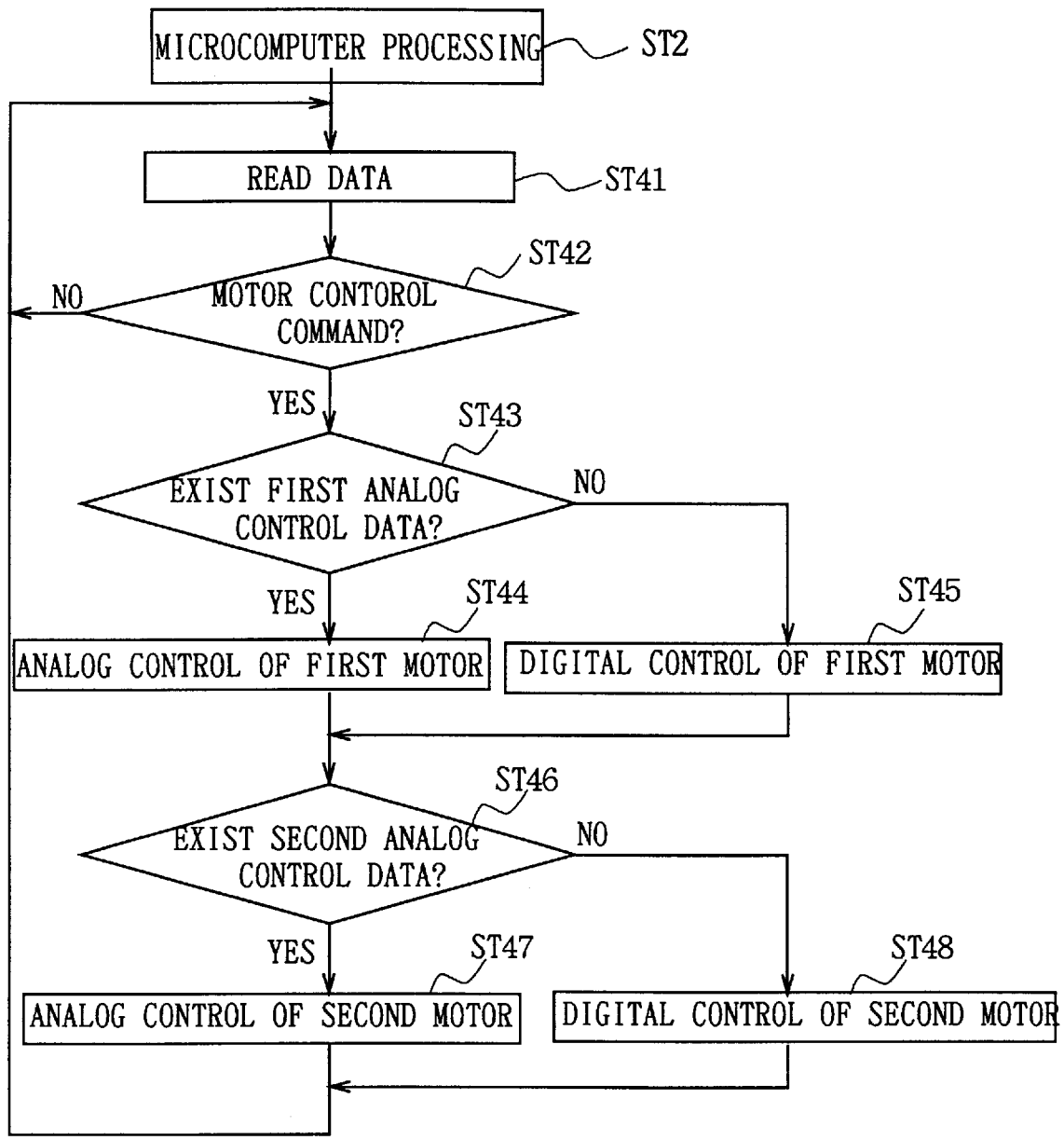
FIG. 57 is a flowchart showing microprocessor processing procedure on the control module.

This is described in detail according to the flowchart of FIG. 57. When the microcomputer of the game machine control module 190 (FIG. 55) receives data, for example, shown in FIG. 56 from the game machine 27, it proceeds from step ST2 of FIG. 57 to a process step based on the received data, completes reading of data in step ST41, and then detects the most significant two bits of the fourth byte in the following step ST42, thereby determining whether or not the data is control data for a game machine control module with a vibrator.

If negative acknowledgment is obtained here, it means that the received data is not control data for a game machine control module with a vibrator, or that it is not control data for the game machine control module 190 attached to the game machine 27 at the moment. In this case, the microcomputer of the game machine control module 190 returns to step ST41 describes above, and waits for receiving of new data.

On the other hand, if affirmative acknowledgement is obtained in step ST42, it means that the received data is control data for the game machine control module 190 with a vibrator. In this case, the microcomputer of the game machine control module 190 determines in the following step ST43 whether or not there exists the analog control data MA 1 for the first response member 21A in the fourth byte of the received data.

If affirmative acknowledgment is obtained here, it represents that the analog control data MA 1 exists in the least significant three bits of the fourth byte of the received data. In this case, the microcomputer of the game machine control module 190 proceeds to step ST44 where it applies drive current with the value specified by the analog control data MA 1 to the motor 24 of the first response member 21A.

On the other hand, if negative acknowledgment is obtained in step ST43, it represents that the analog control data MA 1 does not exist in the least significant three bits of the fourth byte of the received data (for example, the analog control data MA 1 being "0"). In this case, the microcomputer of the game machine control module 190 proceeds to step ST45 where it reads the digital control data $CONT_{D1}$ assigned in the least significant bit of the fifth byte of the received data (FIG. 56) for the first response member 21A, and controls the motor 24 of the first response member 21A to be turned on or off based on the digital control data $CONT_{D1}$.

Thereafter, the microcomputer of the game machine control module 190 proceeds to step ST 46 where it determines whether there exists the analog control data MA 2 for the second response ember 21B in the fifth byte of the received data.

If affirmative acknowledgement is obtained here, it represents that the analog control data MA 2 exists in the most significant three bits of the fifth byte of the received data. In this case, the microcomputer of the game machine control module 190 proceeds to step ST47 where it applies drive current with the value specified by the analog control data MA 2 to the motor 24 of the second response member 21B.

On the other hand, if negative acknowledgment is obtained in step ST46, it represents that the analog control data MA 2 does not exist in the least significant three bits of the fifth byte of the received data (for example, the analog control data MA 1 being "0"). In this case, the microcomputer of the game machine control module 190 proceeds to step ST48 where it reads the digital control data $CONT_{D2}$ assigned in the second bit from the least significant bit of the fifth byte of the received data (FIG. 56) for the second response member 21B, and controls the motor 24 of the second response member 21B to be turned on or off based on the digital control data $CONT_{D2}$.

Thus, the microcomputer of the game machine 190 can perform analog control or digital control on the response members 21A and 21B based on the analog control data MA 1 and MA 2, or the digital control data $CONT_{D1}$ and $CONT_{D2}$ contained in the received data by repeating the process shown in FIG. 57 every time it receives data from the game machine 27.

In this process, if the analog control data MA 1 and MA 2 exist in the received data, it is possible to apply drive current finely specified in accordance with the analog control data MA 1 and MA 2 to the respective motors 24 of the first and second response members 21A and 21B by preferentially using the analog control data MA 1 and MA 2.

Figure 58:
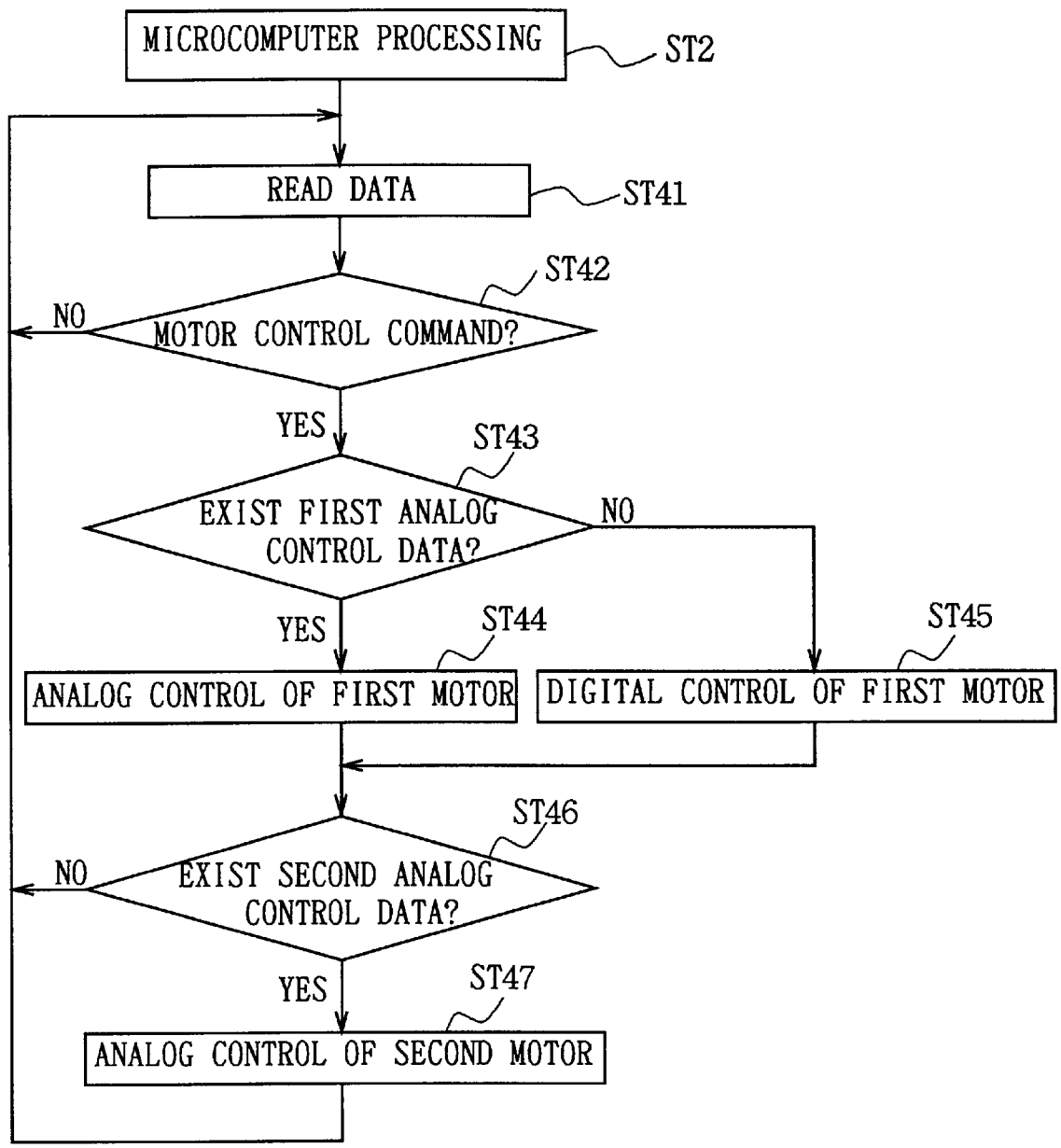
FIG. 58 is a flowchart showing microprocessor processing procedure on the control module according to an alternate embodiment.

While the microcomputer processing shown in FIG. 57 has been described for a case where, if there does not exist the analog control data MA 2 for the second response member 21B, the digital control data $CONT_{D2}$ is detected for the second response member 21B, the present invention is not limited to it, but may be arranged, for example, as shown in FIG. 58 identifying components corresponding to those in FIG. 57 with the same reference numerals, in such a manner that, if the result of determination in step ST46 indicates that the analog control data MA 2 for the second response member 21B does not exist in the received data, the microcomputer returns to step ST41, and waits for receiving of new data, instead of detecting the digital control data $CONT_{D2}$ for the second response member 21B.

With such arrangement, in a system where the digital control data $CONT_{D2}$ is not assigned for the second response member 21B, it can be determined whether or not the second response member 21B is analog controlled.

In addition, while the data shown in FIG. 56 has been described for a case where analog control data MA 1 and MA 2 (three bits) are assigned to the first and second response members 21A and 21B, respectively, the present invention is not limited to it, but may utilize some other empty regions to assign a plurality of analog control data to the first and second response members 21A and 21B, respectively.

With such arrangement, even if the data is delivered at a timing of every one frame (1/60 seconds), it becomes possible to vary the value of drive current applied to the response member in every interval that is one frame interval divided by the number of analog control data for one response member. This enables it to control the response member with variation of current value closer to an analog signal.

While the third embodiment has been described for a case where the microcomputer on the game machine control module 120 (FIG. 38) determines attitude of the game machine control module 120 based on the angular velocity detection signals S155A, S155B, and S155C obtained from the angular velocity sensor 155 mounted on the game machine control module 120, and corrects vibration of the vibrator member 140 based on the attitude, the present invention is not limited to it, but may once transmit the angular velocity detection signals S155A, S155B, and S155C from the angular velocity sensor 155 to the game machine 27, and determine the attitude of the game machine control module 120 with the microcomputer (CPU) on the game machine 27, thereby previously correcting the vibration data DX, DY, and DZ in the control data (FIG. 56) to be transmitted to the game machine control module 120 before they are transmitted from the game machine 27.

In addition, while the third embodiment has been described for a case where the value of drive current applied to the coils 143A–143F of the vibrator member 140 is corrected on the basis of the angular velocity detection signals S155A, S155B, and S155C obtained from the angular velocity sensor 155 mounted on the game machine control module 120, the present invention is not limited to it, but may determine the attitude of the game machine control module 120 based on the angular velocity detection signals S155A, S155B, and S155C obtained from the angular velocity sensor 155 mounted on the game machine control module 120, and transmit the variation of attitude to the game machine 27 in place of input from the control button.

With such arrangement, the user can, for example, to input a command for moving an action target on the monitor screen to any desired direction only by varying the attitude of the game machine control module 120 without operating the control button on the game machine control module 120.

Other Embodiments

Figure 59:
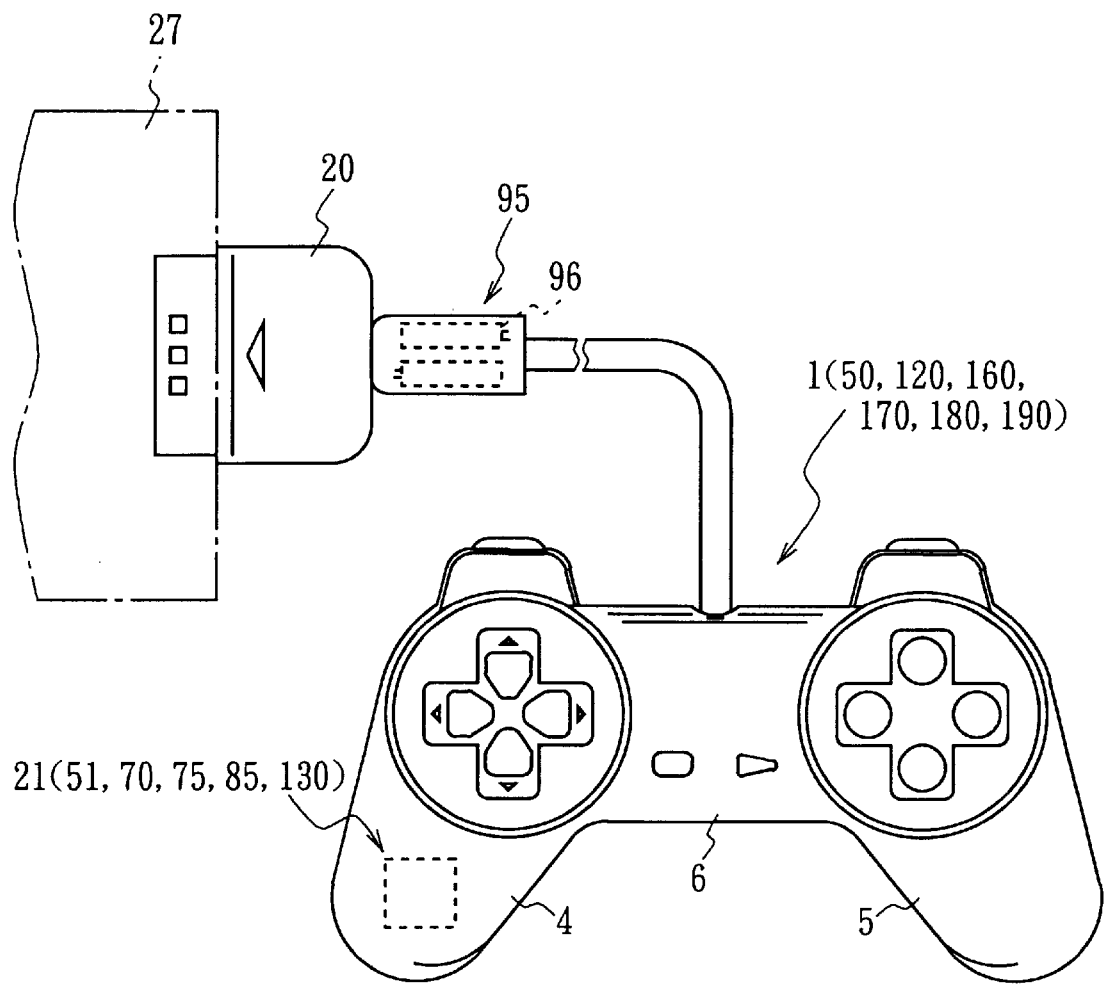
FIG. 59 is a plan view showing another embodiment of the power supply for the response member.

While the first, second and fourth embodiments have been described for a case where electric power is supplied from the game machine 27 for driving the response member 21 (51, 70, 75, 85, 130), the present invention is not limited to it, but may provide a power supply for driving the response member 21 (51, 70, 75, 85, 130) on the game machine control module 1 (50, 120, 160, 170, 180, 190), as shown in FIG. 59.

In this case, as shown in FIG. 59, it is sufficient to mount the power supply 95 at a position not interfering with the operation of the game machine control module 1 (50, 120,

160, 170, 180, 190), for example, at a position close to the connector 20 for connection with the game machine 27, and to install a removable battery, for example, a dry cell 96 therein. With such arrangement, there is no need to supply electric power from the game machine 27, so that the game machine 27 can have a construction similar to the prior art, and it is only sufficient to replace the cable.

Figure 60:
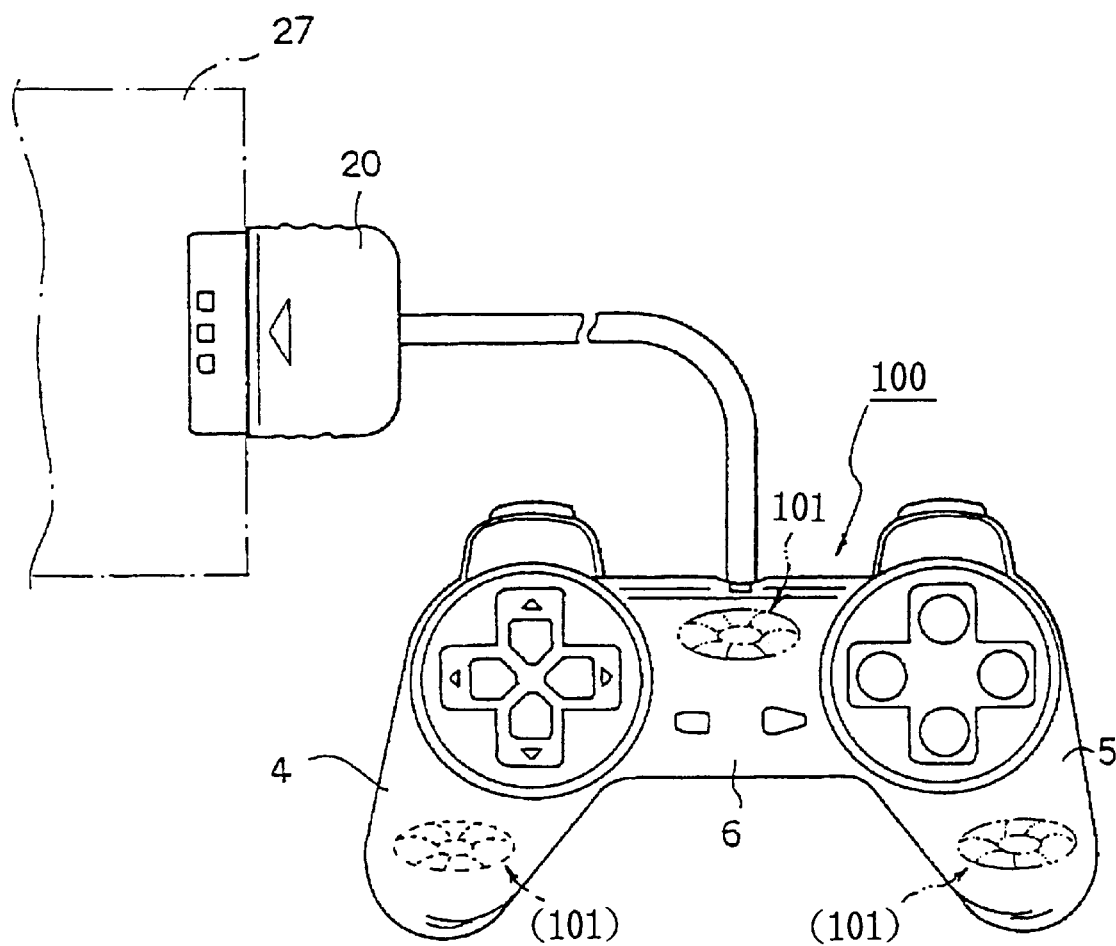
FIG. 60 is a plan view showing a game machine control module having a sound generator according to an alternate embodiment.

While the first, second and third embodiments have been described for a case where ambience is provided for the user by vibrating the game machine control module 1 (50, 120, 160, 170, 180, 190), the present invention is not limited to it, but may generate particularly very low sound by mounting a sound generator 101 in a space in the front portion of the constricted start/select section 6 of a game machine control module 100, in a space in the first control support 4 supported by the palm of the left hand, or in a space in the second control support 5 supported by the palm of the right hand, as shown in FIG. 60.

With such arrangement, feedback from the game machine 27 can be perceived as sound at hand, and can generate vibration as well if it is arranged to generate very low sound, so that ambience can be enhanced with sound and vibration.

Figure 61:
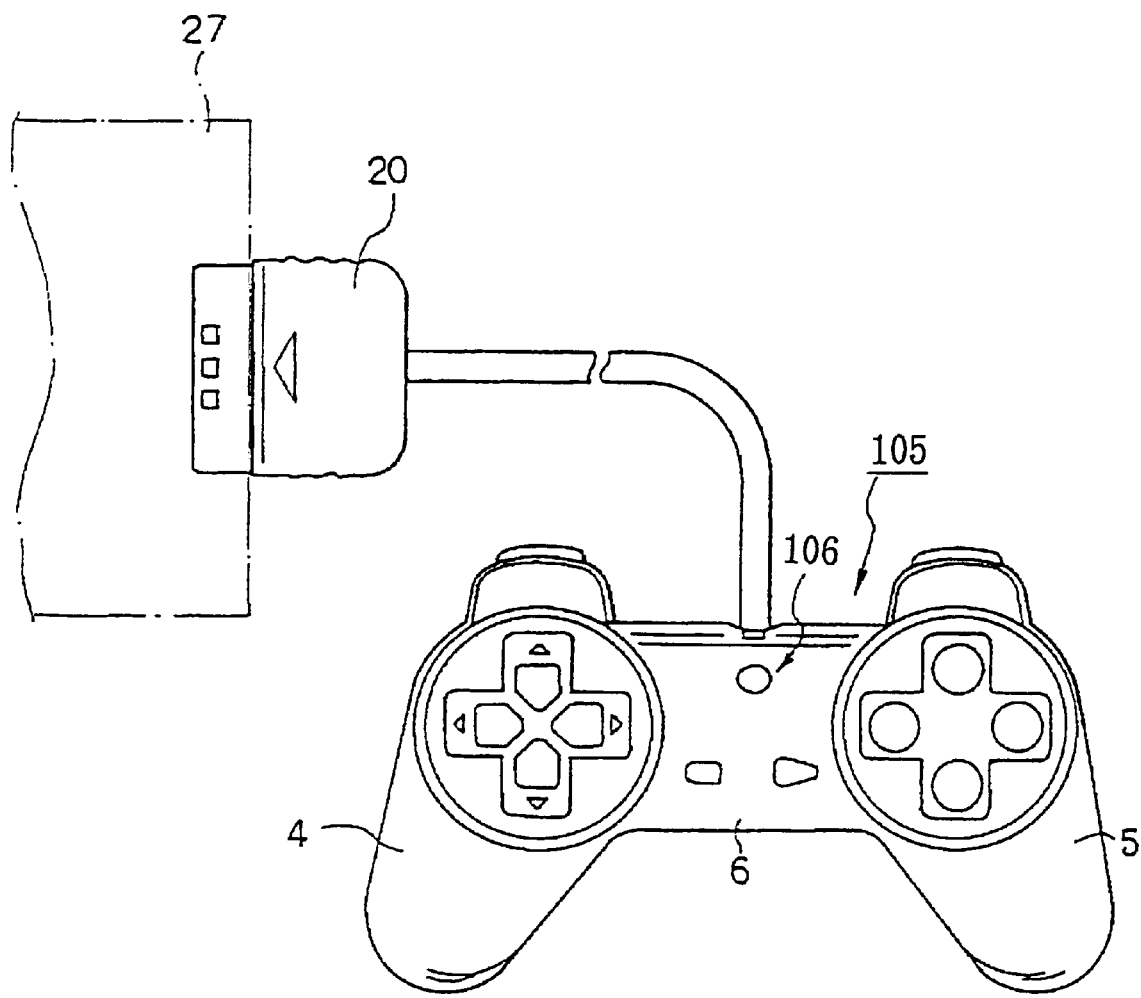
FIG. 61 is a plan view showing a game machine control module having a light emitter according to an alternate embodiment.

While the first, second, and third embodiments have been described for a case where the game machine control module 1 (50, 120, 160, 170, 180, 190) is vibrated to provide the user with ambience, the present invention is not limited to it, but may provide a light emitting member, for example, an LED 106 as the response member on the upper front portion of the constricted start/select section 6 of a game machine control module 105, for example, as shown in FIG. 61. In this case, while FIG. 61 shows only one LED provided, the number of LED is not limited to one, but may be several LEDs arranged in an array. Alternately, the LED may be flashed.

When the light emitting member (106) is provided as the response member as above, ambience of hit can be obtained also on the game machine control module 105 as light is emitted at hand when an action target is hit.

The present invention is not limited to the embodiments described above. It is a matter of course that the present invention is essentially applied to all configurations where the control module used by the user with his or her hands is incorporated with a member causing sane response when an action target is hit. In addition, it is also a matter of course that the dynamic transmission of the above-mentioned embodiments is provided by appropriately combining sound and/or light. Furthermore, while the above-mentioned embodiments have been described for a case where the game machine control module causes same response according to a game developed on the screen of the monitor, the present invention is not limited to such arrangement, but may be applied to a game machine where the user experiences pseudo experience, for example, only with sound.

As described above, the present invention provides a response member on the control module itself that feeds back variation of an action target of a game to the user in synchronization with such variation in addition to visual and/or experiences of the variation of the action target, so that the control module itself generates, for example, vibration to provide bodily sensation on hit, thereby the user enjoys the game with more ambience.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A game machine control module having a plurality of operation buttons, which is connected to a game machine body through a cable, comprising:

a control member for transmitting the operation data obtained by a plurality of said operation buttons to said game machine body through said cable, and for receiving the data containing a predetermined dynamic transmission data from said game machine body through said cable; and a response member which is positioned at a predetermined place on said game machine control module itself and which is operated by said control member in response to said predetermined dynamic transmission data received from said game machine body to cause said response member to operate so as to enhance ambience of a user holding the game machine control module during a game.

2. The game machine control module according to claim 1, wherein said response member is a vibration member.

3. The game machine control module according to claim 2, wherein:

said game machine control module is composed of a housing and a pair of handles diverging from each other in a direction from said housing toward a user;

said diverging handles are connected and supported by hand palms of said user; and said vibration member is arranged at, at least, one place of the spatial position of said pair of said handles or near a center position of the housing.

4. The game machine control module according to claim 3, comprising two said vibration members, wherein said two vibration members are arranged at, at least, two places of the spatial position of said pair of said handles or near a center position of the housing, and said two vibration members arranged at two places have a different size from each other.

5. The game machine control module according to claim 2, wherein said vibration member comprises:
   a motor;
   a rotating shaft of which one side is connected to said motor; and
   a member eccentrically mounted to the other side of said rotating shaft.

6. The game machine control module according to claim 2, wherein:

said predetermined dynamic transmission data has a plurality of packet data and each packet data has data representing a plurality of values of a driving electric current; and said control member generates a driving electric current waveform to be supplied to said vibration member from the data representing said plurality of values of the driving electric current.

7. The game machine control module according to claim 2, wherein the power supply for driving said vibration member is supplied from said game machine body itself.

8. The game machine control module according to claim 2, wherein said game machine control module has a power supply member for driving said vibration member.

9. The game machine control module according to claim 8, wherein said power supply member is a changeable battery.

10. The game machine control module according to claim 3, wherein
said control member controls the magnitude of the vibration of said vibration member based on said dynamic transmission data.

11. The game machine control module according to claim 1, wherein
said response member is a sound generating member.

12. The game machine control module according to claim 1, wherein
said response member is a light emitting member.

13. The game machine control module according to claim 3, comprising two said vibration members, wherein
said two vibration members are arranged at, at least, two places of the spatial position of said pair of said handles or near a center position of the housing, and said dynamic transmission data contains control data for controlling the vibrating action of each of said vibration members.

14. The game machine control module according to claim 2, wherein
said vibrating member comprises:
a coil; and
a magnetic material corresponding to said coil; wherein one of said coil or said magnetic material vibrates by the magnetic flux generated on said coil.

15. The game machine control module according to claim 14, wherein:
said game machine control module is composed of a housing and a pair of handles diverging from each other in a direction from said housing toward a user;
said diverging handles are connected and supported by hand palms of said user; and
said vibration member is positioned at, at least, one place of spatial position of said pair of said handles or near a center of the housing.

16. The game machine control module according to claim 15, comprising two said vibration members wherein
said two vibration members are arranged at, at least, two places of the spatial position of said pair of said handles or near a center position of the housing, and said two vibration members arranged at two places have a different size from each other.

17. The game machine control module according to claim 14, wherein:
said dynamic transmission data has a plurality of packet data and each packet data has data representing a plurality of values of a driving electric current; and
said control member generates a driving electric current waveform to be supplied to said vibration member from the data representing said values of the driving electric current.

18. The game machine control module according to claim 14, wherein
the power supply for driving said vibration member is supplied from said game machine body itself.

19. The game machine control module according to claim 14, wherein
said game machine control module has a power supply member for driving said vibration member.

20. The game machine control module according to claim 19, wherein
said power supply member is a changeable battery.

21. The game machine control module according to claim 15, wherein said control member controls the magnitude of the vibration of said vibration member based on said dynamic transmission data.

22. The game machine control module according to claim 14, wherein
said vibration member is composed of a plurality of coils generating the magnetic flux in a plurality of directions and magnetic materials corresponding to a plurality of said coils.

23. The game machine control module according to claim 22, wherein
a plurality of said coils are unified with one another.

24. The game machine control module according to claim 14, wherein:
said module further has a detecting member for detecting the position of said module; and
said control member corrects the driving data to be supplied to said vibration member based on the detection result of said detecting member.

25. The game machine control module according to claim 15, comprising two said vibration members wherein
said two vibration members are arranged at, at least, two places of the spatial position of said pair of said handles or near a center position of the housing, and said dynamic transmission data contains data for controlling the vibrating action of each said vibration members.

26. A game machine control module having a plurality of operation buttons, which is connected to a game machine body through a cable, comprising:
a control member for transmitting the operation data obtained by a plurality of said operation buttons to said game machine body through said cable, and for receiving the data containing a predetermined dynamic transmission data, which further contains a plurality of control data, from said game machine body through said cable; and
a response member which is positioned at a predetermined place on said game machine control module itself and which is operated by said control member in response to said predetermined dynamic transmission data received from said game machine body to cause said response member to operate so as to enhance ambience of a user holding the game machine module during a game, said response member being controlled by said control member based on a plurality of said control data so as to selectively generate different actions of said response member.

27. The game machine control module according to claim 26, wherein
said response member is a vibration member, and said vibration member is controlled by said control member so as to selectively generate different vibrations based on a plurality of said control data.

28. The game machine control module according to claim 27, wherein
a plurality of said control data are, at least, a first control data for analog-vibrating said vibration member and a second control data for digital-vibrating said vibration member.

29. The game machine control module according to claim 27, wherein:
said game machine control module is composed of a housing and a pair of handles diverging from each other in a direction from said housing toward a user;
said diverging handles are connected and supported by hand palms of said user; and said vibration member is positioned at, at least, one place of the spatial position of said pair of said handles or near a center position of the housing.

30. The game machine control module according to claim 29, comprising two said vibration members, wherein said two vibration members are arranged at, at least, two places of the spatial position of said pair of said handles or near a center position of the housing, and said vibration members positioned at two places have a different size from each other; and with respect to each of said vibration members, a plurality of said control data are contained in the dynamic transmission data.

31. The game machine control module according to claim 29, comprising two said vibration members, wherein said two vibration members are arranged at, at least, two places of the spatial position of said pair of said handles or near a center position of the housing; and with respect to each of said vibration members, a plurality of said control data are contained in the dynamic transmission data.

32. The game machine control module according to claim 29, wherein said vibration member comprises:
a motor;
a rotating shaft of which one side is connected to said motor; and
a member eccentrically mounted to the other side of said rotating shaft.

33. The game machine control module according to claim 32, wherein said vibrating member comprises:
a coil; and
a magnetic material corresponding to said coil; wherein one of said coil or said magnetic material vibrates by the magnetic flux generated on said coil.

34. The game machine control module according to claim 33, wherein said game machine control module is composed of a housing and a pair of handles diverging from each other in a direction from said housing toward a user;

said diverging handles are connected and supported by hand palms of said user; and said vibration member is arranged at, at least, one place of the spatial position of said pair of said handles or near a center position of the housing.

35. The game machine control module according to claim 34, comprising two said vibration members, wherein said two vibration members are arranged at, at least, two places of the spatial position of said pair of said handles or near a center position of the housing, and said two vibration members positioned at two places have a different size from each other; and with respect to each of said vibration members, a plurality of said control data are contained in the dynamic transmission data.

36. The game machine control module according to claim 34, comprising two said vibration members, wherein said two vibration members are arranged at, at least, two places of the spatial position of said pair of said handles or near a center of the housing; and with respect to each of said vibration members, a plurality of said control data are contained in the dynamic transmission data.

* * * * *